United States Patent
Matsumoto et al.

(10) Patent No.: US 11,846,897 B2
(45) Date of Patent: Dec. 19, 2023

(54) IMAGE FORMING APPARATUS HAVING TONER REPLENISHMENT

(71) Applicant: CANON KABUSHIKI KAISHA, Tokyo (JP)

(72) Inventors: Shinichiro Matsumoto, Kanagawa (JP); Masayuki Sakai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/703,287

(22) Filed: Mar. 24, 2022

(65) Prior Publication Data

US 2022/0229383 A1 Jul. 21, 2022

Related U.S. Application Data

(63) Continuation of application No. PCT/JP2020/036733, filed on Sep. 28, 2020.

(30) Foreign Application Priority Data

Sep. 30, 2019 (JP) ................ 2019-181068
Sep. 30, 2019 (JP) ................ 2019-181069
Sep. 30, 2019 (JP) ................ 2019-181070

(51) Int. Cl.
*G03G 15/08* (2006.01)
*G03G 15/00* (2006.01)
*G06K 15/00* (2006.01)

(52) U.S. Cl.
CPC ..... *G03G 15/0894* (2013.01); *G03G 15/5016* (2013.01); *G06K 15/407* (2013.01)

(58) Field of Classification Search
CPC .......... G03G 15/5016; G03G 15/0894; G06K 15/407
See application file for complete search history.

(56) References Cited

U.S. PATENT DOCUMENTS

| 5,593,068 A | 1/1997 | Kitayama et al. |
| 5,708,912 A | 1/1998 | Lee |

(Continued)

FOREIGN PATENT DOCUMENTS

| JP | H06-011964 A | 1/1994 |
| JP | 07-72725 A | 3/1995 |

(Continued)

OTHER PUBLICATIONS

PCT International Search Report dated Dec. 8, 2020, in PCT/JP2020/036733.

(Continued)

*Primary Examiner* — Victor Verbitsky
(74) *Attorney, Agent, or Firm* — VENABLE LLP

(57) ABSTRACT

An image forming apparatus having a detachable replenishment container includes an image bearing member, a developer container, a developing bearing member to develop an electrostatic latent image formed on the image bearing member into a toner image by using toner accommodated in the developer container, and a replenishment port through which the developer container can be replenished with toner from the replenishment container. A restriction member transitions between an allowance state in which the replenishment container and the replenishment port communicate with each and a restriction state in which the replenishment container and the replenishment port are not made to communicate with one another.

20 Claims, 55 Drawing Sheets

(56) References Cited

U.S. PATENT DOCUMENTS

| | | | |
|---|---|---|---|
| 5,918,094 A * | 6/1999 | Masuda | G03G 15/0877 |
| | | | 399/258 |
| 6,256,469 B1 | 7/2001 | Taniyama et al. | |
| 8,040,542 B2 | 10/2011 | Oda et al. | |
| 2007/0237537 A1 * | 10/2007 | Hasegawa | G03G 15/55 |
| | | | 399/81 |

FOREIGN PATENT DOCUMENTS

| | | |
|---|---|---|
| JP | H08-30084 A | 2/1996 |
| JP | 2000-162929 A | 6/2000 |
| JP | 2001-228692 A | 8/2001 |
| JP | 2002-278249 A | 9/2002 |
| JP | 2003-122197 A | 4/2003 |
| JP | 2004-354666 A | 12/2004 |
| JP | 2005-324442 A | 11/2005 |
| JP | 2006-003498 A | 1/2006 |
| JP | 2006-317919 A | 11/2006 |
| JP | 2008-282217 | 11/2008 |
| JP | 2011-008114 A | 1/2011 |
| JP | 2012-141553 A | 7/2012 |
| JP | 2015-232658 A | 12/2015 |
| JP | 2016-185707 A | 10/2016 |

OTHER PUBLICATIONS

Japanese Office Action dated Jun. 27, 2023, in related Japanese Patent Application No. 2019-181070.

* cited by examiner

IMAGE FORMING APPARATUS HAVING TONER REPLENISHMENT

CROSS-REFERENCE TO RELATED APPLICATIONS

This application is a Continuation of International Patent Application No. PCT/JP2020/036733, filed Sep. 28, 2020, which claims the benefit of Japanese Patent Application Nos. 2019-181068, filed Sep. 30, 2019, 2019-181069, filed Sep. 30, 2019, 2019-181070, filed Sep. 30, 2019, all of which are hereby incorporated by reference herein in their entirety.

BACKGROUND OF THE INVENTION

Field of the Invention

The present invention relates to an image forming apparatus that forms an image on a recording material.

Description of the Related Art

Typically, an image forming apparatus of an electrophotographic system forms an image on a recording material by developing an electrostatic latent image formed on the surface of a photosensitive member into a toner image by using toner, and then transferring the toner image from the photosensitive member onto the recording material. As methods for replenishing an image forming apparatus with toner consumed by repetitively performing image formation, a process cartridge system and a consecutive replenishment system are known. The process cartridge system is a system in which a photosensitive member and a developer container accommodating toner are integrated as a process cartridge, and the process cartridge is replaced by a brand-new one when all toner in the developer container is consumed.

Meanwhile, Japanese Patent Laid-Open No. H08-30084 discloses a developing unit of a consecutive replenishment system that includes a toner conveyance path through which toner is supplied to a developing roller, and a developer supply box connected to the toner conveyance path, and that supplies toner from the developer supply box to the toner conveyance path in accordance with a detection result of a toner remainder amount.

In recent years, demand from users for a wider variety of use of the image forming apparatus has been increasing in addition to the process cartridge system and the consecutive replenishment system described above.

SUMMARY OF THE INVENTION

An aspect of the present invention is an image forming apparatus to and from which a replenishment container accommodating toner is attachable and detachable and which is configured to form a toner image on a recording material, the image forming apparatus including an image bearing member, a developer container configured to accommodate toner, a developing bearing member configured to develop an electrostatic latent image formed on the image bearing member into a toner image by using toner accommodated in the developer container, a replenishment port through which the developer container can be replenished with toner from the replenishment container provided outside the image forming apparatus by attaching the replenishment container thereto, a restriction member capable of transitioning to an allowance state in which a rotation of the replenishment container attached to the replenishment port with respect to the replenishment port is allowed and to a restriction state in which the rotation of the replenishment container attached to the replenishment port with respect to the replenishment port is restricted, a notification portion configured to notify a replenishment procedure for replenishing the developer container with toner from the replenishment container and a controller configured to cause the notification portion to notify at least one step of the replenishment procedure.

Another aspect of the present invention is an image forming apparatus to and from which a replenishment container accommodating toner is attachable and detachable and which is capable of communicating with an information processing apparatus having a notification portion and is configured to form a toner image on a recording material, the image forming apparatus including an image bearing member, a developer container configured to accommodate toner, a developing bearing member configured to develop an electrostatic latent image formed on the image bearing member into a toner image by using toner accommodated in the developer container, a replenishment port through which the developer container can be replenished with toner from the replenishment container provided outside the image forming apparatus by attaching the replenishment container thereto, a restriction member capable of transitioning to an allowance state in which a rotation of the replenishment container attached to the replenishment port with respect to the replenishment port is allowed and to a restriction state in which the rotation of the replenishment container attached to the replenishment port with respect to the replenishment port is restricted, and a controller configured to output, to the information processing apparatus, information for causing the notification portion to notify at least one step of a replenishment procedure for replenishing the developer container with toner from the replenishment container.

Further features of the present invention will become apparent from the following description of exemplary embodiments with reference to the attached drawings.

BRIEF DESCRIPTION OF THE DRAWINGS

FIG. 15C is a side view of the toner bottle unit according to the first modification example.

FIG. 15D is a section view of the toner bottle unit according to the first modification example.

DESCRIPTION OF THE EMBODIMENTS

Exemplary embodiments of the present invention will be described below with reference to drawings.

First Embodiment (1) Image Forming Apparatus

Figure 1A:
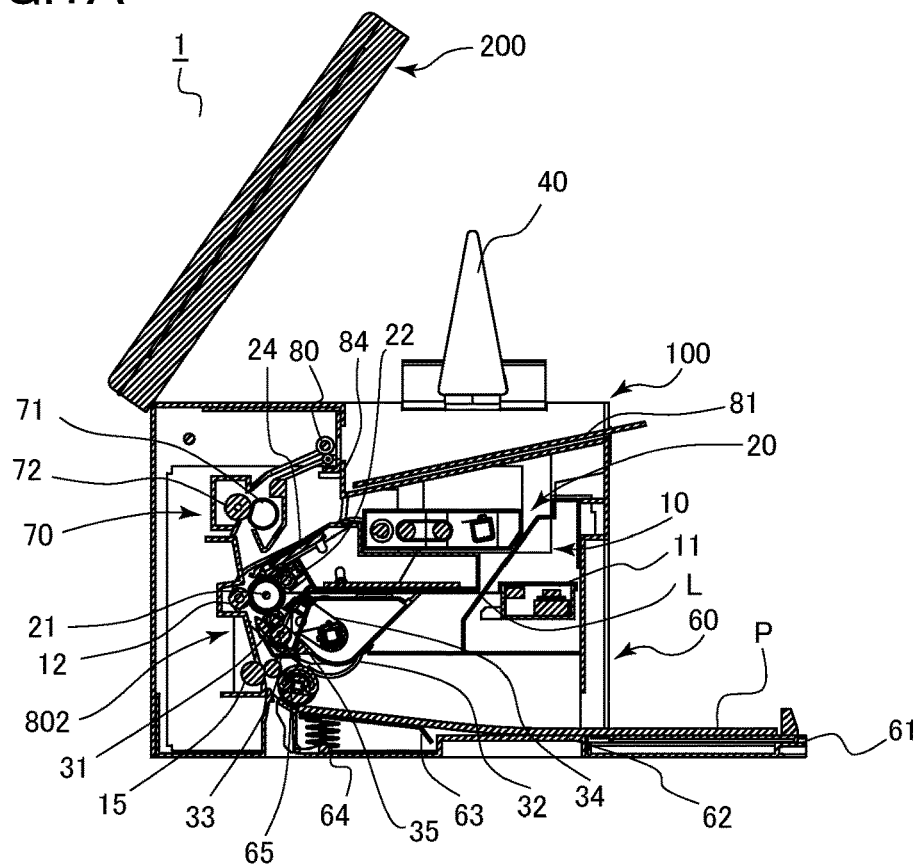
FIG. 1A is a section view of an image forming apparatus according to a first embodiment.

FIG. 1A is a schematic diagram illustrating a configuration of an image forming apparatus 1 according to a first embodiment. The image forming apparatus 1 is a monochromatic printer that forms an image on a recording material on the basis of image information input from an external device. Examples of the recording material include sheet materials of different natures, for example, paper sheets such as regular paper sheets and cardboards, plastic films such as sheets for overhead projectors, sheets having irregular shapes such as envelops and index sheets, and cloths.

(1-1) Overall Configuration

Figure 1B:
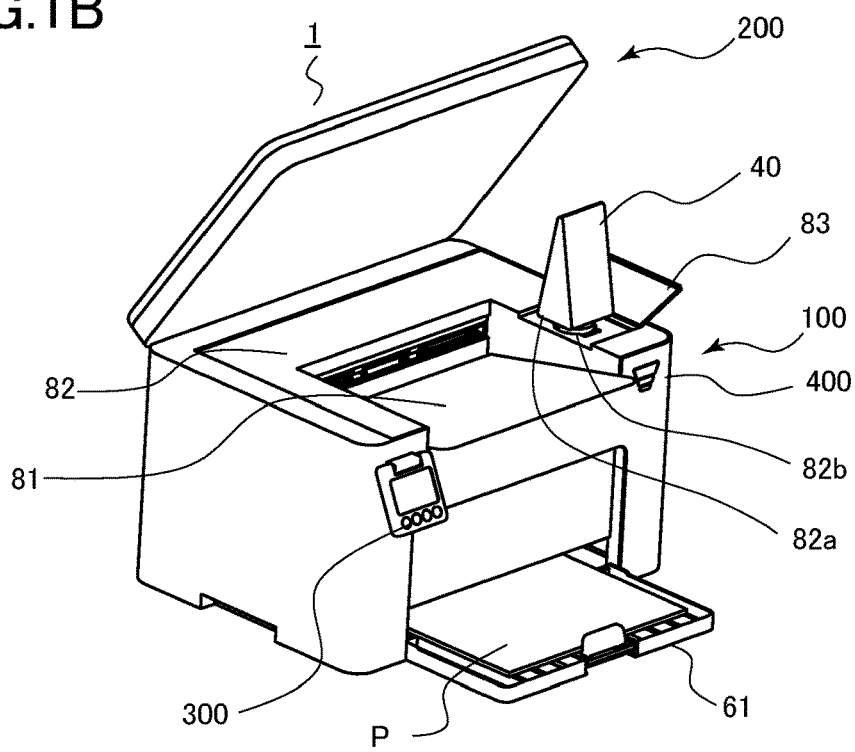
FIG. 1B is a perspective view of the image forming apparatus according to the first embodiment.

As illustrated in FIGS. 1A and 1B, the image forming apparatus 1 includes a printer body 100 serving as an apparatus body, a reading apparatus 200 openably and closably supported on the printer body 100, and an operation portion 300 attached to an exterior surface of the printer body 100. The printer body 100 includes an image forming portion 10, a feeding portion 60, a fixing portion 70, and a discharge roller pair 80. The feeding portion 60 feeds a recording material to the image forming portion 10, and the image forming portion 10 forms a toner image on the recording material. The fixing portion 70 fixes the toner image formed by the image forming portion 10 onto the recording material, and the discharge roller pair 80 discharges the recording material having passed through the fixing portion 70 to the outside of the apparatus. In addition, a direct replenishment system in which toner is directly replenished from the outside of the image forming apparatus 1 by using a toner pack 40 filled with toner for replenishment is employed for a process cartridge 20 of the present embodiment.

The image forming portion 10 is an image forming means (image forming unit) of an electrophotographic system including a scanner unit 11, the process cartridge 20, and a transfer roller 12. The process cartridge 20 includes a photosensitive drum 21, a charging roller 22 disposed in the vicinity of the photosensitive drum 21, a developing roller 31, and a cleaning blade 24.

The photosensitive drum 21 serving as an image bearing member of the present embodiment is a photosensitive member formed in a cylindrical shape. The photosensitive drum 21 of the present embodiment includes a drum-shaped base body formed from aluminum, and a photosensitive layer formed from a negatively-chargeable organic photoconductor on the base body. In addition, the photosensitive drum 21 is rotationally driven by a motor at a predetermined process speed in a predetermined direction (clockwise direction as illustrated).

The charging roller 22 comes into contact with the photosensitive drum 21 at a predetermined pressure contact force, and thus forms a charging portion. In addition, a desired charging voltage is applied from a charging high-voltage power source, and thus the surface of the photosensitive drum 21 is uniformly charged to a predetermined potential. In the present embodiment, the photosensitive drum 21 is negatively charged by the charging roller 22.

The scanner unit 11 radiates laser light L corresponding to image information input from an external device or the reading apparatus 200 onto the photosensitive drum 21 by using a polygonal mirror, and thus exposes the surface of the photosensitive drum 21 in a scanning manner. As a result of this exposure, an electrostatic latent image corresponding to the image information is formed on the surface of the photosensitive drum 21. To be noted, the scanner unit 11 is not limited to a laser scanner unit. For example, an LED exposing unit including an LED array in which a plurality of LEDs are arranged along the longitudinal direction of the photosensitive drum 21 may be employed.

A developing unit 802 includes a developing roller 31 serving as a developer bearing member configured to bear a developer, a developer container 32 serving as a frame member of the developing unit 802, and a supply roller 33 capable of supplying the developer to the developing roller 31. The developing roller 31 and the supply roller 33 are rotatably supported by the developer container 32. In addition, the developing roller 31 is disposed in an opening portion of the developer container 32 so as to oppose the photosensitive drum 21. The supply roller 33 is rotatably in contact with the developing roller 31, and toner serving as the developer accommodated in the developer container 32 is applied on the surface of the developing roller 31 by the supply roller 33.

The developing unit 802 of the present embodiment employs a contact developing system as a developing system. That is, a toner layer borne on the developing roller 31 serving as a developing means (developer bearing member) comes into contact with the photosensitive drum 21 in a developing portion (developing region) where the photosensitive drum 21 and the developing roller 31 oppose each other. A developing voltage is applied to the developing roller 31 from a developing high-voltage power source. Under the influence of the developing voltage, the toner borne on the developing roller 31 transfers from the developing roller 31 onto the drum surface in accordance with the potential distribution of the surface of the photosensitive drum 21, and thus the electrostatic latent image is developed into a toner image. To be noted, in the present embodiment, a reversal development system is employed. That is, the toner image is formed by the toner attaching to a region where the amount of charge is reduced by being exposed in an exposing step on the surface of the photosensitive drum 21 charged in a charging step.

In addition, in the present embodiment, toner which has a particle diameter of 6 μm and whose normal charging polarity is a negative polarity is used. For example, a polymer toner generated by a polymerization method is employed as the toner of the present embodiment. In addition, the toner of the present embodiment is a so-called nonmagnetic one-component developer that does not contain a magnetic component, and is borne on the developing roller 31 mainly by an intermolecular force and an electrostatic force (image force). However, a one-component developer containing a magnetic component may be used. In addition, in some cases, the one-component developer contains additives (for example, wax and silica fine particles) for adjusting the fluidity and charging performance of the toner in addition to the toner particles. In addition, a two-component developer constituted by a nonmagnetic toner and a magnetic carrier may be used as the developer. In the case of using a magnetic developer, a cylindrical developing sleeve in which a magnet is disposed is used as the developer bearing member. That is, what is contained in the developer container 32 is not limited to a one-component developer containing only a toner component, and may be a two-component developer containing toner and carrier.

An agitation member 34 serving as an agitation means is provided inside the developer container 32. The agitation member 34 is driven to pivot, and thus agitates the toner in the developer container 32 and conveys the toner toward the developing roller 31 and the supply roller 33. In addition, the agitation member 34 has a function of circulating toner not used for development and peeled off from the developing roller 31 in the developer container, and thus making the toner in the developer container uniform.

In addition, a developing blade 35 that regulates the amount of toner borne on the developing roller 31 is disposed at an opening portion of the developer container 32 where the developing roller 31 is disposed. In accordance with the rotation of the developing roller 31, the toner supplied to the surface of the developing roller 31 passes through an opposing portion with the developing blade 35, thus forming a uniform thin layer, and is negatively charged as a result of frictional charging.

The feeding portion 60 includes a front door 61 openably and closably supported by the printer body 100, a supporting tray 62, an inner plate 63, a tray spring 64, and a pickup roller 65. The supporting tray 62 constitutes a bottom surface of a recording material accommodating space exposed by opening the front door 61, and the inner plate 63 is supported on the supporting tray 62 so as to be capable of ascending and descending. The tray spring 64 urges the inner plate 63 upward, and presses a recording material P supported on the inner plate 63 against the pickup roller 65. To be noted, the front door 61 closes the recording material accommodating space in the state of being closed with respect to the printer body 100, and supports the recording material P together with the supporting tray 62 and the inner plate 63 in the state of being open with respect to the printer body 100.

The transfer roller 12 serving as a transfer means (transfer member) transfers the toner image formed on the photosensitive drum 21 of the process cartridge 20 onto the recording material. To be noted, although a direct transfer system in which the toner image formed on the image bearing member is directly transferred from the image bearing member onto the recording material will be described in the present embodiment, an intermediate transfer system in which the toner image is transferred from the image bearing member onto the recording material via an intermediate transfer member such as an intermediate transfer belt may be employed. In that case, for example, a transfer unit constituted by an intermediate transfer belt, a primary transfer roller that transfers the toner image from the photosensitive drum onto the intermediate transfer belt through primary transfer, and a secondary transfer roller that transfers the toner image from the intermediate transfer belt onto the recording material functions as a transfer means.

The fixing portion 70 is a thermal fixation system that performs an image fixing process by heating and melting the toner on the recording material. The fixing portion 70 includes a fixing film 71, a fixing heater such as a ceramic heater that heats the fixing film 71, a thermistor that measures the temperature of the fixing heater, and a pressurizing roller 72 that comes into pressure contact with the fixing film 71.

Next, an image forming operation of the image forming apparatus 1 will be described. When a command for image formation is input to the image forming apparatus 1, an image forming process by the image forming portion 10 is started on the basis of image information input from an external computer connected to the image forming apparatus 1 or from the reading apparatus 200. The scanner unit 11 radiates laser light L toward the photosensitive drum 21 on the basis of the input image information. At this time, the photosensitive drum 21 has been charged by the charging roller 22 in advance, and an electrostatic latent image is formed on the photosensitive drum 21 by being irradiated with the laser light L. Then, this electrostatic latent image is developed by the developing roller 31, and a toner image is formed on the photosensitive drum 21.

In parallel with the image forming process described above, the pickup roller 65 of the feeding portion 60 delivers out the recording material P supported on the front door 61, the supporting tray 62, and the inner plate 63. The recording material P is fed to the registration roller pair 15 by the pickup roller 65, and the skew thereof is corrected by abutting a nip of the registration roller pair 15. In addition, the registration roller pair 15 is driven in accordance with a transfer timing of the toner image obtained from the start time of exposure performed by the scanner unit 11, and conveys the recording material P to a transfer portion that is a nip portion formed between the transfer roller 12 and the photosensitive drum 21.

A transfer voltage is applied to the transfer roller 12 from the transfer high-voltage power source, and the toner image borne on the photosensitive drum 21 is transferred onto the recording material P conveyed by the registration roller pair 15. After the transfer, transfer residual toner on the surface of the photosensitive drum 21 is removed by the cleaning blade 24, which is an elastic blade in contact with the photosensitive drum 21. The recording material P onto which the toner image has been transferred is conveyed to the fixing portion 70 and passes through a nip portion formed between the fixing film 71 and the pressurizing roller 72 of the fixing portion 70, and thus the toner image is heated and pressurized. As a result of this, the toner particles melt and then adhere to the recording material P, and thus the toner image is fixed to the recording material P. The recording material P having passed through the fixing portion 70 is discharged to the outside of the image forming apparatus 1 by a discharge roller pair 80, and is supported on a discharge tray 81 formed on an upper portion of the printer body 100.

The discharge tray 81 is inclined upward toward the downstream side in a discharge direction of the recording material, and trailing ends of recording materials discharged onto the discharge tray 81 are aligned by a regulating surface 84 by sliding down the discharge tray 81.

(1-2) Openable and Closable Part of Image Forming Apparatus

Figure 2A:
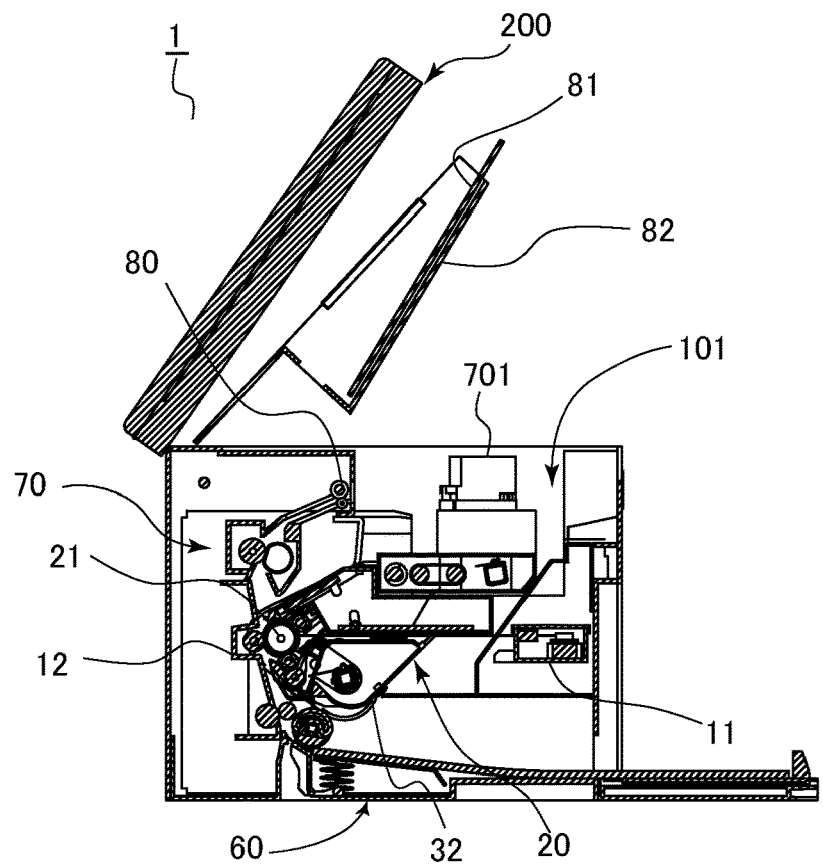
FIG. 2A is a section view of the image forming apparatus according to the first embodiment.
Figure 2B:
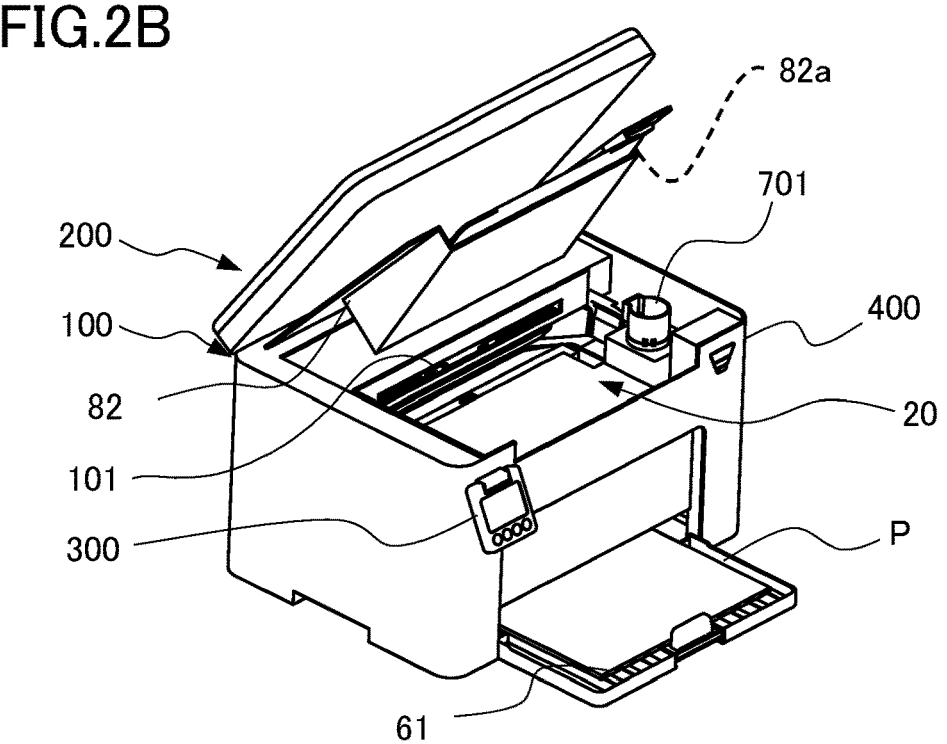
FIG. 2B is a perspective view of the image forming apparatus according to the first embodiment.
Figure 3:
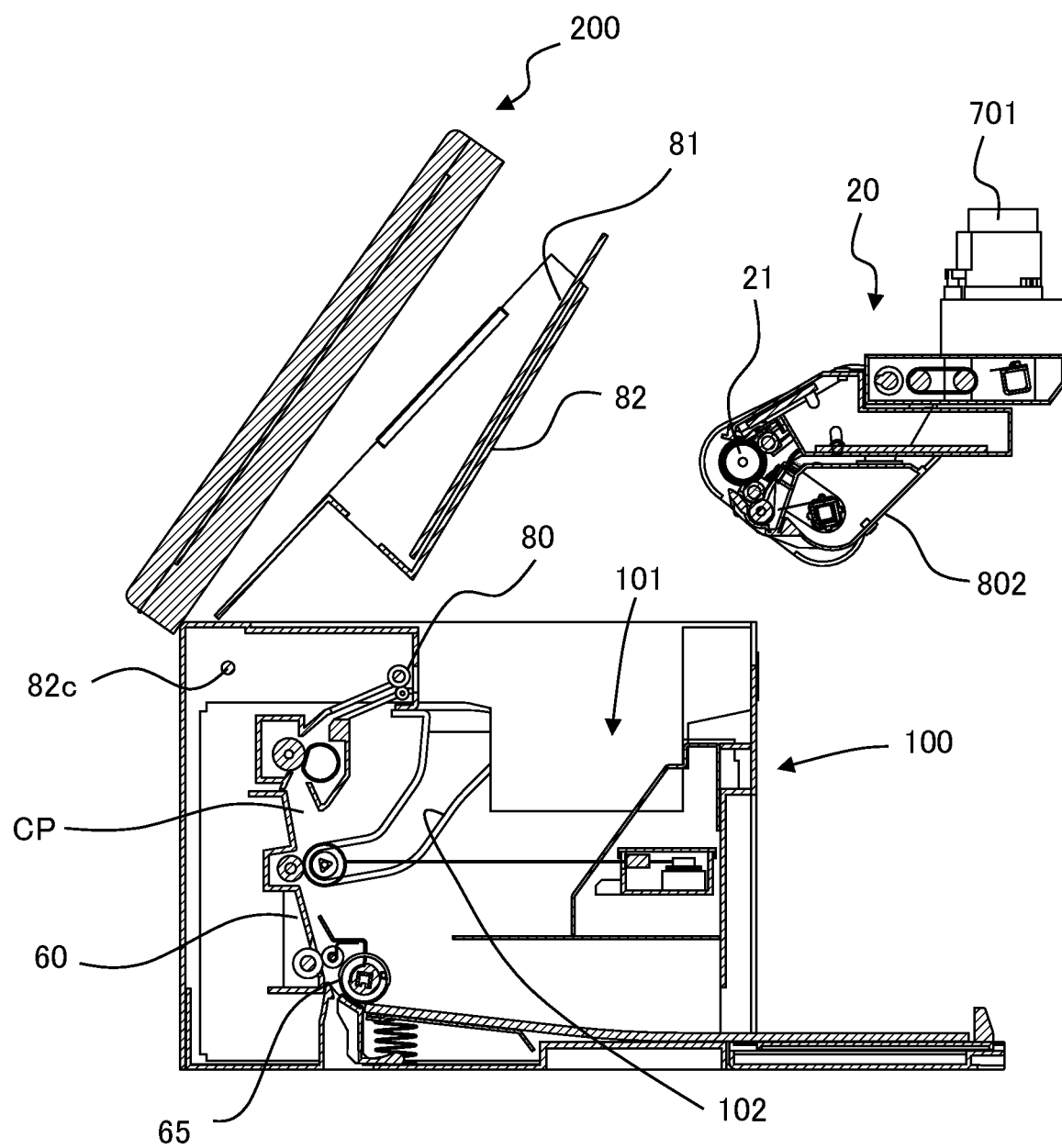
FIG. 3 is a diagram for describing attachment and detachment of a process cartridge according to the first embodiment.

As illustrated in FIGS. 2A, 2B, and 3, a first opening portion 101 opening upward is provided in an upper portion of the printer body 100. The first opening portion 101 is covered by a top cover 82 during use (FIG. 1B), and the process cartridge 20 is exposed by opening the top cover 82 upward (FIG. 2B). The top cover 82 is supported so as to be openable and closable with respect to the printer body 100 by rotating around a rotation shaft 82c (FIG. 3) extending in the left-right direction, and the discharge tray 81 is provided on the upper surface thereof. The top cover 82 is opened from the front side toward the rear side when the reading apparatus 200 is opened with respect to the printer body 100. To be noted, the reading apparatus 200 and the top cover 82 are configured to be held in a state of being open and a state of being closed, by a holding mechanism such as a hinge mechanism.

For example, the user opens the top cover 82 together with the reading apparatus 200 in the case where jam of the recording material has occurred in a conveyance path CP which the recording material fed by the pickup roller 65 passes through. Then, the user accesses the process cartridge 20 through the first opening portion 101 exposed by opening the top cover 82, and pulls out the process cartridge 20 along a cartridge guide 102. A projection portion 21a (FIG. 5A) provided on an end portion of the process cartridge 20 in the axial direction of the photosensitive drum 21 slides on the cartridge guide 102, and thus the process cartridge 20 is guided by the cartridge guide 102.

Then, as a result of the process cartridge 20 being pulled out to the outside through the first opening portion 101, a space through which a hand can reach the inside of the conveyance path CP is generated. The user can put their hand in the printer body 100 through the first opening portion 101 to access the recording material causing the jam in the conveyance path CP, and thus remove the recording material causing the jam.

Figure 4A:
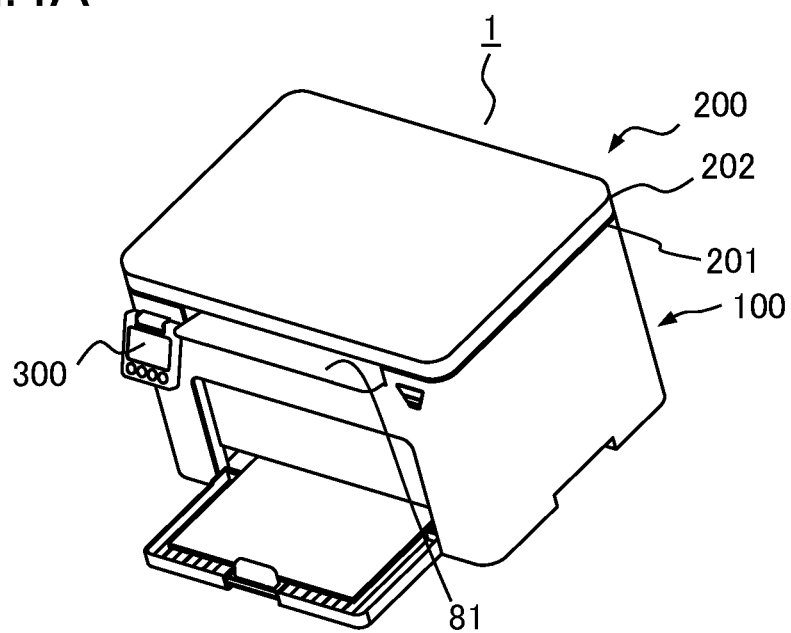
FIG. 4A is a diagram for describing an openable and closable member of the image forming apparatus according to the first embodiment.
Figure 4B:
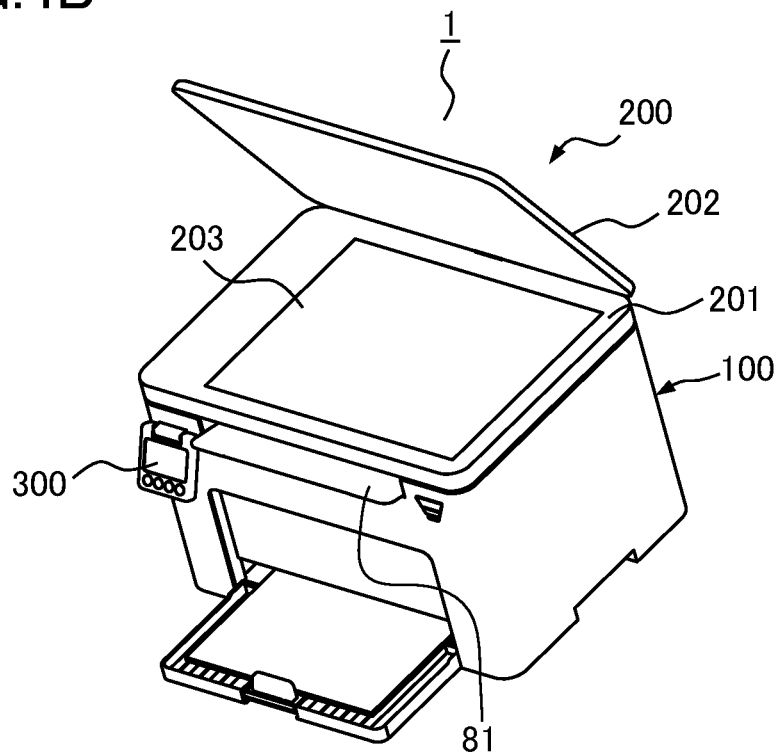
FIG. 4B is a diagram for describing the openable and closable member of the image forming apparatus according to the first embodiment.
Figure 4C:
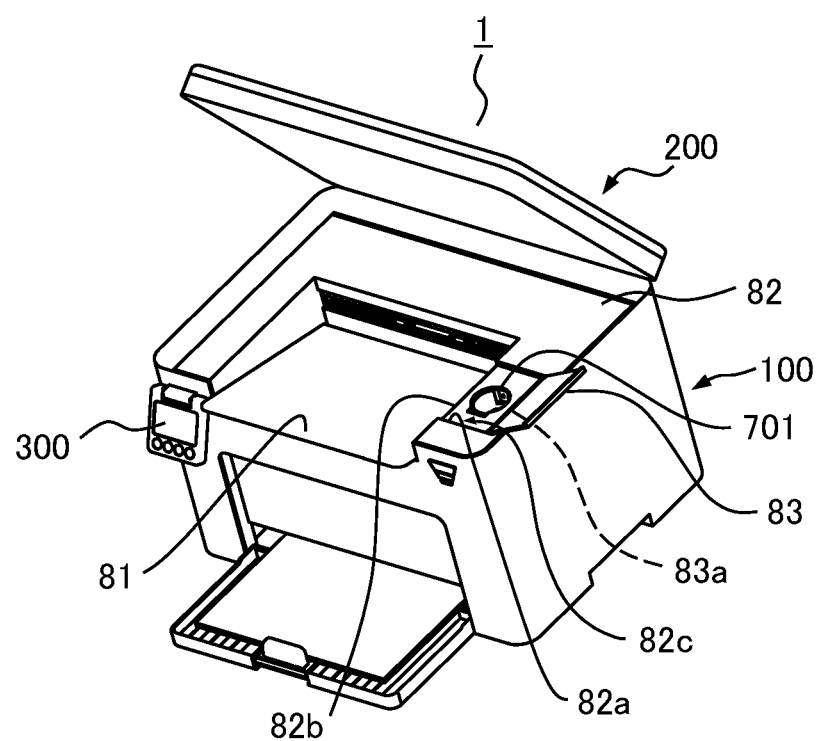
FIG. 4C is a diagram for describing the openable and closable member of the image forming apparatus according to the first embodiment.

In addition, in the present embodiment, an opening/closing member 83 is openably and closably provided on the top cover 82 as illustrated in FIGS. 1B and 4C. An opening portion 82a opening upward is provided in the upper surface of the top cover 82 on which the discharge tray 81 is provided, and the opening portion 82a is covered by closing the opening/closing member 83. The opening/closing member 83 and the opening portion 82a are provided on the right side of the top cover 82. In addition, the opening/closing member 83 is supported on the top cover 82 so as to be openable and closable about a pivot shaft 83a extending in the front-rear direction, and is opened to the left by hooking a finger through a groove portion 82b provided on the top cover 82. The opening/closing member 83 is formed in an approximately L-shape in accordance with the shape of the top cover 82. To be noted, the opening/closing member 83 is not limited to the opening/closing mechanism described above. For example, the opening/closing member 83 may be disposed on the top cover 82 so as to cover a replenishment container attaching portion 701 and configured to open and close the opening portion 82a by sliding and pivoting on the upper surface of the top cover 82 about a pivot shaft perpendicular to the top cover 82. Here, sliding on the upper surface of the top cover 82 means that the movement of the opening/closing member 83 in the pivot axis direction is restricted.

The opening portion 82a is opened so as to expose the replenishment container attaching portion 701 provided in an upper portion of the process cartridge 20 for toner replenishment. By opening the opening/closing member 83, the user can access the replenishment container attaching portion 701 without opening the top cover 82. The user can replenish the process cartridge 20 with toner by attaching a toner pack 40 to the replenishment container attaching portion 701.

In the present embodiment, a system (direct replenishment system) in which the user replenishes the process cartridge 20 with toner from the toner pack 40 (FIGS. 1A and 1B) filled with toner for replenishment illustrated in a state in which the process cartridge 20 is still attached to the image forming apparatus 1 is employed. Therefore, an operation of taking out the process cartridge 20 from the printer body 100 and replacing the process cartridge 20 by a brand-new process cartridge in the case where the amount of toner remaining in the process cartridge 20 has become small becomes unnecessary, and therefore the usability can be improved. To be noted, the image forming apparatus 1 and the toner pack 40 constitute an image forming system.

To be noted, in the present embodiment, the reading apparatus 200 is provided in an upper portion of the image forming apparatus 1, and in the case of opening the opening/closing member 83, the reading apparatus 200 needs to be opened first to expose the top cover 82. However, a configuration in which the reading apparatus 200 is omitted and the opening/closing member 83 is exposed in an upper portion of the image forming apparatus 1 from the beginning may be employed.

(1-3) Reading Apparatus

As illustrated in FIGS. 4A and 4B, the reading apparatus 200 includes a reading unit 201 including an unillustrated reading portion therein, and a pressure plate 202 openably and closably supported by the reading unit 201. A platen glass 203 that transmits light emitted from the reading portion and supports a document placed thereon is provided on the upper surface of the reading unit 201.

In the case of reading an image of a document by the reading apparatus 200, the user places the document on the platen glass 203 in a state in which the pressure plate 202 is open. Then, the pressure plate 202 is closed to suppress displacement of the document on the platen glass 203, and a reading command is output to the image forming apparatus 1 by, for example, operating the operation portion 300. When the reading operation is started, the reading portion in the reading unit 201 reciprocates in a sub-scanning direction, that is, in the left-right direction in a state of facing the operation portion 300 of the image forming apparatus 1 on the front side. The reading portion receives light reflected on the document by a light receiving portion while radiating light onto the document from a light emitting portion, and reads the image of the document by performing photoelectric conversion.

To be noted, in the description below, the front-rear direction, left-right direction, and up-down direction (gravity direction) of the image forming apparatus 1 are defined on the basis of a state of facing the operation portion 300 on the front side as a standard. The positional relationship between members attachable to and detachable from the printer body 100 such as the process cartridge 20 will be described on the basis of a state where the members are attached to the printer body 100. In addition, the "longitudinal direction" of the process cartridge 20 refers to an axial direction of the photosensitive drum 21.

(1-4) Configuration of Process Cartridge

Figure 5A:
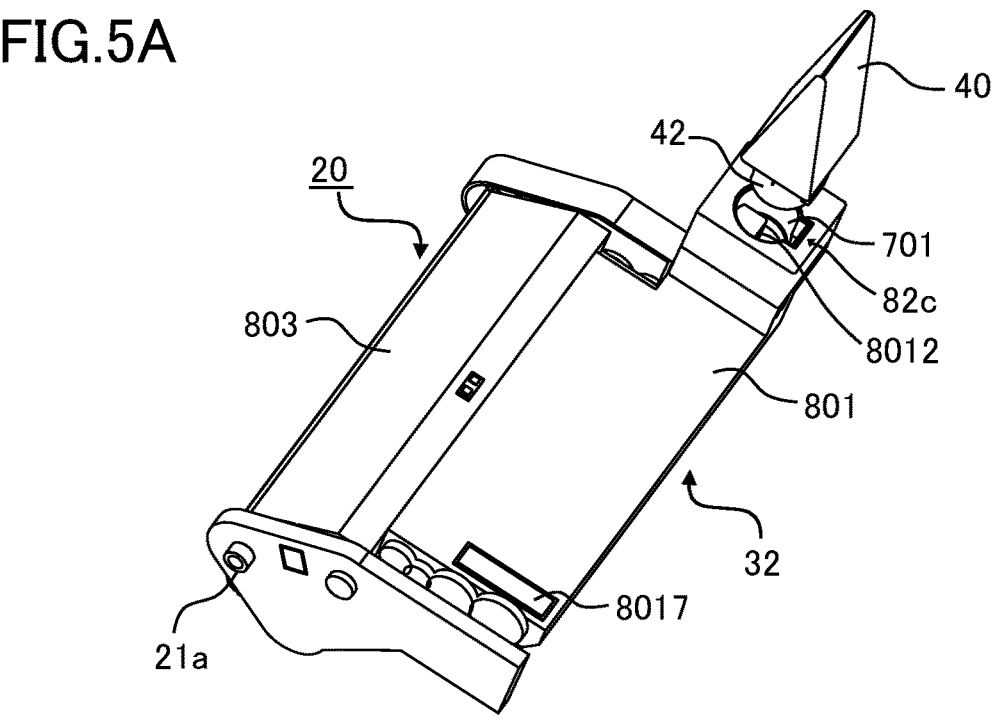
FIG. 5A is a diagram for describing toner replenishment using a toner pack according to the first embodiment.
Figure 5B:
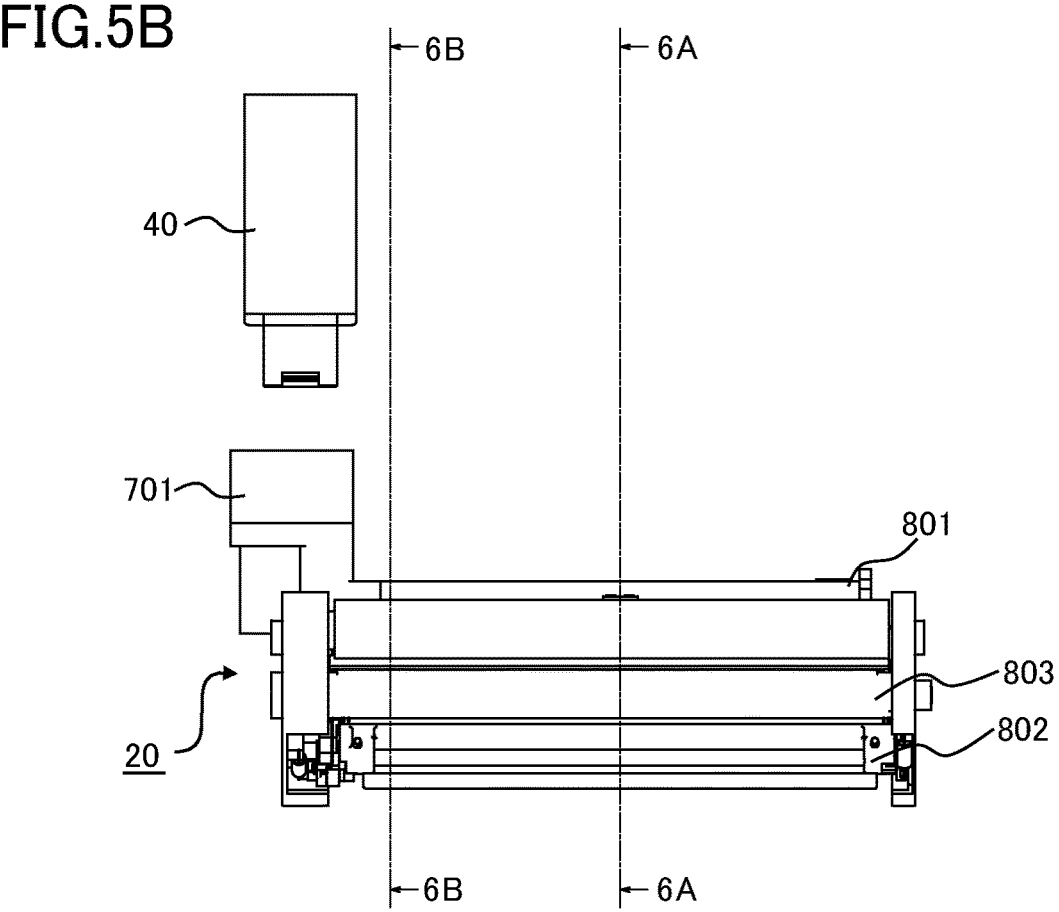
FIG. 5B is a diagram for describing toner replenishment using the toner pack according to the first embodiment.
Figure 6A:
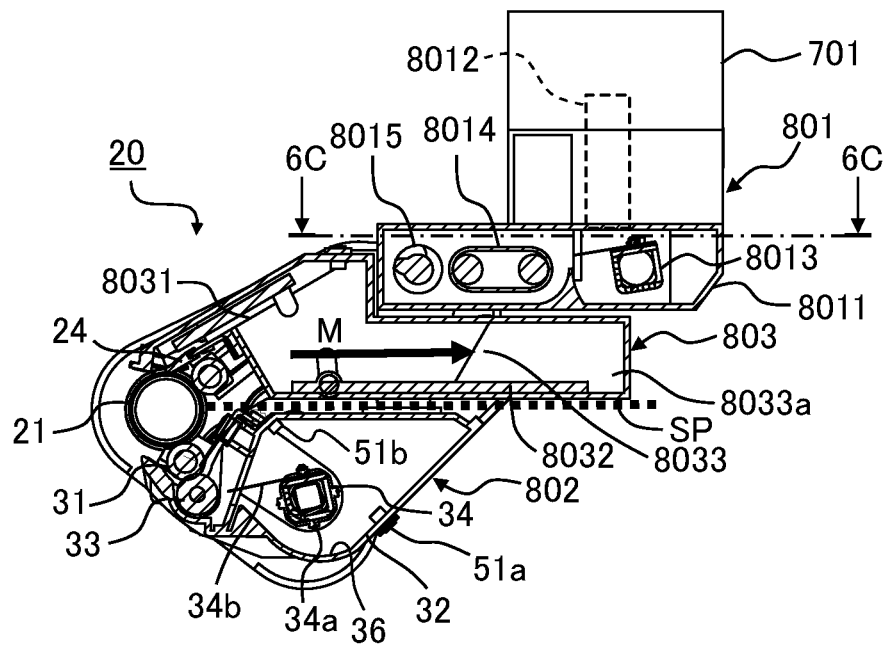
FIG. 6A is a diagram for describing toner replenishment using the toner pack according to the first embodiment.
Figure 6B:
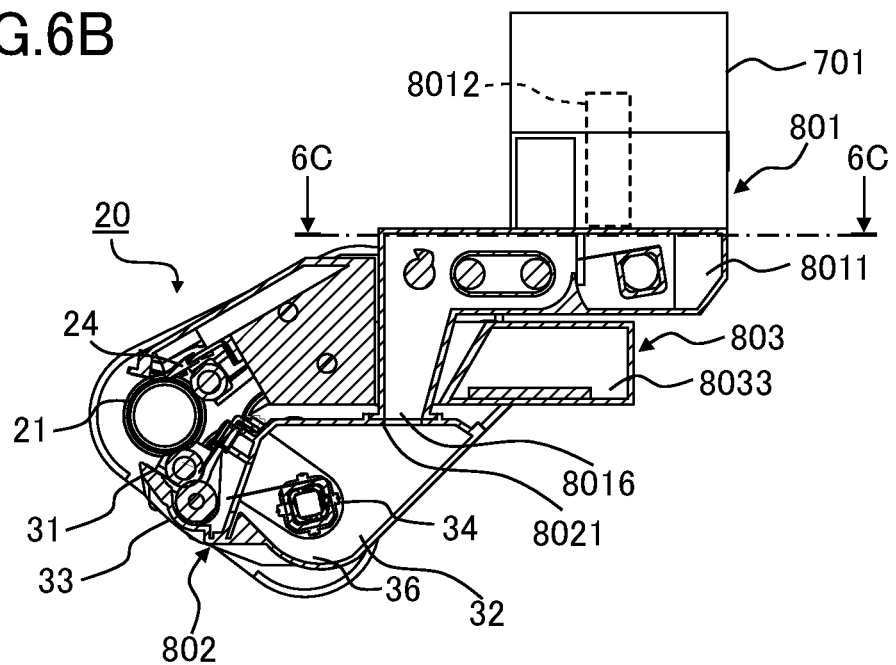
FIG. 6B is a diagram for describing toner replenishment using the toner pack according to the first embodiment.
Figure 6C:
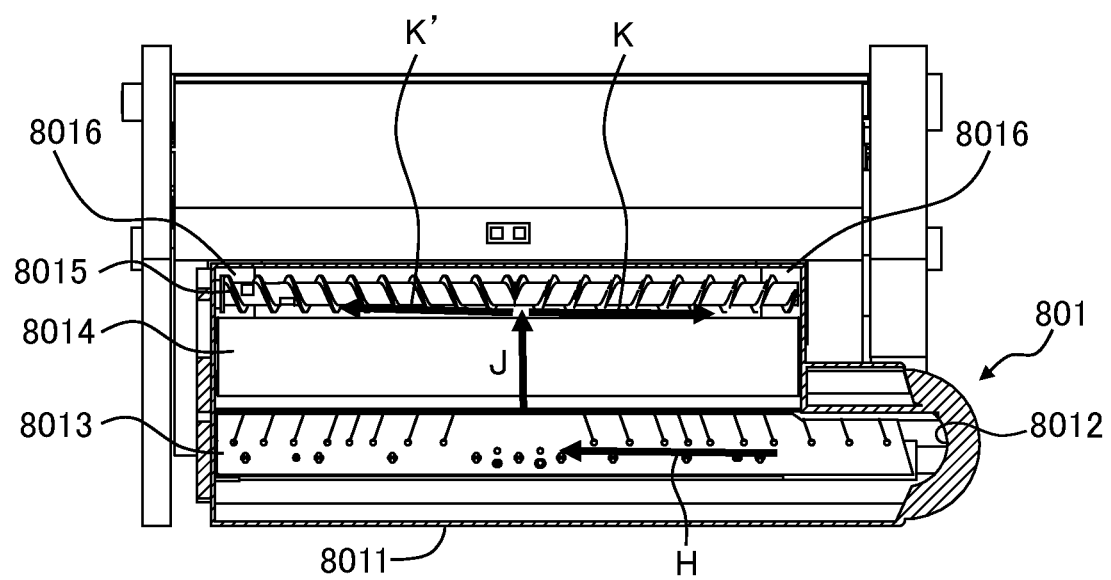
FIG. 6C is a diagram for describing toner replenishment using the toner pack according to the first embodiment.

Next, a configuration of the process cartridge 20 will be described. FIG. 5A is a perspective view of the process cartridge 20 and the toner pack 40, and FIG. 5B is a side view of the process cartridge 20 and the toner pack 40. FIG. 6A is a section view taken along a line 6A-6A of FIG. 5B, FIG. 6B is a section view taken along a line 6B-6B of FIG. 5B, and FIG. 6C is a section view taken along a line 6C-6C of FIGS. 6A and 6B. To be noted, in FIGS. 5A to 6C, the outer shape of the replenishment container attaching portion 701 is illustrated in a simplified manner (for the detailed shape, see, for example, FIG. 9A).

As illustrated in FIGS. 5A to 6C, the process cartridge 20 is constituted by a toner receiving unit 801, a developing unit 802, and a cleaning unit 803. The toner receiving unit 801, the cleaning unit 803, and the developing unit 802 are arranged in this order from the upper side to the lower side in the gravity direction. Each unit will be sequentially described below.

The toner receiving unit 801 is disposed in an upper portion of the process cartridge 20. A toner storage portion 8011 constituted by a frame member that stores toner is provided in the toner receiving unit 801, and the replenishment container attaching portion 701 that couples to a toner pack 40 is provided at an end portion of the toner receiving unit 801 in the longitudinal direction. To be noted, the frame member constituting the toner storage portion 8011 may be made up of a single member or a combination of a plurality of members. The replenishment container attaching portion 701 includes a replenishment port 8012 through which toner discharged from the toner pack 40 is received. The detailed configuration of the replenishment container attaching portion 701 and attachment of the toner pack 40 to the replenishment container attaching portion 701 will be described later.

Further, a first conveyance member 8013, a second conveyance member 8014, and a third conveyance member 8015 are provided inside the toner receiving unit 801. The first conveyance member 8013 conveys, in an arrow H direction (FIG. 6C) toward a center portion of the toner storage portion 8011, toner that has fallen into an end portion of the toner storage portion 8011 in the longitudinal direction through the replenishment port 8012. The second conveyance member 8014 conveys the toner conveyed by the first conveyance member 8013, in an arrow J direction (FIG. 6C) perpendicular to the longitudinal direction, to an upper portion of the developing unit 802, that is, to discharge ports 8016. The third conveyance member 8015 receives the toner from the second conveyance member 8014 mainly at a center portion in the longitudinal direction, and conveys the toner to one side and the other side in the longitudinal direction (arrow K direction and arrow K' direction). To be noted, the first to third conveyance members are operated so as to move the toner, and can be therefore also referred to as first to third developer moving members.

When the toner from the toner pack 40 serving as a replenishment container flows into the toner receiving unit 801, air also flows in. The toner receiving unit 801 includes an air filter 8017 (see FIG. 5A) for allowing the air to flow in the arrow H direction when replenishing toner, such that it is easier to replenish toner. This air filter 8017 suppresses blowout of the toner from the replenishment port 8012 occurring as a result of the inner pressure of the toner receiving unit 801 increasing when replenishing toner and part of the air flowing in a direction opposite to the arrow H direction.

Further, the discharge ports 8016 (FIG. 6B) for discharging toner from the toner storage portion 8011 to the developer container 32 of the developing unit 802 are respectively provided at two end portions of the toner receiving unit 801 in the longitudinal direction. The toner having reached the discharge ports 8016 by being conveyed by the third conveyance member 8015 falls into the developer container 32 in accordance with the gravity. To be noted, a conveyance member may be further provided in paths of the discharge ports 8016 to help the toner movement in accordance with the gravity.

The developing unit 802 positioned in a lower portion of the process cartridge 20 includes openings 8021 (FIG. 6B) that receive the toner discharged through the discharge ports 8016. Unillustrated sealing members are provided between the discharge ports 8016 and the openings 8021 such that the toner does not leak through a gap between the discharge ports 8016 and the openings 8021.

The toner having fallen into the toner receiving unit 801 from the toner pack 40 through the replenishment port 8012 is conveyed in the toner receiving unit 801 by the first conveyance member 8013, the second conveyance member 8014, and the third conveyance member 8015. Then, the toner is delivered from the toner receiving unit 801 to the developing unit 802 through the discharge ports 8016 and openings 8021 provided at the two end portions in the longitudinal direction. In this manner, the toner supplied through the replenishment port 8012, which is positioned at an end portion of the process cartridge 20 in the longitudinal direction and away from the developer container 32 in the horizontal direction as viewed in the longitudinal direction, is conveyed in the process cartridge 20 and reaches the developer container 3012.

As described above, the toner storage portion 8011 of the toner receiving unit 801 and the developer container 32 of the developing unit 802 communicate with each other, and thus constitute a storage container defining a space to store the toner in the process cartridge 20. Therefore, in the present embodiment, the replenishment port 8012 for replenishing toner from the outside is provided as a part of the storage container of the process cartridge 20. However, a replenishment port directly connected to the replenishment container may be provided in the printer body, and the process cartridge may receive the toner through this replenishment port. In this case, a part of the process cartridge 20 excluding the replenishment port is detachable from the image forming apparatus 1 as illustrated in FIG. 3.

The toner supplied to the developing unit 802 through the openings 8021 is stored in a conveyance chamber 36 formed in the developer container 32 constituted by a frame member of the developing unit 802 (FIGS. 6A and 6B). To be noted, the frame member constituting the developer container 32 may be constituted by a single member or a combination of a plurality of members. Here, an agitation member 34 is provided in the conveyance chamber 36. The agitation member 34 includes a shaft member 34a provided near the rotation center of the agitation member 34, and a blade portion 34b extending in the radial direction from the shaft member 34a. In section view, toner within the rotation trajectory of the distal end of the blade portion 34b is pushed and moved in accordance with the movement of the blade portion 34b. The toner replenished through the openings 8021 is conveyed toward the developing roller 31, the supply roller 33, and the developing blade 35 while being agitated by the agitation member 34.

The cleaning unit 803 includes a fourth conveyance member 8031, a fifth conveyance member 8032, and a waste toner chamber 8033 constituted by a frame member (FIGS. 6A and 6B). To be noted, the frame member constituting the waste toner chamber 8033 may be made up of a single member or a combination of a plurality of members. The waste toner chamber 8033 is a space for storing collected matter (so-called waste toner) such as transfer residual toner collected from the photosensitive drum 21 by the cleaning blade 24, and is independent from the inner spaces of the toner receiving unit 801 and the developing unit 802. The waste toner collected by the cleaning blade 24 is conveyed in an arrow M direction by the fourth conveyance member 8031 and the fifth conveyance member 8032, and is gradually accumulated starting from a rear portion 8033a of the waste toner chamber to the front side.

Here, a laser passing space SP that is a gap which the laser light L emitted from the scanner unit 11 (FIG. 1A) toward the photosensitive drum 21 can pass through is defined between the cleaning unit 803 and the developing unit 802 (FIG. 6A). As described above, the discharge ports 8016 and the openings 8021 for delivering the toner from the toner receiving unit 801 to the developing unit 802 are provided at end portions of the respective units in the longitudinal direction. Therefore, toner replenished from the outside of the image forming apparatus 1 (particularly through the replenishment port opening in the upper surface of the apparatus) can be conveyed to the developer container 32 provided in a lower portion of the process cartridge 20 while securing the laser passing space SP in a configuration of a small size as the whole of the process cartridge 20.

(1-5) Configuration of Toner Pack

Figure 7A:
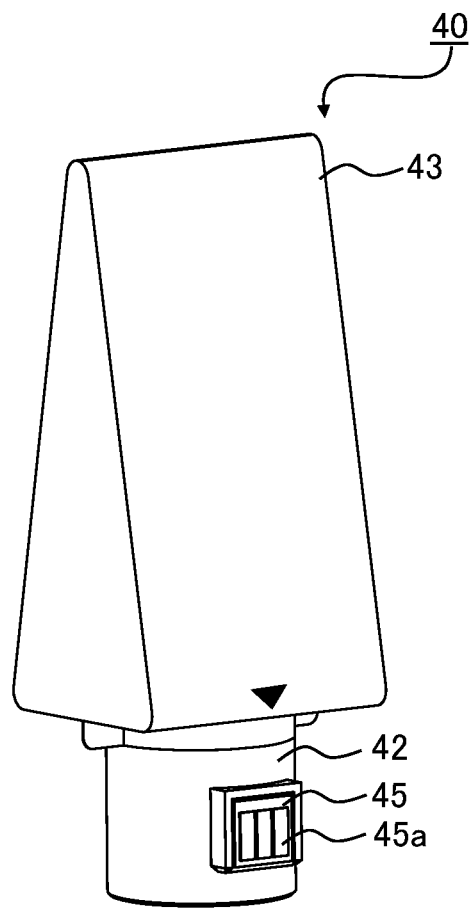
FIG. 7A is a perspective view of the toner pack according to the first embodiment.
Figure 7B:
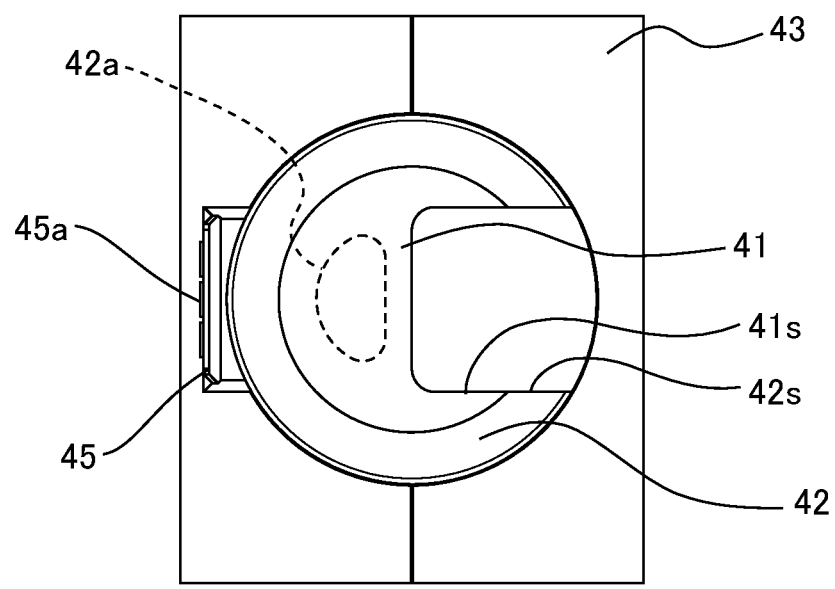
FIG. 7B is a side view of the toner pack according to the first embodiment.
Figure 8A:
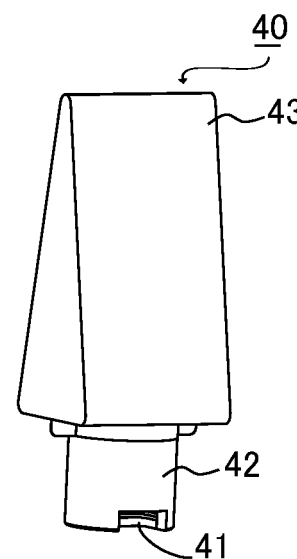
FIG. 8A is a perspective view of the toner pack according to the first embodiment.
Figure 8B:
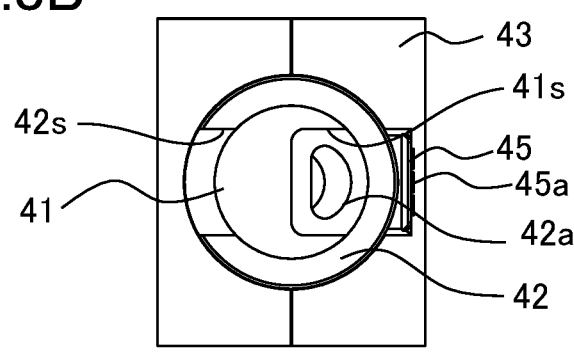
FIG. 8B is a side view of the toner pack according to the first embodiment.
Figure 8C:
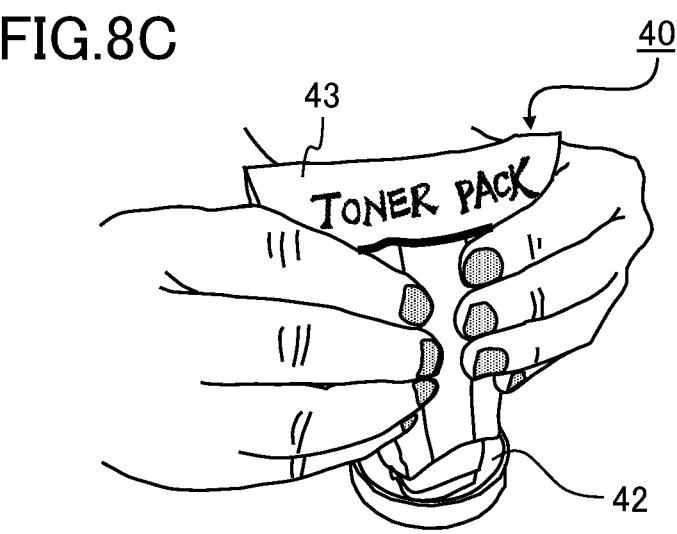
FIG. 8C is a diagram illustrating how toner is discharged from the toner pack according to the first embodiment.

The configuration of the toner pack 40 will be described. FIG. 7A is a perspective view of the toner pack 40 in a state in which a shutter member 41 is closed, and FIG. 7B is a bottom view thereof. FIG. 8A is a perspective view of the toner pack 40 in a state in which the shutter member 41 is open, FIG. 8B is a bottom view thereof, and FIG. 8C illustrates how the user squeezes the toner pack 40 with hands when replenishing toner. In addition, FIG. 12 is a perspective view of the toner pack 40 in the state in which the shutter member 41 is closed as viewed from below.

As illustrated in FIGS. 7A to 8C, the toner pack 40 serving as an example of a replenishment container includes a bag member 43 filled with toner, a discharge portion 42 formed from resin and attached to the bag member 43, and the shutter member 41 capable of opening and closing an opening portion of the discharge portion 42. In addition, a memory unit 45 serving as a storage means (storage portion) that stores information of the toner pack 40 is attached to the discharge portion 42. The memory unit 45 includes, as a contact portion 45a that comes into contact with a contact portion 70133 (see FIGS. 9A and 9B) of the replenishment container attaching portion 701 that will be described later, a plurality of metal plates (metal terminals) exposed to the outside of the toner pack 40. In addition, as a material of the bag member 43, PP resin (polypropylene), PET resin (polyethylene terephthalate), cardboards, paper, and so forth can be employed. In addition, the thickness can be set to 0.01 mm to 1.2 mm. In addition, 0.05 mm to 1.0 mm is further preferable from the viewpoint of squeezability for the user and the durability of the bag.

Figure 12:
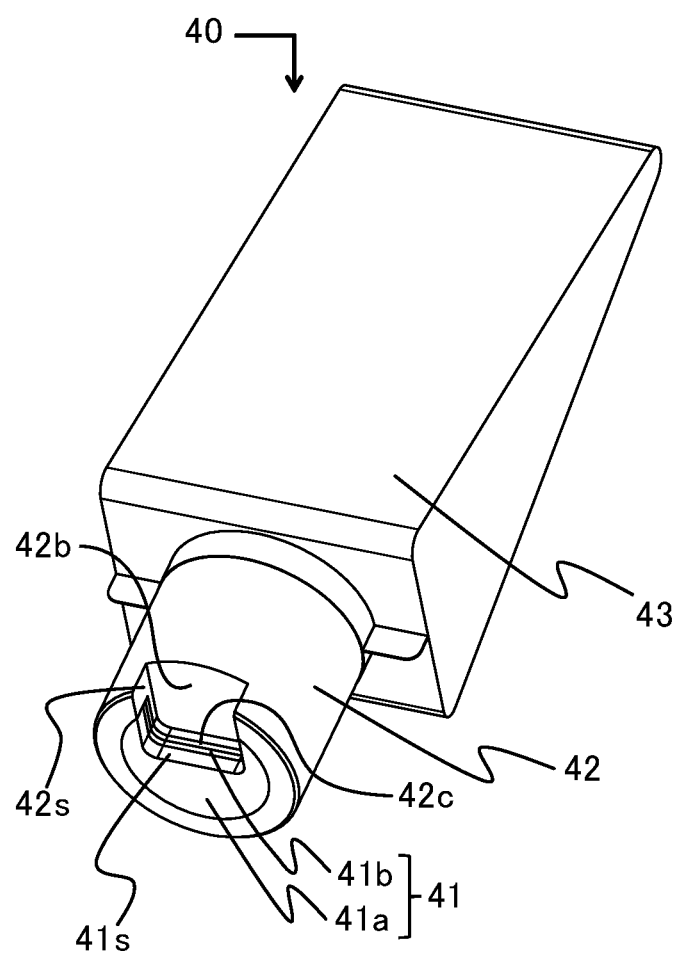
FIG. 12 is a perspective view of the toner pack according to the first embodiment.

As illustrated in FIGS. 7B, 8B, and 12, the shutter member 41 has a shape obtained by cutting out a part of a disk relatively rotatable with respect to the discharge portion 42. A side surface making up the thickness of the shutter member 41 at the cutout portion functions as an engagement surface 41s. Meanwhile, the discharge portion 42 also has a shape having a cutout portion therein. The cutout portion of the discharge portion 42 includes an engagement surface 42s parallel to the engagement surface 41s. Further, a discharge port 42a is provided at a position at approximately 180° from the engagement surface 42s in the circumferential direction of the discharge port 42a. To be noted, details of the engagement surface 41s and 42s are illustrated in FIG. 12.

As illustrated in FIGS. 7B and 12, when the positions of the cutouts of the shutter member 41 and the discharge portion 42 as viewed from above or below are aligned, the discharge port 42a is covered by the shutter member 41 (closed state). As illustrated in FIG. 8B, when the shutter member 41 rotates by 180° with respect to the discharge portion 42, the discharge port 42a is exposed through the cutout portion of the shutter member 41, and the inner space of the bag member 43 communicates with a space outside the toner pack 40. To be noted, as illustrated in FIG. 12, the shutter member 41 preferably has a structure in which a sealing layer 41b formed from an elastic material such as a sponge is stuck on a body portion 41a having stiffness. In this case, the sealing layer 41b is in firm contact with a sealing layer 42c covering a peripheral edge portion of the discharge port 42a in the closed state, and thus toner leakage can be suppressed. The sealing layer 42c is illustrated in FIG. 12, and is formed from an elastic material such as a sponge similarly to the sealing layer 41b.

As will be described later, when replenishing the image forming apparatus 1 with toner from the toner pack 40, the toner pack 40 is inserted in and coupled to the replenishment container attaching portion 701 by aligning the discharge portion 42 with a predetermined position. Then, when the discharge portion 42 is rotated by 180°, the discharge portion 42 relatively rotates with respect to the shutter member 41 to open the discharge port 42a, and the toner in the bag member 43 falls into the toner receiving unit 801 in accordance with the gravity. At this time, the shutter member 41 does not relatively move with respect to the replenishment container attaching portion 701.

As illustrated in FIG. 8C, the user squeezes the bag member 43 in the state in which the toner pack 40 is attached to the replenishment container attaching portion 701 and rotated by 180°, and thus can promote discharge of toner from the toner pack 40.

To be noted, although the shutter member 41 of a rotary type has been described as an example herein, the shutter member may be omitted, and a shutter member of a slide type may be used instead of the shutter member 41 of a rotary type. In addition, the shutter member 41 may be configured to be broken by attaching the toner pack 40 to a replenishment port 8012 or rotating the toner pack 40 in an attached state, or may have a detachable lid structure such as a sticker.

In addition, it is preferable that a protective cap is attached to the discharge portion 42 of an unused toner pack 40 such that toner does not leak during transport or the like. For example, the protective cap engages with the cutout portions of the shutter member 41 and the discharge portion 42 in a state of being attached to the discharge portion 42 so as to restrict relative rotation of the shutter member 41 and the discharge portion 42. By removing the protective cap, it becomes possible for the user to attach the toner pack 40 to the replenishment container attaching portion 701.

(1-6) Configuration of Replenishment Container Attaching Portion

Figure 9A:
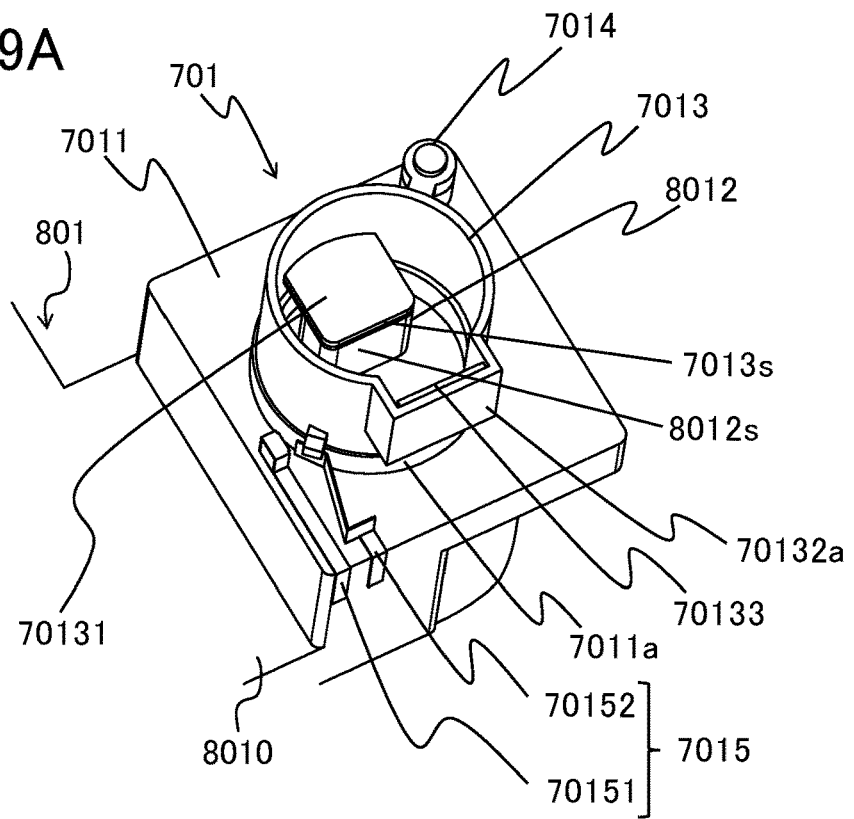
FIG. 9A is a perspective view of a replenishment container attaching portion according to the first embodiment.
Figure 9B:
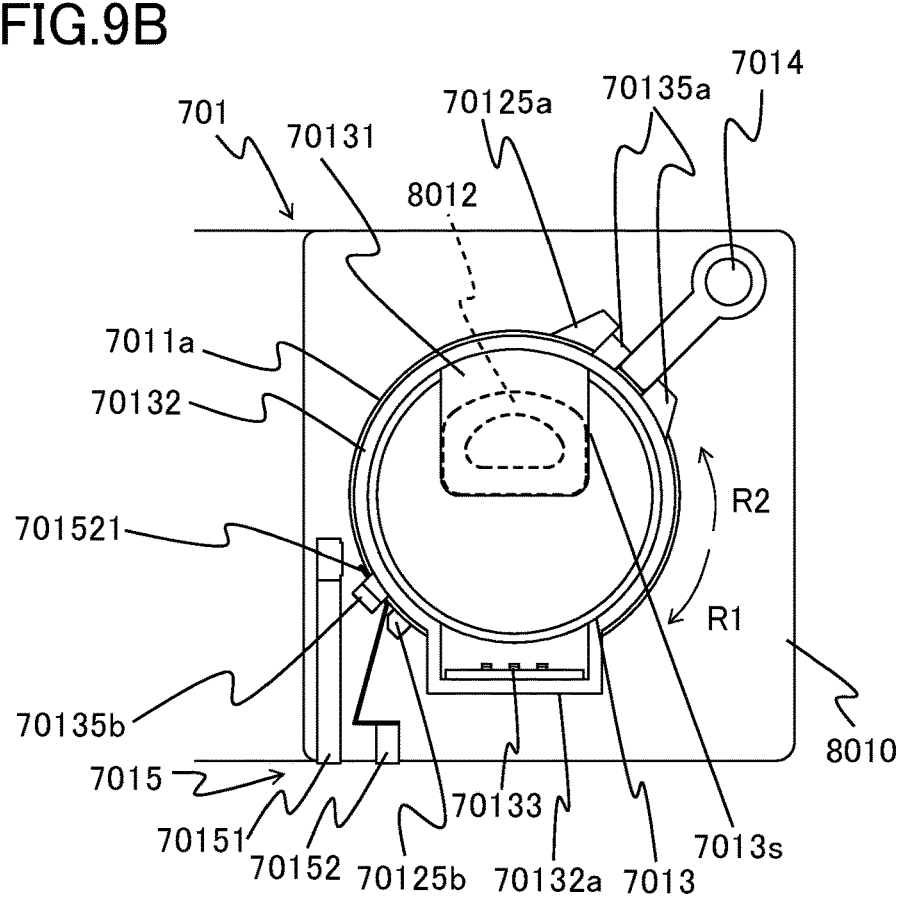
FIG. 9B is a top view of the replenishment container attaching portion according to the first embodiment.

A shutter opening/closing mechanism of the toner pack 40 and the toner receiving unit 801, and a locking mechanism of the shutter member 41 will be described. FIG. 9A is a perspective view of the replenishment container attaching portion 701, and FIG. 9B is a top view of the replenishment container attaching portion 701. The replenishment container attaching portion 701 includes the replenishment port 8012, a replenishment port shutter 7013, a locking member 7014, and a rotation detection portion 7015.

The replenishment port 8012 is an opening portion communicating with the toner storage portion 8011 (see FIGS. 6A to 6C) of the toner receiving unit 801, and is fixed to the frame member 8010 of the toner receiving unit 801. The replenishment port shutter 7013 includes a lid portion 70131 covering the replenishment port 8012, a cylindrical portion 70132 that receives the discharge portion 42 of the toner pack 40, and the contact portion 70133 connected to the contact portion 45a (see FIG. 8B) of the memory unit 45 of the toner pack 40. In the diagram, a part of the cylindrical portion 70132 covering the contact portion 70133 is indicated as a cylindrical portion 70132a. The replenishment port shutter 7013 is a member in which the lid portion 70131, the cylindrical portion 70132, and the contact portion 70133 are integrated, and is rotatably attached to the frame member 8010 of the toner receiving unit 801. Each conductor exposed on the contact portion 70133 is electrically connected to a control portion of the image forming apparatus 1 incorporated in the printer body 100, via wiring provided in the process cartridge 20 and contacts between the process cartridge 20 and the printer body 100.

The rotation detection portion 7015 serving as a rotation detection sensor is a mechanism that detects the rotation of the replenishment port shutter 7013. The rotation detection portion 7015 of the present embodiment is constituted by two conductive flat springs 70151 and 70152. The flat spring 70152 springs in a clockwise direction, and when pressed by a projection portion 70135a provided on an outer periphery of the replenishment port shutter 7013, comes into contact with the flat spring 70151 at a distal end portion 701521. That is, the rotation detection portion 7015 is an electric circuit configured such that a connected state and disconnected state thereof switch in accordance with the rotation angle (rotational position) of the replenishment port shutter 7013. As will be described later, a control portion 90 (FIG. 19) of the image forming apparatus 1 recognizes whether or not the discharge port 42a of the toner pack 40 communicates with the replenishment port 8012 of the replenishment container attaching portion 701, on the basis of whether the rotation detection portion 7015 is in the connected state or the disconnected state. In other words, the control portion 90 can determine that the replenishment operation by the user using the toner pack 40 has been normally performed at least up to the communication between the discharge port 42a and the replenishment port 8012.

A plurality of projection portions 70135a and 70135b are provided at the outer peripheral portion of the cylindrical portion 70132 of the replenishment port shutter 7013. In addition, a plurality of projection portions 70125a and 70125b are also provided in a portion (cylindrical portion 7011a of 7011) of the frame member 8010 supporting the cylindrical portion 70132. The plurality of projection portions 70125a and 70125b are positioned below the projection portion 70135a (right side in FIG. 10A) in the gravity direction. The projection portion 70125b allows passage of the projection portion 70135a (right side in FIG. 10A) by rotational movement. In contrast, the projection portion 70135a (left side in FIG. 10A) extends downward to the same height as the projection portion 70135a (right side in FIG. 10A) so as to overlap with the projection portion 70125a and the projection portion 70125b. Therefore, the projection portion 70125b abuts the projection portion 70135a (left side in FIG. 10A) to restrict the rotational movement of the projection portion 70135a (left side in FIG. 10A) depending on the rotation angle (rotational position) of the replenishment port shutter 7013.

In addition, before the replenishment port shutter 7013 rotates in an R1 direction, the projection portion 70125a abuts the projection portion 70135a (left side), and restricts the rotational movement of the projection portion 70135a in an R2 direction. In addition, the projection portion 70135a (right side in FIG. 10A) abuts the locking member 7014, and restricts the rotational movement of the locking member 7014 in the R1 direction. In contrast, after the replenishment port shutter 7013 rotates in the R1 direction, the projection portion 70135b abuts the locking member 7014 having moved to a locking position, and restricts the rotational movement of the locking member 7014 in the R2 direction. In addition, the projection portion 70135a (right side in FIG. 10A) abuts the projection portion 70125b, and restricts further rotational movement of the projection portion 70135a in the R1 direction. To be noted, the rotation direction of the replenishment port shutter 7013 is the R1 direction when attaching the toner pack 40, and is the R2 direction when detaching the toner pack 40.

Figure 11A:
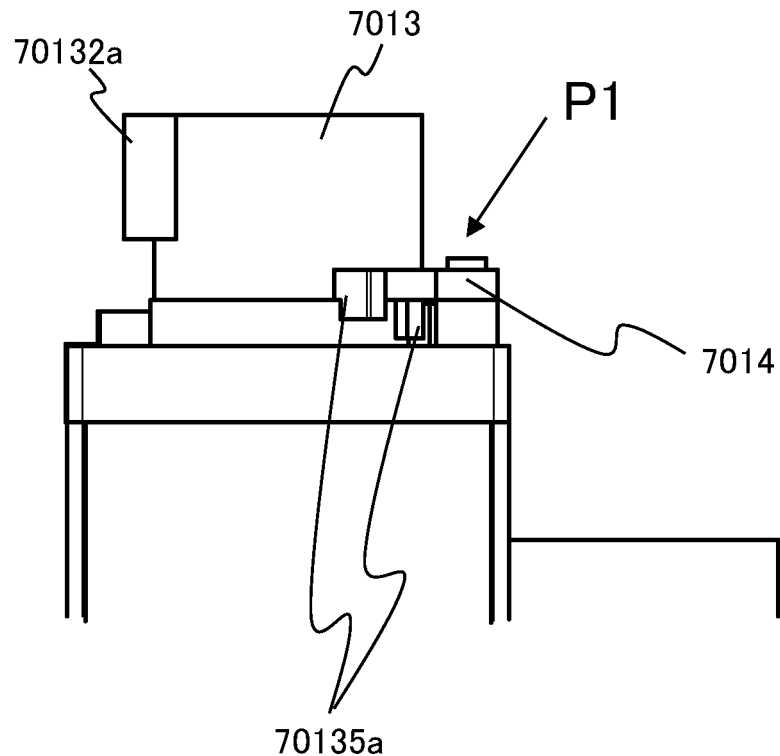
FIG. 11A is a diagram illustrating a position of a locking member according to the first embodiment.
Figure 11B:
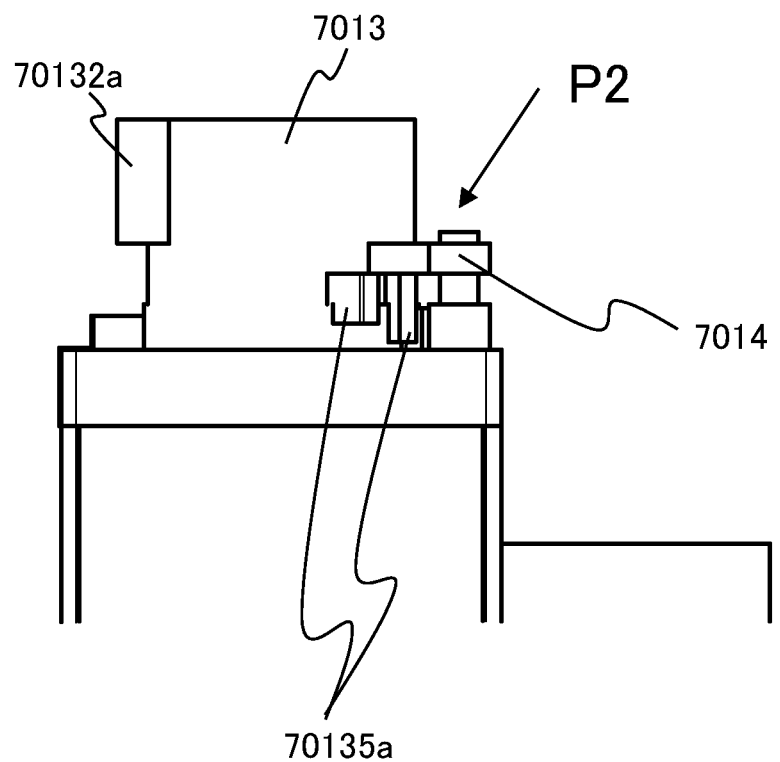
FIG. 11B is a diagram illustrating a position of the locking member according to the first embodiment.

The locking member 7014 is a member that restricts the rotation of the replenishment port shutter 7013. FIG. 11A illustrates a state in which the locking member 7014 is at a locking position P1, and FIG. 11B illustrates a state in which the locking member 7014 is at a lock releasing position P2. The locking member 7014 is capable of transitioning between the locking position (restricting position) P1 and the lock releasing position (allowing position) P2 by moving in the up-down direction. As illustrated in FIGS. 9B and 11A, when the locking member 7014 abuts the projection portion 70135a of the replenishment port shutter 7013 at the locking position P1, the rotation of the replenishment port shutter 7013 is restricted. When the locking member 7014 moves to the lock releasing position P2 as illustrated in FIG. 11B, the locking member 7014 retracts from a movement trajectory of the projection portion 70135a in the rotation of the replenishment port shutter 7013, and thus the rotation of the replenishment port shutter 7013 is permitted.

(1-7) Pressing Mechanism of Locking Member

Figure 13:
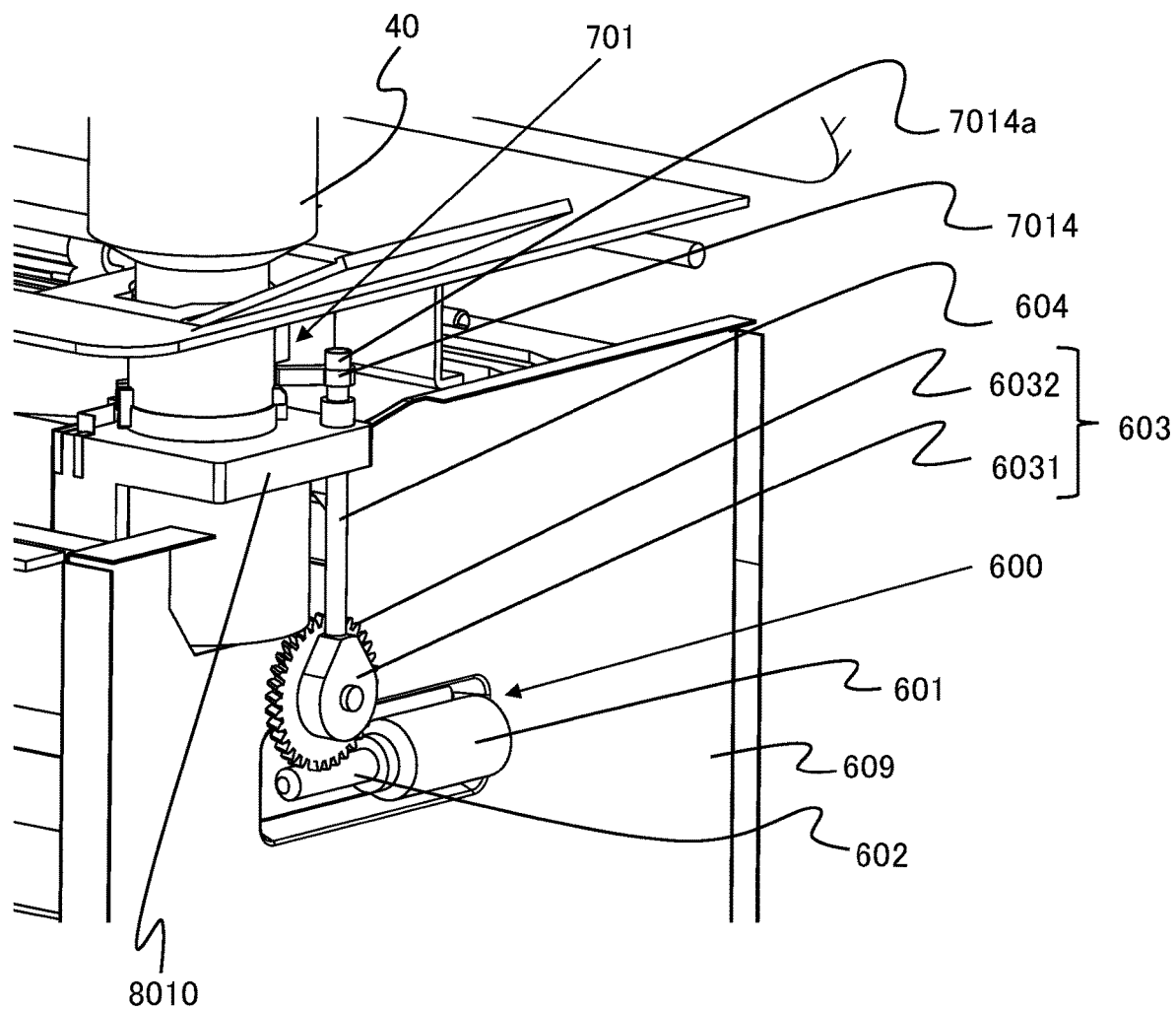
FIG. 13 is a diagram illustrating a pressing mechanism of the locking member according to the first embodiment.

FIG. 13 illustrates a pressing mechanism 600 that moves the locking member 7014 between the locking position and the lock releasing position. The pressing mechanism 600 is constituted by a motor 601, an input gear 602, a cam gear 603, and an advancing/retracting pin 604. The input gear 602 is a screw gear attached to an output shaft of the motor 601. The cam gear 603 includes a gear portion 6032 constituted by a helical gear that engages with the input gear 602, and a cam portion 6031 for reciprocating the advancing/retracting pin 604.

The advancing/retracting pin 604 is supported by a holding member so as to be capable of linearly moving in the gravity direction and an opposite direction (vertical direction) thereof. When the motor 601 rotates, the cam gear 603 rotates via the input gear 602, the advancing/retracting pin 604 reciprocates in the up-down direction by being pressed by the cam portion 6031, and in accordance with this, the locking member 7014 also moves in the up-down direction between the locking position and the lock releasing position. FIG. 13 illustrates a locked state.

To be noted, although the drive transmission configuration of the pressing mechanism 600 of the present embodiment is constituted by a combination of a helical gear and a screw gear, this is not limiting as long as the configuration can convert the rotation of the motor into a linear motion. For example, a bevel gear may be used, or a configuration in which the input gear 602 is omitted and the cam gear 603 is directly driven by the motor 601 may be employed. In addition, an actuator such as a solenoid that outputs linear motion may be used as a drive source instead of the motor 601.

In addition, each member constituting the pressing mechanism 600 illustrated in FIG. 13 is supported by a frame member 609 of the printer body. In contrast, a pivot shaft 7014a of the locking member 7014 is supported by a holding portion provided in a frame member 8010 of the toner receiving unit 801 so as to be pivotable and slidable in the vertical direction. Therefore, when replacing the process cartridge 20, the locking member 7014 is also replaced at the same time, and the pressing mechanism 600 remains in the printer body. The pivot shaft 7014a and the advancing/retracting pin 604 are formed as different members. When the locking member 7014 is at the lock releasing position, the advancing/retracting pin 604 is away from the locking member, and the process cartridge 20 is detached from the body while the advancing/retracting pin 604 remains in the body. However, this configuration is not limiting, and for example, the pivot shaft 7014a of the locking member 7014 may be supported by the printer body.

(1-8) Procedure of Replenishment Operation Using Toner Pack

Figure 10A:
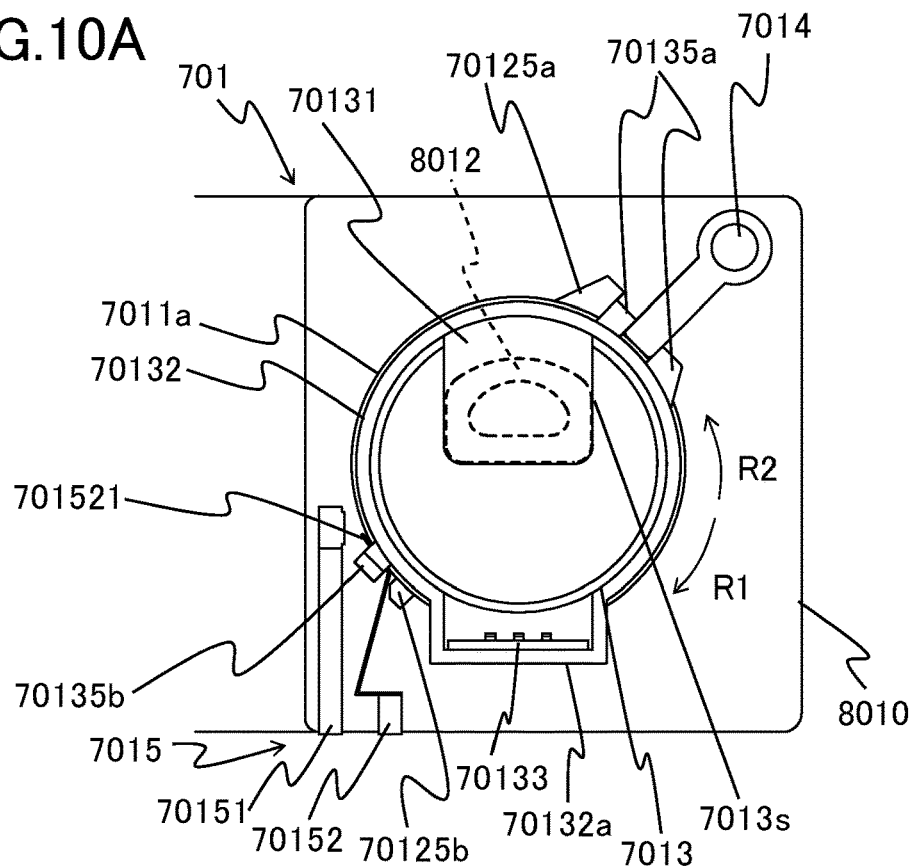
FIG. 10A is a diagram for describing an operation of the replenishment container attaching portion according to the first embodiment.
Figure 10B:
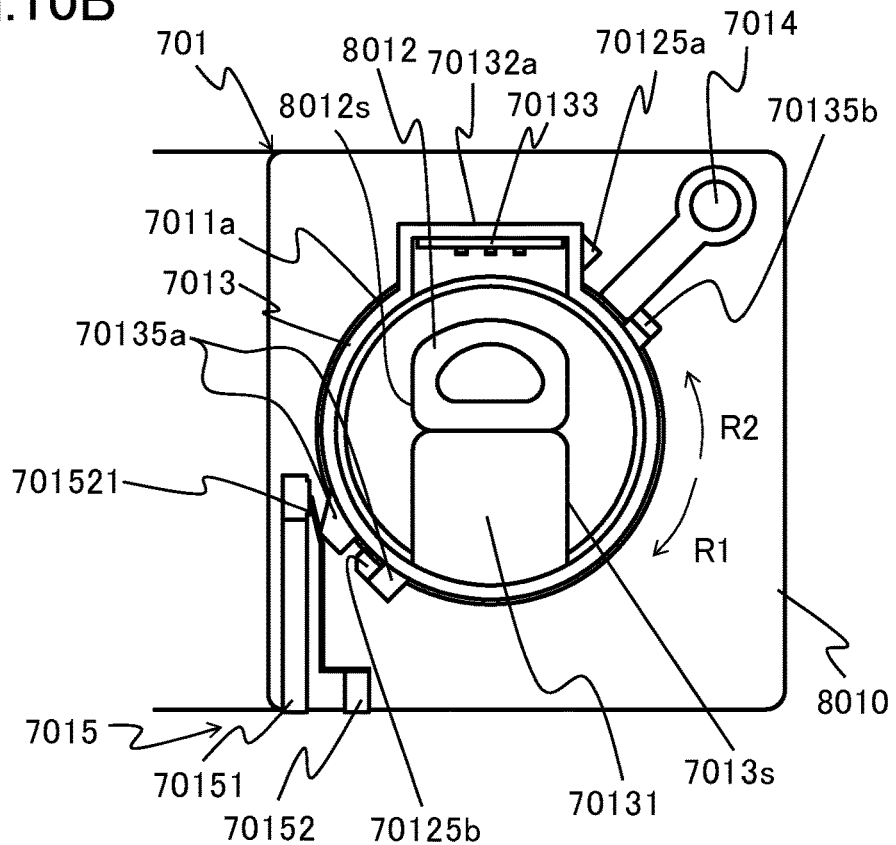
FIG. 10B is a diagram for describing the operation of the replenishment container attaching portion according to the first embodiment.

A procedure of the operation performed when detaching the toner pack 40 after attaching the toner pack 40 to the replenishment container attaching portion 701 and replenishing toner will be described on the basis of the configuration of the toner pack 40, the replenishment container attaching portion 701, and the pressing mechanism 600 described above. FIG. 10A is a top view of the replenishment container attaching portion 701 when the replenishment port 8012 is in the closed state, and FIG. 10B is a top view of the replenishment container attaching portion 701 when the replenishment port 8012 is in the open state.

As illustrated in FIG. 10A, the replenishment port shutter 7013 in the closed state is fixed so as to be unrotatable with respect to the replenishment port 8012 by the projection portion 70135a abutting the locking member 7014 positioned in the locking position in the rotation direction. At this time, the lid portion 70131 of the replenishment port shutter 7013 completely blocks the replenishment port 8012. In addition, the flat springs 70151 and 70152 of the rotation detection portion 7015 are separated from each other, and the rotation detection portion 7015 is in the disconnected state.

Figure 9C:
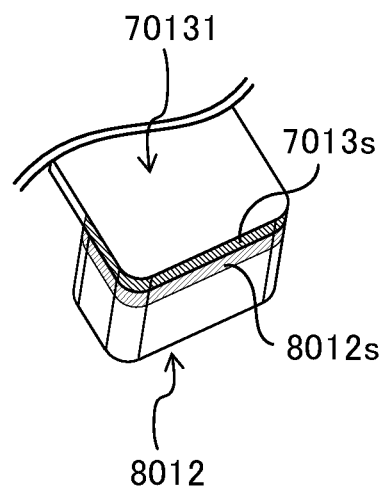
FIG. 9C is an enlarged view of the replenishment container attaching portion according to the first embodiment.

When inserting the toner pack 40 in the replenishment container attaching portion 701, the user aligns the cutout portions (FIG. 12) of the discharge portion 42 of the toner pack 40 and the shutter member 41 with the replenishment port 8012 and the lid portion 70131 of the replenishment port shutter 7013 and inserts the toner pack 40. In this case, the engagement surface 42s of the discharge portion 42 engages with an engagement surface 7013s (see FIG. 9C), which is a side surface of the lid portion 70131, and the engagement surface 41s of the shutter member 41 engages with an engagement surface 8012s (see FIG. 9C), which is provided on an outer peripheral portion of the replenishment port 8012. At this time, the discharge portion 42 engaging with the lid portion 70131 of the replenishment port shutter 7013 is unrotatable until the lock of the replenishment port shutter 7013 by the locking member 7014 is released later, and becomes rotatable together with the replenishment port shutter 7013 after the release of the lock. In addition, the shutter member 41 of the toner pack 40 is in an unrotatable state by engaging with the replenishment port 8012 fixed to the frame member 8010 of the toner receiving unit 801. To be noted, as a different engagement mechanism of the lid portion 70131 and the discharge portion 42, a projection portion projecting upward may be provided on the upper surface of the lid portion 70131 and a recess portion that engages with this projection portion may be provided on a lower surface 42b (see FIG. 12) of the discharge portion 42.

In addition, by inserting the toner pack 40, the contact portion 45a (FIG. 7) of the memory unit 45 comes into contact with the contact portion 70133 of the replenishment container attaching portion 701, and information stored in the memory unit 45 is read by the control portion 90 of the image forming apparatus. The memory unit 45 stores information (brand-new product flag) indicating whether or not toner is in the toner pack 40 (whether or not the toner pack has been already used). When the control portion 90 reads the brand-new product flag and determines that the toner pack 40 currently attached includes toner (is not used), the control portion 90 controls the pressing mechanism 600 to push up the locking member 7014. As a result of this, the locking member 7014 moves from the locking position P1 to the lock releasing position P2 (FIG. 11B).

In the state in which the locking member 7014 has moved to the lock releasing position P2, the locking member 7014 is separated from the projection portion 70135a of the replenishment port shutter 7013, and thus the replenishment port shutter 7013 becomes rotatable in the R1 direction of FIGS. 10A an 10B (FIG. 11B). However, since the projection portion 70125a provided on the frame member 8010 of the toner receiving unit 801 interferes with the projection portion 70135a (FIG. 10A), rotation of the replenishment port shutter 7013 in the R2 direction is restricted. That is, in FIG. 10A, 70125a and 70125b are positioned below 70135a and 70135b such that 70135a and 70135b can move and pass in the rotation direction.

When the user grabs the toner pack 40 and rotates the discharge portion 42 or a portion of the bag member 43 close to the discharge portion 42 by 180° in the R1 direction, a state illustrated in FIG. 10B is taken. The replenishment port shutter 7013 also rotates by 180° together with the discharge portion 42 of the toner pack 40, thus the lid portion 70131 moves from the position covering the replenishment port 8012, and the replenishment port 8012 is exposed. The side surface of the lid portion 70131 is pushed by the engagement surface 42s, which is a part of the discharge portion 42 that is rotating, and thus the lid portion 70131 rotationally moves together with the engagement surface 42s. In addition, as a result of the discharge portion 42 rotating by 180° in a state in which the shutter member 41 is fixed, the discharge port 42a of the toner pack 40 (FIG. 8B) is exposed, and faces the replenishment port 8012. As a result of this, the inner space of the toner pack 40 and the inner space of the toner receiving unit 801 communicate with each other through the discharge port 42a and the replenishment port 8012, and the toner stored in the bag member 43 flows down into the toner storage portion 8011.

The toner having fallen into the toner storage portion 8011 is, as described above, conveyed inside the toner receiving unit 801, reaches the developer container 32, and becomes available for a developing process. To be noted, a configuration in which the developing unit 802 can perform the developing process as long as toner of an amount required for maintaining the image quality remains in the developer container 32 even before the newly replenished toner reaches the developer container 32 may be employed. That is, a configuration in which toner can be supplied to the developer container from a replenishment container disposed outside the image forming apparatus regardless of whether or not the image forming operation by the image forming portion 10 (FIG. 1A) is being performed may be employed.

In addition, the projection portion 70125b is disposed so as to abut the projection portion 70135a of the replenishment port shutter 7013 when the replenishment port shutter 7013 is rotated by 180° in the R1 direction from the state of FIG. 10A (FIG. 10B). That is, the projection portion 70125b is also positioned below the projection portions 70135a and 70135b similarly to the projection portion 70125a. As a result of this, pivoting of the replenishment port shutter 7013 beyond 180° in the R1 direction is restricted. At the same time, the projection portion 70135a of the replenishment port shutter 7013 presses the flat spring 70152 of the rotation detection portion 7015, and the distal end portion 701521 thereof is brought into contact with the flat spring 70151. When the rotation detection portion 7015 is in the connected state, the control portion 90 recognizes that the replenishment port shutter 7013 has transitioned to the open state, and operates the pressing mechanism 600 to move the locking member 7014 again to the locking position. Then, the locking member 7014 engages with the projection portion 70135b of the replenishment port shutter 7013 to restrict the rotation in the R2 direction, and thus the replenishment port shutter 7013 and the toner pack 40 both becomes unrotatable in any direction.

Further, in the positional relationship of the state of FIG. 10B in which the discharge portion 42 of the toner pack 40 and the replenishment port shutter 7013 have been rotated by 180°, the lid portion 70131 of the replenishment port shutter 7013 covers an upper portion of the shutter member 41 of the toner pack 40. Therefore, when it is attempted to pick up the toner pack 40 from the replenishment container attaching portion 701, the shutter member 41 interferes with the lid portion 70131, and therefore the movement of the toner pack 40 is restricted. Therefore, detachment of the toner pack 40 from the replenishment container attaching portion 701 is prevented unless the user performs the detachment operation of the toner pack 40 in accordance with a predetermined procedure that will be described below.

After the start of discharge of toner from the toner pack 40, if a condition for determining that the discharge of toner has been completed is satisfied, the control portion 90 operates the pressing mechanism 600 to move the locking member 7014 to the lock releasing position. In the present embodiment, completion of the discharge of toner is determined on the basis of the time elapsed from the time point at which the rotation detection portion 7015 has transitioned to the connected state.

After the locking member 7014 has moved to the lock releasing position, the user can detach the toner pack 40 by following a procedure reversed from the procedure performed when attaching the toner pack 40. That is, the user grabs the discharge portion 42 of the toner pack 40 or a part of the bag member 43 close thereto, and rotates the grabbed part by 180° in the R2 direction, which is reversed from the time of attachment. In this case, the replenishment port shutter 7013 rotates by 180° together with the discharge portion 42, and the replenishment port 8012 is covered by the lid portion 70131 of the replenishment port shutter 7013 as illustrated in FIG. 10A. In addition, the projection portion 70135a (left side in FIG. 10A) of the replenishment port shutter 7013 abuts the projection portion 70125a, and thus the rotation of the replenishment port shutter 7013 beyond 180° in the R2 direction is restricted.

In the state in which the discharge portion 42 of the toner pack 40 has been rotated by 180° in the R2 direction, the position of the cutout portion of the discharge portion 42 and the position of the cutout portion of the shutter member 41 are aligned (FIG. 12). Therefore, even if the toner pack 40 is moved upward, the shutter member 41 does not interfere with the lid portion 70131 of the replenishment port shutter 7013, and therefore the user can detach the toner pack 40 from the replenishment container attaching portion 701 by grabbing and lifting the toner pack 40.

To be noted, in the course of rotating the replenishment port shutter 7013 by 180° in the R2 direction, the projection portion 70135a is separated from the flat spring 70152, and the rotation detection portion 7015 returns to the disconnected state. Then, the control portion 90 recognizes that the replenishment port shutter 7013 has transitioned to the closed state, and operates the pressing mechanism 600 to move the locking member 7014 to the locking position. As a result of this, the replenishment container attaching portion 701 transitions back to the initial state as before the toner replenishment operation is performed. For example, the control portion 90 may determine that a predetermined condition to move the locking member 7014 to the lock releasing position is satisfied when a predetermined time has elapsed after the rotation detection portion 7015 has transitioned to the connected state. To be noted, the trigger for moving the locking member 7014 to the locking position may be, for example, loss of conduction between the contact portion 70133 of the replenishment container attaching portion 701 and the contact portion 45*a* (see FIGS. 7A and 7B) of the toner pack caused by detachment of the toner pack 40 from the replenishment container attaching portion 701.

Although the positional relationship is set such that the discharge port 42*a* of the toner pack 40 and the replenishment port 8012 communicate with each other after the rotation by 180° in the present embodiment, the rotation angle required for the communication may be changed as long as the detachment of the toner pack 40 is made possible by an operation similar to that of the present embodiment.

(1-9) Panel

Next, a panel 400 will be described. For example, the panel 400 is provided on the front surface of the casing of the printer body 100 as illustrated in FIGS. 1B and 14A to 14C. The panel 400 is an example of a display means (display device) that displays information related to the remainder amount of toner in the developer container 32 (or a remaining capacity of the developer container 32). The panel 400 is constituted by a liquid crystal panel including a plurality of indicators (indicators). In the present embodiment, three indicators 4001, 4002, and 4003 are arranged in this order from the upper side to the lower side in the vertical direction. The panel 400 indicates the amount of toner that can be added to the developer container 32 for replenishment by the display of the indicators 4001 to 4003 that changes stepwise. The control portion 90 constantly updates the display of the panel on the basis of replenishment operation completion recognition that will be described later. In addition, in the case where the completion of the replenishment operation is not reflected on the toner remainder amount, the toner remainder amount may be detected subsequently, and the display of the panel may be updated. For example, in the case where the control portion 90 has detected by an optical sensor (51*a* and 51*b*, see FIG. 6A) that actually the toner has not been sufficiently replenished after the light of the indicator 4002 has been turned on, the control portion 90 updates the display of the panel 400 by turning off the light of the indicator 4002. In addition, the lowermost indicator 4003 also indicates whether the toner in the developer container 32 is at a Low level or at an Out level. To be noted, the Low level is a level at which, although the developer container 32 needs to be replenished with toner, at least toner of an amount required for maintaining the image quality remains and the image forming operation can be still performed. The Out level is a level at which almost no toner remains in the developer container 32 and the image forming operation cannot be performed.

In the illustrated configuration example of the panel 400, lights of the three indicators 4001, 4002, and 4003 all being off indicates that the toner in the developer container 32 is at the Out level (fourth state).

Figure 14A:
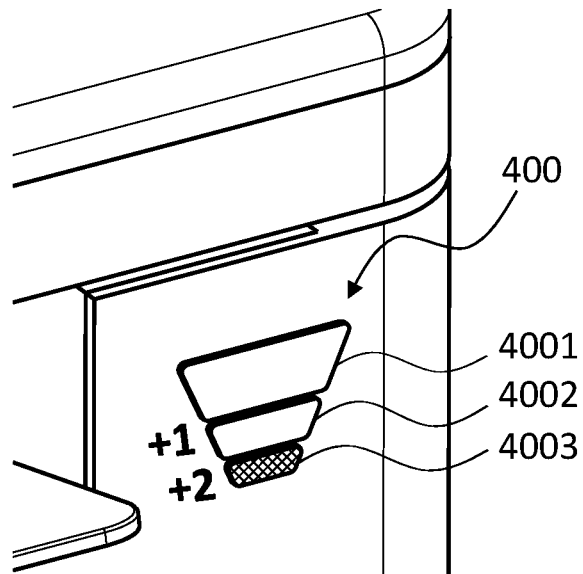
FIG. 14A is a diagram illustrating a panel according to the first embodiment.

In the case where only the light of the lower indicator 4003 is on as illustrated in FIG. 14A, it is indicated that the toner remainder amount in the developer container 32 is at the Low level. In this state, lights of two of the indicators are off, and therefore it can be seen that toner of an amount corresponding to two toner packs 40 can be added for replenishment (third state). In addition, it can be also seen that toner of an amount corresponding to two toner packs 40 can be added for replenishment from the fact that lights of number panels "+1" and "+2" next to the indicators are on.

Figure 14B:
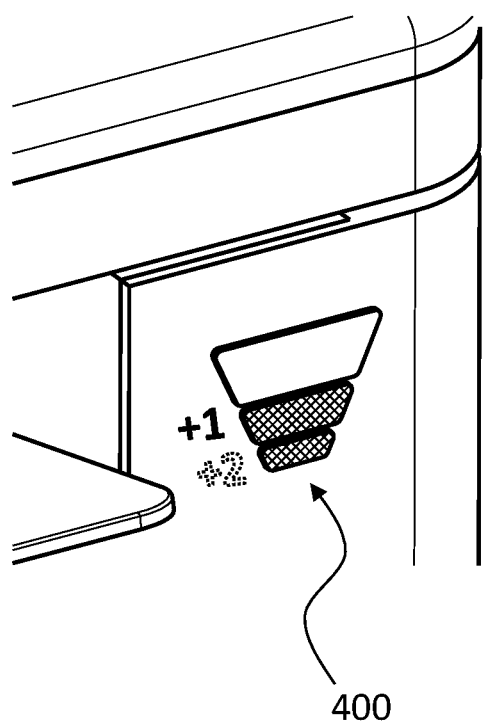
FIG. 14B is a diagram illustrating the panel according to the first embodiment.

In the case where lights of the middle and lower indicators 4002 and 4003 are on and the light of the upper indicator 4001 is off as illustrated in FIG. 14B, the toner remainder amount in the developer container 32 is larger than that of the Low level and smaller than that of a Full level (full). In this state, the light of one indicator is off, and therefore it can be seen that, for example, toner of an amount corresponding to one toner pack 40 can be added for replenishment (second state). In addition, it can be also seen that toner of an amount corresponding to one toner pack 40 can be added for replenishment from the fact that the light of the number panel "+1" next to an indicator is on and the light of the number panel "+2" is off.

Figure 14C:
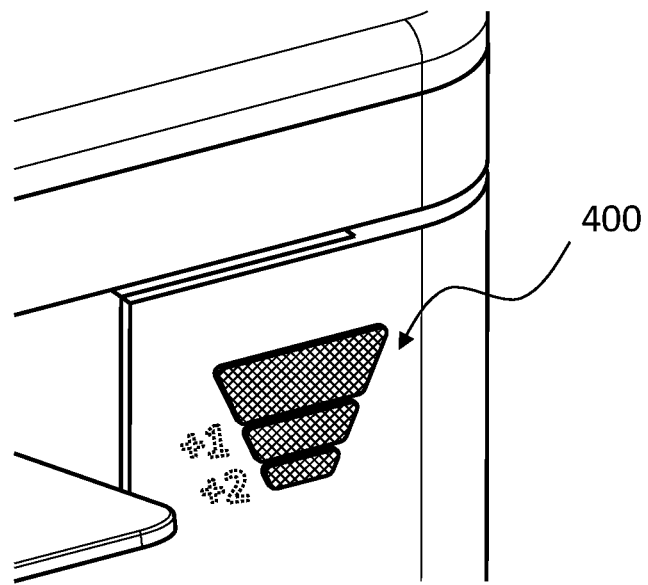
FIG. 14C is a diagram illustrating the panel according to the first embodiment.

In the case where all the three indicators 4001 to 4003 are on as illustrated in FIG. 14C, it is indicated that the toner remainder amount in the developer container 32 is at the Full level. In this state, light of no indicator is off, and therefore it can be seen that, for example, no toner can be added for replenishment from the toner pack 40 (first state). In addition, it can be also seen that no toner can be added for replenishment from the toner pack 40 from the fact that the lights of the number panels "+1" and "+2" next to the indicators are off.

To be noted, the panel 400 illustrated in FIG. 14 is an example of a display means whose display content changes in accordance with the toner remainder amount in the developer container 32, and a different configuration may be employed. For example, the panel may be constituted by a combination of a light source such as an LED or an incandescent lamp and a diffusion lens instead of a liquid crystal panel. Alternatively, a configuration in which the indicators are omitted and only the number panels are used or a configuration in which the number panels are omitted and only the indicators are used may be employed.

In addition, the number and display method of the indicators of the panel 400 may be appropriately modified. For example, the user may be prompted to replenish toner by flickering the light of the lower indicator in the case where the toner remainder amount in the developer container 32 is at the Low level.

(2) First Modification Example

Next, a first modification example in which a toner bottle unit having a bottle shape is used as another example of a replenishment container instead of the toner pack having a bag shape will be described with reference to FIGS. 15A to 15D. To be noted, this toner bottle unit is configured to be attachable to and detachable from the replenishment container attaching portion 701 described above similarly to the toner pack 40 described above. Therefore, description of elements of the image forming apparatus that are the same as in the first embodiment will be omitted.

(2-1) Configuration of Toner Bottle Unit

Figure 15A:
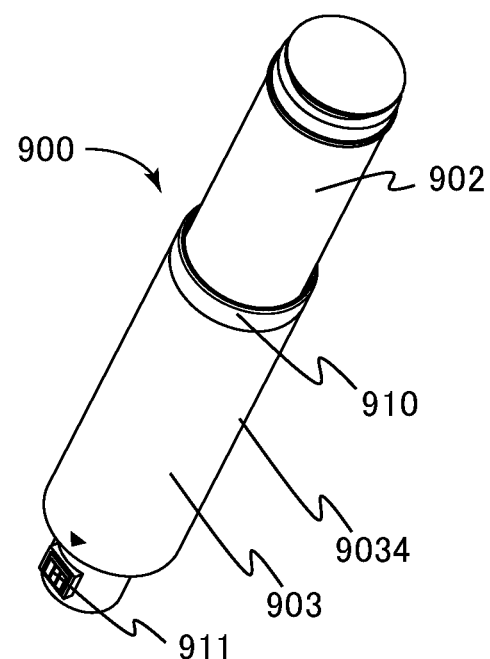
FIG. 15A is a perspective view of a toner bottle unit according to a first modification example.
Figure 15B:
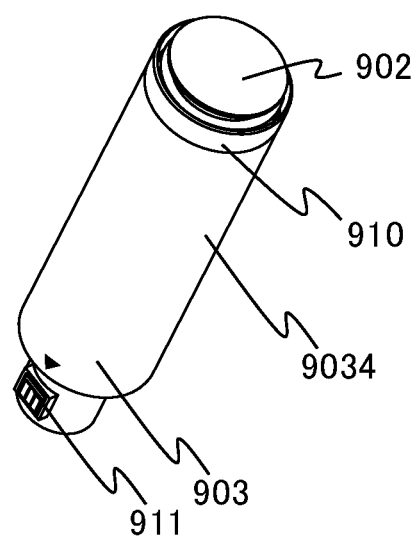
FIG. 15B is a perspective view of the toner bottle unit according to the first modification example
Figures 15C, 15D:
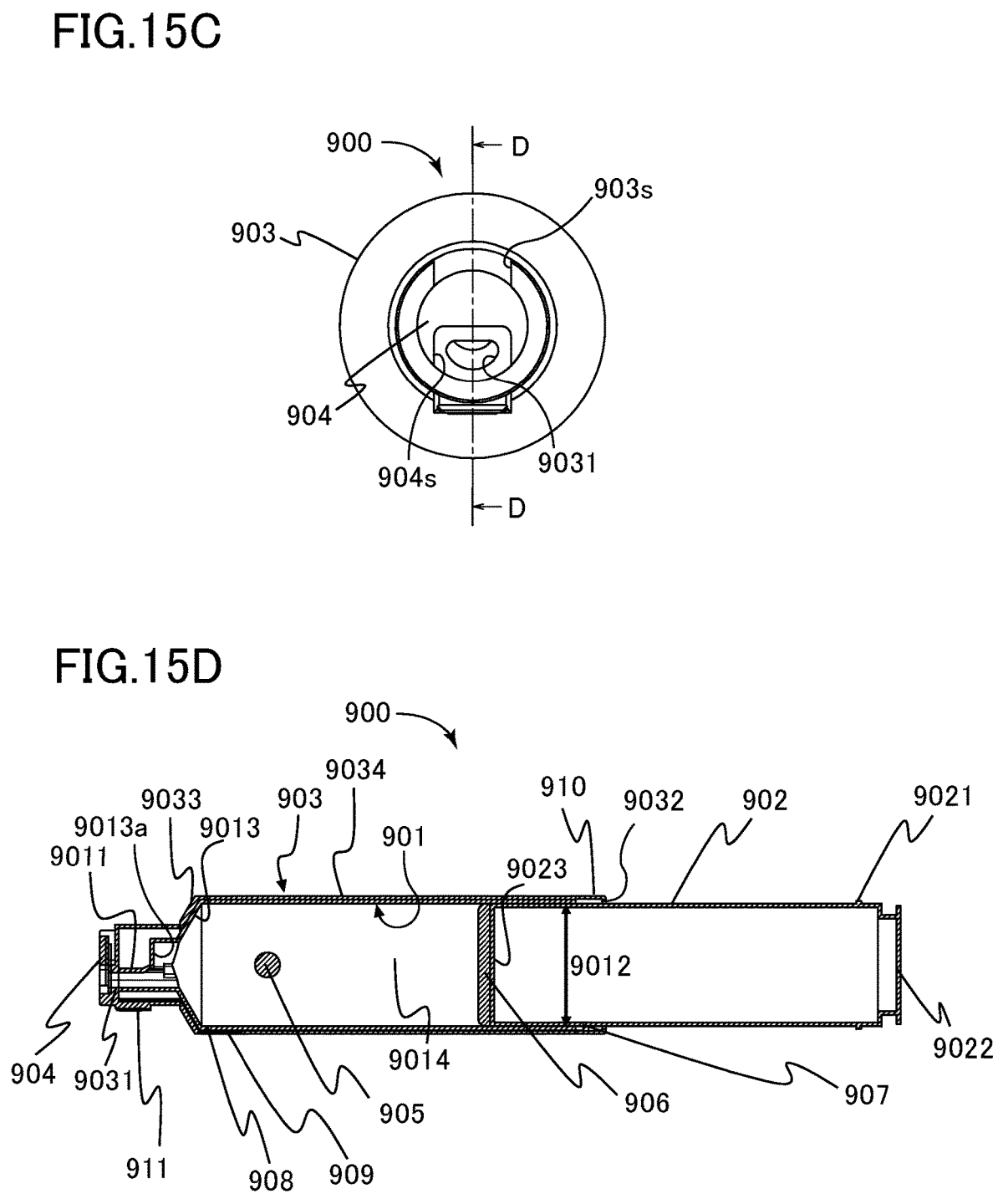

FIG. 15A is a perspective view of a toner bottle unit 900 illustrating the external appearance thereof, and FIG. 15B is a perspective view of the toner bottle unit 900 after discharge of toner. FIG. 15C is a diagram illustrating the toner bottle unit 900 as viewed from the lower side of a piston, and FIG. 15D is a section view of the toner bottle unit 900 taken along a cross-section position D-D of FIG. 15C.

Figure 16A:
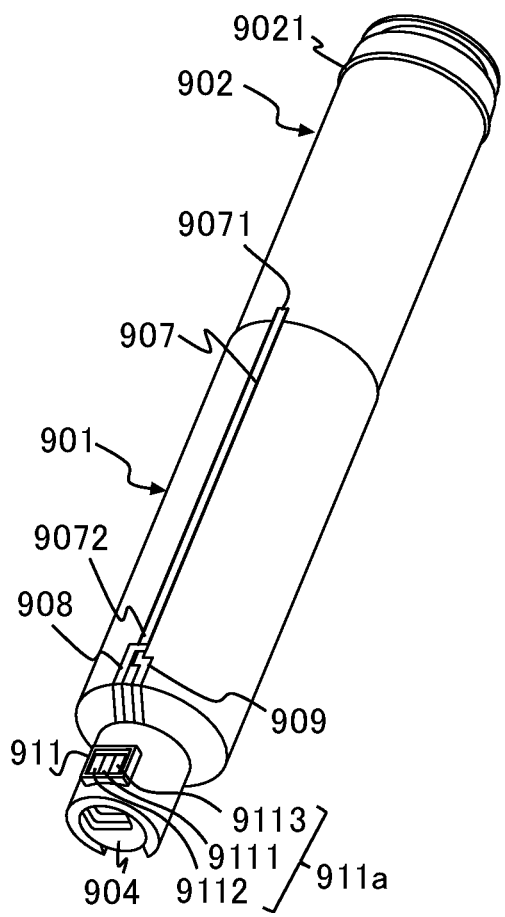
FIG. 16A is a diagram for describing an inner configuration of the toner bottle unit according to the first modification example.
Figure 16B:
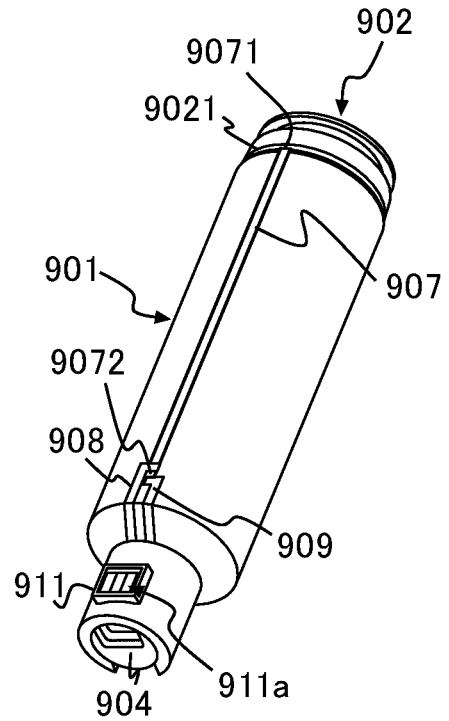
FIG. 16B is a diagram for describing the inner configuration of the toner bottle unit according to the first modification example.
Figure 16C:
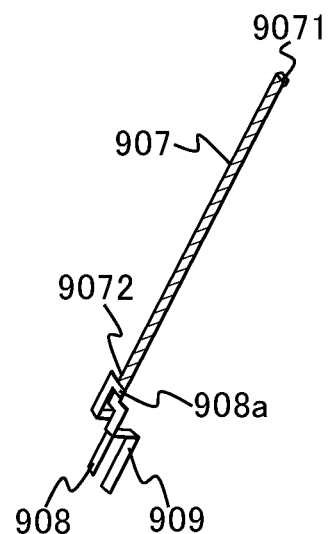
FIG. 16C is a diagram for describing the inner configuration of the toner bottle unit according to the first modification example.
Figure 16D:
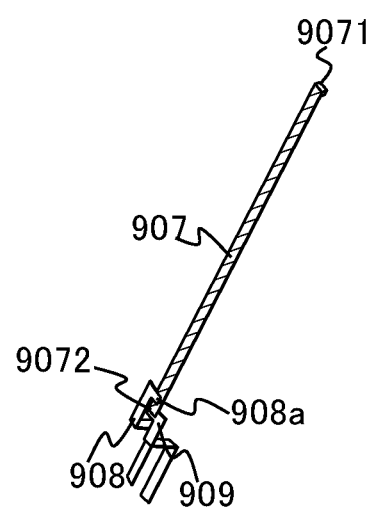
FIG. 16D is a diagram for describing the inner configuration of the toner bottle unit according to the first modification example.
Figure 16E:
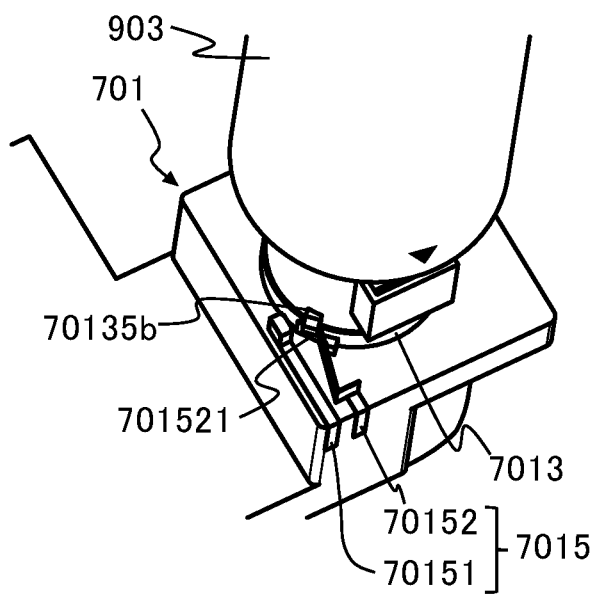
FIG. 16E is a diagram for describing detection of rotation of the toner bottle unit according to the first modification example.
Figure 16F:
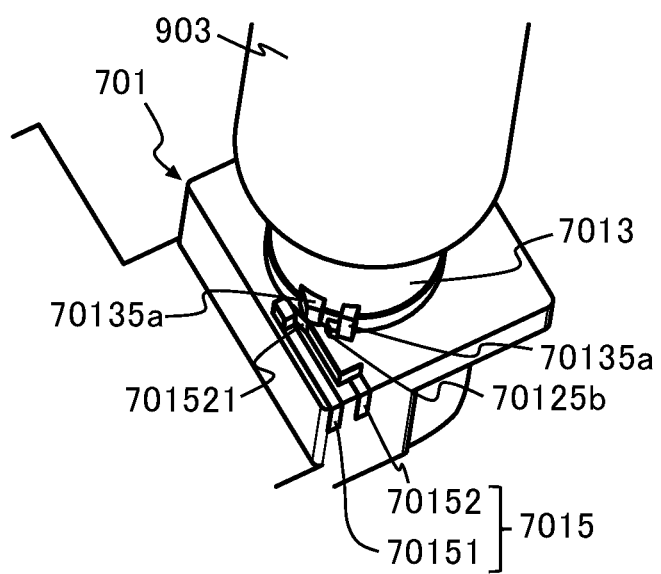
FIG. 16F is a diagram for describing detection of rotation of the toner bottle unit according to the first modification example.

In addition, FIG. 16A is a perspective view of the toner bottle unit 900 in which illustration of an outer cylinder 903 (see FIG. 15A) is omitted, and FIG. 16B is a perspective view of the toner bottle unit 900 after the discharge of toner in which illustration of the outer cylinder 903 is omitted. FIG. 16C is a diagram illustrating a state before a push-in operation of a component related to push-in detection of the toner bottle unit 900, and FIG. 16D is a diagram illustrating a state after the push-in operation of the component related to push-in detection. FIG. 16E is a diagram illustrating a state before a rotating operation of a component related to rotation detection of the toner bottle unit 900, and FIG. 16F is a diagram illustrating a state after the rotating operation of the component related to the rotation detection of the toner bottle unit 900.

As illustrated in FIGS. 15A and 15D, the toner bottle unit 900 roughly includes the outer cylinder 903, an inner cylinder 901, a piston 902, a shutter member 904, and a memory unit 911. The outer cylinder 903 and the inner cylinder 901 have cylindrical shapes, the inner cylinder 901 is fit inside the outer cylinder 903, and the piston 902 is fit inside the inner cylinder 901 and is slidable with respect to the inner cylinder 901. In the description below, the direction in which the piston 902 moves (direction of the axis of the outer cylinder 903 and the inner cylinder 901) will be referred to as the axial direction of the toner bottle unit 900. In addition, the piston 902 serves as an example of a pressing member.

The inner cylinder 901 includes a toner storage portion 9014 that has a cylindrical shape and stores toner, a bottom portion 9013 provided on one end side in the axial direction, and a discharge port 9011 provided in the bottom portion 9013. The inner cylinder 901 has a cylindrical shape in which one end portion of the toner storage portion 9014 in the axial direction is closed by the bottom portion 9013. An opening portion 9012 is provided on the other end side of the toner storage portion 9014, and the piston 902 is inserted in the toner storage portion 9014 through the opening portion 9012. In addition, a weight member 905 having a spherical shape and freely movable in the toner storage portion 9014 is included in the inner cylinder 901.

The outer cylinder 903 includes an inner cylinder accommodating portion 9034 having a cylindrical shape that accommodates the toner storage portion 9014 of the inner cylinder 901 therein, a bottom portion 9033 provided on the one end side in the axial direction, and a discharge port 9031 provided in the bottom portion 9033. The outer cylinder 903 has a cylindrical shape in which one end portion of the inner cylinder accommodating portion 9034 in the axial direction is closed by the bottom portion 9033 similarly to the inner cylinder 901, and holds the inner cylinder 901 relatively unmovably. An opening portion 9032 through which the piston 902 is inserted is provided on the other end side of the inner cylinder accommodating portion 9034.

The discharge port 9011 of the inner cylinder 901 has a thin cylindrical shape extending from the bottom portion 9013 toward the one end side in the axial direction. The discharge port 9031 of the outer cylinder 903 is provided at a position corresponding to the discharge port 9011 of the inner cylinder 901 in the bottom portion 9033. The discharge port 9031 of the outer cylinder 903 is a discharge port through which the toner stored in the toner storage portion 9014 is discharged to the outside of the toner bottle unit 900. To be noted, a retracting space 9013a for the weight member 905 to retract into so as not to block the discharge port 9011 when pushing the piston in is provided adjacent to the discharge port 9011 of the inner cylinder 901.

To be noted, the bottom portion 9013 of the inner cylinder 901 has an inclined shape whose sectional area is smaller on the discharge port side in the axial direction (particularly a conical shape whose inner diameter is smaller on the discharge port side in the axial direction). The bottom portion 9033 of the outer cylinder 903 opposing the bottom portion 9013 of the inner cylinder 901 also has a similar inclined shape. The discharge port 9011 of the inner cylinder 901 and the retracting space 9013a are provided at a vertex portion of the inclined shape of the bottom portion 9033. The weight member 905 has a spherical shape, and is guided by the bottom portion 9013 to move to the retracting space 9013a by the gravity.

The piston 902 includes an elastic member 906 attached to an end portion 9023 on one end side (discharge port side) in the axial direction, and a push-in rib 9021 provided in the vicinity of an end portion 9022 on the other end side (part that the user pushes when pushing in the piston). The elastic member 906 is configured to come into contact with the inner circumferential surface of the toner storage portion 9014 with no gap therebetween, and has a function of suppressing leakage of toner when pushing in the piston. In addition, the push-in rib 9021 is a projection shape projecting outward in the radial direction from the outer circumferential surface of the piston 902.

The configuration of the shutter member 904 is similar to that of the shutter member 41 provided in the toner pack 40 described above. That is, as illustrated in FIG. 15C, the shutter member 904 has a shape of a disk partially cut out and relatively rotatable with respect to the outer cylinder 903. A side surface forming the thickness of the shutter member 904 at the cutout portion functions as an engagement surface 904s. Meanwhile, the outer cylinder 903 also has a shape with a cutout. The outer cylinder 903 includes an engagement surface 903s parallel to the engagement surface 904s in the cutout portion. In addition, the discharge port 9031 is provided at a position away from the engagement surface 903s by approximately 180° in the circumferential direction of the outer cylinder 903.

FIG. 15C illustrates a state in which the discharge port 9031 is already exposed, but in the state at the time when the toner bottle unit 900 is shipped, the positions of the cutout engagement surfaces 903s and 904s of the shutter member 904 and the outer cylinder 903 are aligned. In this case, the discharge port 9031 is covered by the shutter member 904, and the sealed state of the toner storage portion 9014 is maintained (closed state). As illustrated in FIG. 15C, when the shutter member 904 is rotated by 180° with respect to the outer cylinder 903, the discharge port 9031 is exposed through the cutout portion of the shutter member 904, thus the sealing of the toner storage portion 9014 is canceled, and it becomes possible to discharge the toner (open state). The configuration of the discharge port 9031, the engagement surface 903s, and the shutter member 904 are basically the same as the configuration described with reference to FIGS. 7A to 8C and 12.

A memory unit 911 serving as a storage means (storage portion) that stores information of the toner bottle unit 900 is attached to a portion near the discharge port 9031 of the outer cylinder 903. The memory unit 911 includes a plurality of metal plates 9111, 9112, and 9113 (FIG. 16A) exposed to the outside of the toner bottle unit 900 as a contact portion 911a that comes into contact with the contact portion 70133 (FIG. 9A) of the replenishment container attaching portion 701.

(2-2) Push-In Detection Mechanism of Piston

In addition, as illustrated in FIGS. 16A and 16C, as a push-in detection mechanism that detects a push-in operation of the piston 902, a push-in detection rod 907, a first contact plate 908, and a second contact plate 909 are disposed between the outer cylinder 903 and the inner cylinder 901. The push-in detection rod 907 is formed from an insulating material such as a resin, and the first contact plate 908 and the second contact plate 909 are formed from a conductive material such as metal. The push-in detection rod 907 includes a contact canceling portion 9072 on the one end side (discharge port side) in the axial direction, and a piston contact portion 9071 capable of abutting the push-in rib 9021 of the piston 902 on the other end side in the axial direction. The push-in detection rod 907 moves in the axial direction in accordance with the push-in operation of the piston 902 as a result of the push-in rib 9021 pressing the piston contact portion 9071.

For example, the push-in detection rod 907 is fit in a groove shape defined in the axial direction in the outer circumferential surface of the inner cylinder 901 or the inner circumferential surface of the outer cylinder 903, and is thus held so as to be movable in the axial direction with respect to the inner cylinder 901 and the outer cylinder 903 while the movement thereof in a direction perpendicular to the axial direction is restricted. In addition, the piston contact portion 9071 has a shape bent perpendicularly to the axial direction, that is, a shape bent into an L shape such that the push-in rib 9021 more reliably comes into contact therewith. To be noted, although the push-in rib 9021 is provided to extend all around the outer circumferential surface of the piston 902 in FIG. 16A, a configuration in which the push-in rib 9021 is formed in only a position corresponding to the piston contact portion 9071 in the circumferential direction may be employed.

The first contact plate 908 and the second contact plate 909 are metal plates whose connected state and disconnected state are switched in accordance with the position of the push-in detection rod 907 formed from an insulating resin. A brand-new product detection method of the toner bottle unit 900 using the first contact plate 908 and the second contact plate 909 will be described later.

In addition, a cylinder cover 910 (FIG. 15A) is provided at an end portion of the outer cylinder 903 on the opening portion side so as to suppress dropping of the push-in detection rod 907. That is, the cylinder cover 910 defining the opening portion 9032 of the outer cylinder 903 is narrowed such that cylinder cover 910 is further on the inside than the outer edge position of the piston contact portion 9071 FIG. 16B) in the radial direction (FIG. 15D). Therefore, even when a force to move the push-in detection rod 907 toward the opening portion side in the axial direction is applied, the piston contact portion 9071 interferes with the cylinder cover 910, and therefore the push-in detection rod 907 does not drop from the toner bottle unit 900.

(2-3) Brand-New/Used Determination of Toner Bottle Unit

Next, a configuration for detecting whether the toner bottle unit 900 is unused (brand-new) or used when attaching the toner bottle unit 900 to the replenishment container attaching portion 701 will be described. As illustrated in FIGS. 16C and 16D, the contact canceling portion 9072 of the push-in detection rod 907 is positioned near the first contact plate 908 and the second contact plate 909.

FIG. 16C corresponds to a state before the piston push-in illustrated in FIG. 16A, and the first contact plate 908 and the second contact plate 909 are in contact with each other and thus are in the connected state. At this time, it is preferable that the one of the first contact plate 908 and the second contact plate 909 that are formed from metal is formed in a flat spring shape and is in pressure contact with the other. In addition, for example, the conduction between the first contact plate 908 and the second contact plate 909 can be made more reliable by applying a conductive grease on the contact surfaces of the first contact plate 908 and the second contact plate 909.

FIG. 16D corresponds to a state after the piston push-in illustrated in FIG. 16B, and the first contact plate 908 and the second contact plate 909 are in the disconnected state. In this state, the contact canceling portion 9072 of the push-in detection rod 907 pushed in by the push-in rib 9021 gets between the first contact plate 908 and the second contact plate 909, and thus physically separate the two. At least the contact canceling portion 9072 of the push-in detection rod 907 is formed from an insulating material, and the conduction between the first contact plate 908 and the second contact plate 909 is disconnected in the state of FIG. 16D in which the contact canceling portion 9072 is present therebetween.

The first contact plate 908 and the second contact plate 909 are connected to different metal plates among the plurality of metal plates 9111 to 9113, at end portions opposite to end portions that come into contact with the contact canceling portion 9072 of the push-in detection rod 907. Here, the first contact plate 908 is connected to the metal plate 9111, and the second contact plate 909 is connected to the metal plate 9113. In this case, whether the toner bottle unit 900 is in a state before the piston push-in (unused) or a state after the piston push-in (used) can be determined by detecting whether a current is generated when a minute voltage is applied between the metal plates 9111 and 9113. That is, in a state in which the toner bottle unit 900 is attached to the replenishment container attaching portion 701, the control portion 90 of the image forming apparatus can determine whether the toner bottle unit 900 is used or unused, on the basis of presence/absence of conduction between the metal plates 9111 and 9113. In addition, the control portion 90 can determine that the replenishment operation by the user has been finished, on the basis of disconnection between the first contact plate 908 and the second contact plate 909. On the basis of this determination, the control portion 90 performs display control of the panel 400 described above. In addition, the control portion 90 writes, in the memory unit 45 and in accordance with the change in the conduction between the metal plates 9111 and 9113, a brand-new product flag indicating that the toner bottle unit 900 is used (brand-new: 1, used: 0).

To be noted, in the case of the configuration described above, the memory unit 911 is preferably disposed in a circuit connecting the metal plates 9111 and 9112. As a result of this, the control portion 90 of the image forming apparatus can access the memory unit 911 through the metal plates 9111 and 9112 while monitoring the push-in operation of the toner bottle unit 900 via the metal plates 9111 and 9113.

(2-4) Rotation Detection of Toner Bottle Unit

Next, a method for detecting the rotation of the toner bottle unit 900 will be described with reference to FIGS. 16E and 16F. To be noted, the rotation detection method of the present embodiment is the same as in the embodiment described above in which the toner pack 40 is used, except that the shutter member 904 that seals the discharge port of the replenishment container is attached to the outer cylinder 903 of the toner bottle unit 900.

As illustrated in FIGS. 16E and 16F, the two conductive flat springs 70151 and 70152 are provided in the replenishment container attaching portion 701 of the process cartridge as the rotation detection portion 7015. In addition, the projection portion 70135b is provided on an outer peripheral portion of the replenishment port shutter 7013.

As illustrated in FIG. 16E, in a state before the toner bottle unit 900 inserted in the replenishment container attaching portion 701 is rotated, the distal end portion 701521 of the flat spring 70152 is not in contact with the flat spring 70151, and therefore the rotation detection portion 7015 is in the disconnected state. That is, no current flows when a minute voltage is applied between the flat springs 70151 and 70152. As illustrated in FIG. 16F, when the toner bottle unit 900 is rotated by 180°, the flat spring 70152 is pressed by the projection portion 70135a, thus the distal end portion 701521 comes into contact with the flat spring 70151, and the rotation detection portion 7015 is switched to the connected state. In this state, a current flows when a minute voltage is applied between the flat springs 70151 and 70152. The control portion 90 of the image forming apparatus 1 recognizes whether or not the discharge port 9031 of the toner bottle unit 900 and the replenishment port 8012 of the replenishment container attaching portion 701 communicate with each other, on the basis of whether the rotation detection portion 7015 is in the connected state or in the disconnected state.

(2-5) Flow of Replenishment Operation Using Toner Bottle Unit

A series of operation for detaching the toner bottle unit 900 after attaching the toner bottle unit 900 to the replenishment container attaching portion 701 and replenishing toner will be described. To be noted, description of the same elements as in the embodiment described above where the toner pack 40 is used will be omitted.

First, the user attaches an unused toner bottle unit 900 to the replenishment container attaching portion 701. Specifically, insertion is performed by aligning the cutout engagement surfaces 903s and 904s (FIG. 15C) of the outer cylinder 903 and the shutter member 904 with the replenishment port 8012 and the lid portion 70131 (FIG. 9A) of the replenishment port shutter 7013. In this case, the engagement surface 903s of the outer cylinder 903 engages with the engagement surface 7013s, which is a side surface of the lid portion 70131, and the engagement surface 904s of the shutter member 904 engages with the engagement surface 8012s provided on an outer peripheral portion of the replenishment port 8012. At this time, the outer cylinder 903 engaging with the lid portion 70131 of the replenishment port shutter 7013 is unrotatable until the lock of the replenishment port shutter 7013 by the locking member 7014 is released later, and becomes rotatable together with the replenishment port shutter 7013 after the release of the lock. In addition, the shutter member 904 is in an unrotatable state by engaging with the replenishment port 8012 fixed to the frame member 8010 of the toner receiving unit 801. Further, the flat springs 70151 and 70152 of the rotation detection portion 7015 are away from each other, and the rotation detection portion 7015 is in the disconnected state (FIG. 16E).

In the case where an unused toner bottle unit 900 is inserted in the replenishment container attaching portion 701, the control portion 90 recognizes that the toner bottle unit 900 is brand-new by the brand-new product detection mechanism described above. The control portion 90 may recognize the conduction between the metal plates 9111 and 9113 or make determination by reading the brand-new product flag (brand-new: 1, used: 0) in the memory unit 45. In this case, the control portion 90 operates the pressing mechanism 600 to move the locking member 7014 to the lock releasing position, and thus the toner bottle unit 900 becomes rotatable.

Then, when the user grabs the toner bottle unit 900 and rotates the toner bottle unit 900 by 180°, the shutter member 904 and the replenishment port shutter 7013 are opened, and the discharge port 9031 of the toner bottle unit 900 and the replenishment port 8012 of the replenishment container attaching portion 701 communicate with each other. The operation of opening the shutter member 904 and the replenishment port shutter 7013 in accordance with the rotation of the toner bottle unit 900 is similar to the case of the toner pack 40 described with reference to FIGS. 10A and 10B.

As illustrated in FIG. 16F, in a state in which the toner bottle unit 900 is rotated by 180°, the distal end portion 701521 of the flat spring 70152 pressed by the projection portion 70135b of the replenishment port shutter 7013 comes into contact with the other flat spring 70151. When the rotation detection portion 7015 is switched to the connected state in this manner, the control portion 90 of the image forming apparatus detects that the rotation operation of the toner bottle unit 900 has been performed. That is, the control portion 90 recognizes that the sealing by the shutter member 904 and the replenishment port shutter 7013 has been canceled and the discharge port 42a of the toner pack 40 and the replenishment port 8012 of the replenishment container attaching portion 701 communicate with each other. In addition, the control portion 90 operates the pressing mechanism 600 to move the locking member 7014 to the locking position, and thus restricts the rotation of the toner bottle unit 900.

Next, the user presses the piston 902 of the toner bottle unit 900 to start discharge of toner. The toner having fallen into the toner storage portion 8011 is conveyed inside the toner receiving unit 801 and reaches the developer container 32. Also in the present modification example, when the piston 902 is pushed to the deepest position, the push-in detection mechanism described above detects that the push-in operation of the piston 902 has been completed. That is, as illustrated in FIG. 16B, the push-in rib 9021 of the piston 902 presses the piston contact portion 9071 of the push-in detection rod 907, and thus the push-in detection rod 907 moves accompanied by the piston 902. Then, as illustrated in FIG. 16D, the contact canceling portion 9072 of the push-in detection rod 907 disconnects the conduction between the first contact plate 908 and the second contact plate 909. The control portion 90 of the image forming apparatus recognizes the completion of the push-in of the piston 902 on the basis of the fact that no longer a current flows even if a voltage is applied between the metal plate 9111 connected to the first contact plate 908 and the metal plate 9113 connected to the second contact plate 909. That is, in the present modification example, detection of completion of the push-in operation of the piston 902 by the push-in detection mechanism serves as a condition for determining that discharge of toner is completed. To be noted, a configuration in which the control portion 90 rewrites the brand-new product flag in the memory unit 911 in the case where the conduction between the first contact plate 908 and the second contact plate 909 is disconnected, and determines that the discharge of toner has been completed on the basis of the rewriting of the brand-new flag may be employed.

The control portion 90 that has detected the completion of discharge of toner from the toner bottle unit 900 operates the pressing mechanism 600 again to move the locking member 7014 to the lock releasing position, and thus makes the toner bottle unit 900 rotatable. The user grabs the toner bottle unit 900 and rotates the toner bottle unit 900 by 180°. In this case, the discharge port 9031 of the toner bottle unit 900 is covered by the shutter member 904, and the replenishment port 8012 of the replenishment container attaching portion 701 is covered by the lid portion 70131 of the replenishment port shutter 7013. In addition, the flat springs 70151 and 70152 are separated as illustrated in FIG. 16E, and the rotation detection portion 7015 returns to the disconnected state. Then, the control portion 90 recognizes that the replenishment port shutter 7013 has been switched to the closed state, and operates the pressing mechanism 600 to move the locking member 7014 to the locking position. As a result of this, the replenishment container attaching portion 701 returns to the initial state before the toner replenishment.

(3) Second Modification Example

Next, a second modification example in which the configuration of the process cartridge is different will be described. The present modification example has the same elements as in the first embodiment except for elements related to the process cartridge, and therefore description of the same elements will be omitted.

(3-1) Process Cartridge

Figure 17A:
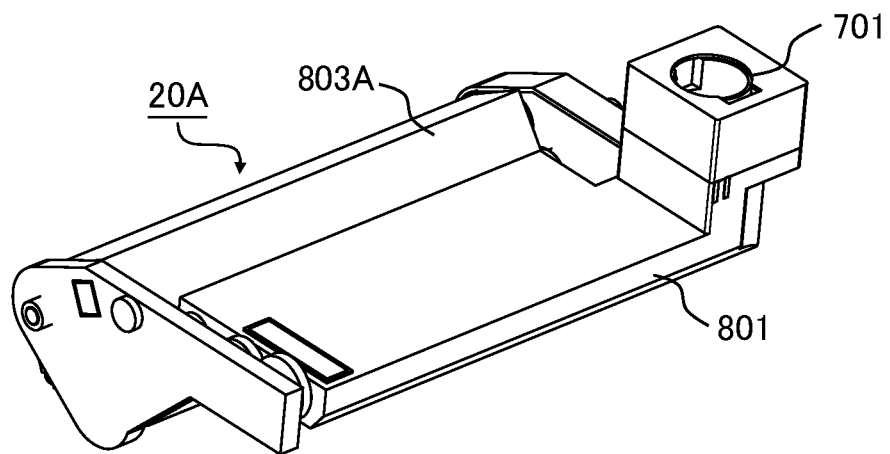
FIG. 17A is a perspective view of a process cartridge according to a second modification example.
Figure 17B:
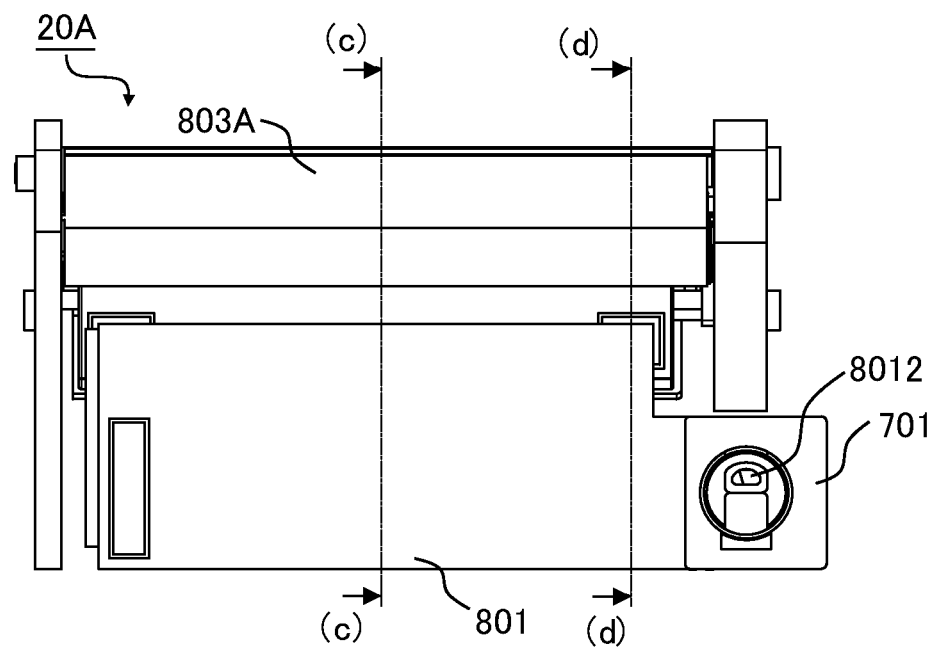
FIG. 17B is a top view of the process cartridge according to the second modification example.
Figure 17C:
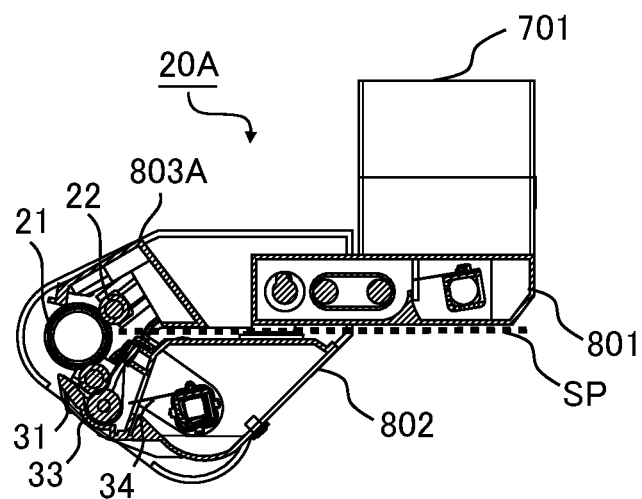
FIG. 17C is a section view of the process cartridge according to the second modification example.
Figure 17D:
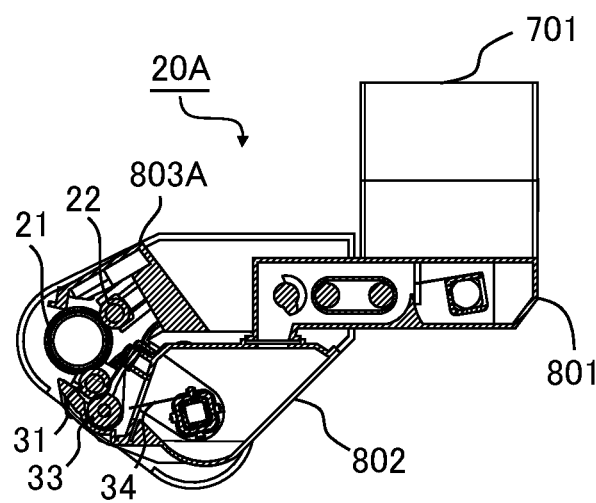
FIG. 17D is a section view of the process cartridge according to the second modification example.

FIGS. 17A to 17D are respectively a perspective view, a side view, a section view, and another section view of a process cartridge 20A according to the present modification example. FIGS. 17C and 17D are section views taken at cutting positions respectively illustrated in FIG. 17B.

As illustrated in FIGS. 17A to 17D, the process cartridge 20A of the present modification example includes the toner receiving unit 801, the developing unit 802, and a drum unit 803A. In contrast with the first embodiment, the drum unit 803A does not include the cleaning blade 24 that cleans the surface of the photosensitive drum 21 or the waste toner chamber 8033 (FIG. 6A) that accommodates waste toner. This is because a cleanerless configuration, in which the transfer residual toner remaining on the surface of the photosensitive drum 21 without being transferred onto the recording material is collected into the developing unit 802 and reused, is employed in the present modification example. To be noted, for example, nonmagnetic or magnetic one-component developer is also used herein.

In the illustrated example, the developing unit 802 is positioned in a lower portion of the process cartridge 20A, and the toner receiving unit 801 and the drum unit 803A are positioned above the developing unit 802 in the gravity direction. Although the toner receiving unit 801 and the drum unit 803A do not overlap as viewed in the gravity direction as illustrated in FIG. 17B, the two may be aligned in the up-down direction at least partially. In addition, the toner receiving unit 801 is disposed in the space where the cleaning blade 24 and the waste toner chamber 8033 are provided in the first embodiment. The configuration of the replenishment container attaching portion 701 provided in the toner receiving unit 801 is the same as in the first embodiment, and FIGS. 17A to 17D illustrate a simplified shape thereof.

A laser passing space SP serving as a gap for the laser light L emitted from the scanner unit 11 (see FIG. 1A) toward the photosensitive drum 21 to pass through is defined between the developing unit 802, the drum unit 803A, and the toner receiving unit 801. In addition, it is preferable that, in the drum unit 803A, a pre-exposing unit for removing the electrostatic latent image by radiating light onto the surface of the photosensitive drum 21 is disposed downstream of the transfer portion and between the transfer portion and the charging roller 22 in the rotation direction of the photosensitive drum 21.

(3-2) Behavior of Toner in Cleanerless Configuration

The behavior of toner in the cleanerless configuration will be described. The transfer residual toner remaining on the photosensitive drum 21 in the transfer portion is removed in accordance with the following procedure. The transfer residual toner includes a mixture of toner that is positively charged and toner that is negatively charged but does not have enough charges. The charges on the photosensitive drum 21 after transfer is removed by the pre-exposing unit, and by causing uniform electrical discharge from the charging roller 22, the transfer residual toner is charged again to a negative polarity. The transfer residual toner recharged to a negative polarity by the charging portion reaches the developing portion in accordance with the rotation of the photosensitive drum 21. Then, the surface region of the photosensitive drum 21 having passed the charging portion is exposed by the scanner unit 11 and an electrostatic latent image is drawn thereon in a state in which the transfer residual toner is still attached thereto.

Here, the behavior of the transfer residual toner having reached the developing portion will be described for an exposed portion and a non-exposed portion of the photosensitive drum 21 separately. In the developing portion, the transfer residual toner attached to the non-exposed portion of the photosensitive drum 21 is transferred onto the developing roller 31 due to the potential difference between the developing voltage and the potential of the non-exposed portion of the photosensitive drum 21 (dark area potential), and is collected into the developer container 32. This is because assuming that the normal charging polarity of the toner is a negative polarity, the polarity of the developing voltage applied to the developing roller 31 is relatively positive with respect to the potential of the non-exposed portion. To be noted, the toner collected into the developer container 32 is dispersed in the toner in the developer container 32 by being agitated by the agitation member 34, and is used for the developing process again by being borne on the developing roller 31.

In contrast, the transfer residual toner attached to the exposed portion of the photosensitive drum 21 is not transferred from the photosensitive drum 21 to the developing roller 31 in the developing portion, and remains on the drum surface. This is because assuming that the normal charging polarity of the toner is a negative polarity, the polarity of the developing voltage applied to the developing roller 31 is further negative with respect to the potential of the exposed portion (light area potential). The transfer residual toner remaining on the drum surface is borne on the photosensitive drum 21 moved to the transfer portion together with other particles of toner transferred from the developing roller 31 onto the exposed portion, and is transferred onto the recording material in the transfer portion.

By employing the cleanerless configuration, a space for installing a collection container for collecting the transfer residual toner or the like becomes unnecessary, thus the size of the image forming apparatus 1 can be further reduced, and the cost of printing can be reduced by reusing the transfer residual toner.

(4) Third Modification Example

Next, a third modification example in which the configuration of the process cartridge is different from any embodiments described above will be described. The present modification example has the same elements as in the first embodiment except for elements related to the process cartridge, and therefore description of the same elements will be omitted.

(4-1) Third Mode of Process Cartridge

Figure 18A:
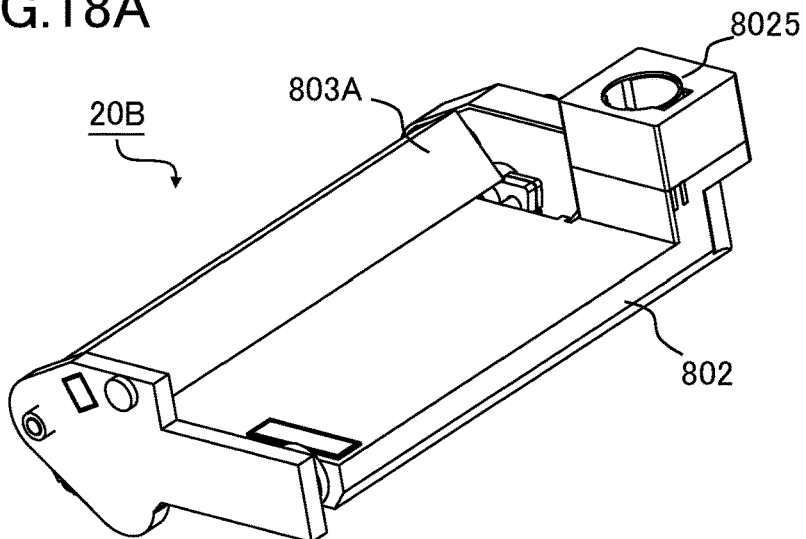
FIG. 18A is a perspective view of a process cartridge according to a third modification example.
Figure 18B:
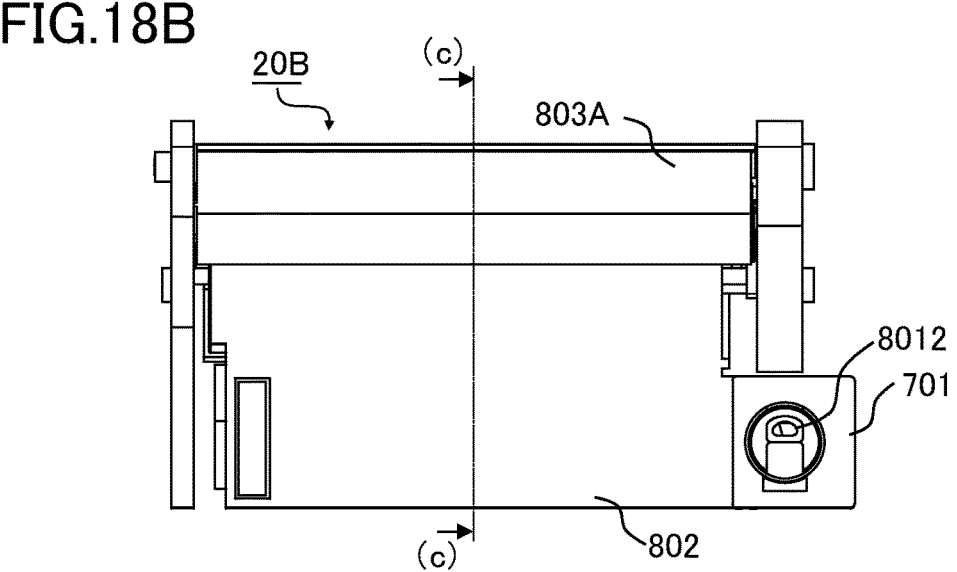
FIG. 18B is a top view of the process cartridge according to the third modification example.
Figure 18C:
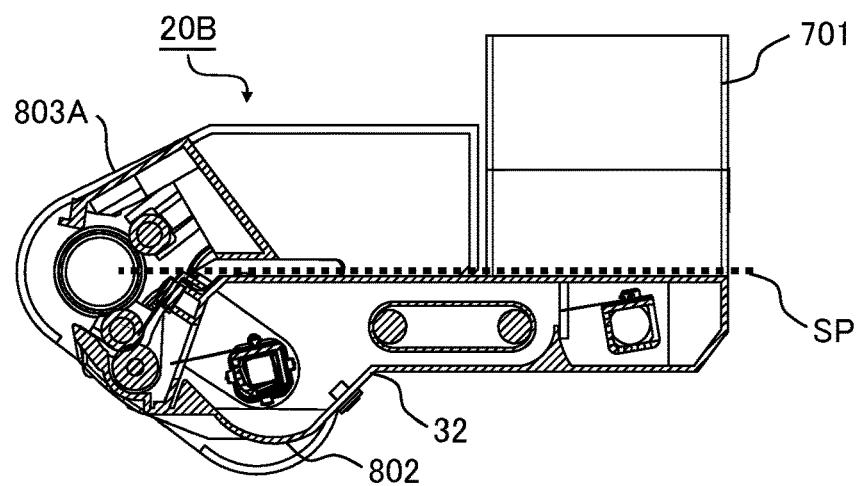
FIG. 18C is a section view of the process cartridge according to the third modification example.

FIGS. 18A to 18C are respectively a perspective view, a side view, and a section view of a process cartridge 20B according to the present modification example. FIG. 18C illustrates a sectional surface at a cutting position illustrated in FIG. 18B.

As illustrated in FIGS. 18A to 18C, the process cartridge 20B of the present modification example includes the developing unit 802 and the drum unit 803A. In contrast with the third embodiment, the toner receiving unit 801 is omitted, and instead the replenishment container attaching portion 701, the first conveyance member 8013, and the second conveyance member 8014 are disposed in the developing unit 802. That is, the present modification example is a configuration in which a replenishment container such as the toner pack 40 or the toner bottle unit 900 is attached to the replenishment port 8012 provided in the developer container 32 from the outside of the image forming apparatus to perform toner replenishment. The configuration of the replenishment container attaching portion 701 is the same as in the first embodiment, and a simplified shape thereof is illustrated.

The laser passing space SP serving as a gap for the laser light L emitted from the scanner unit 11 (see FIG. 1A) toward the photosensitive drum 21 to pass through is defined between the developing unit 802, the drum unit 803A, and the toner receiving unit 801. In addition, it is preferable that, in the drum unit 803A, a pre-exposing unit for removing an electrostatic latent image by radiating light onto the surface of the photosensitive drum 21 is disposed downstream of the transfer portion and between the transfer portion and the charging roller 22 in the rotation direction of the photosensitive drum 21. A cleanerless configuration is employed in the present modification example. The behavior of toner in the cleanerless configuration is the same as in the second modification example, and therefore the description thereof will be omitted.

(5) Control System of Image Forming Apparatus

Figure 19:
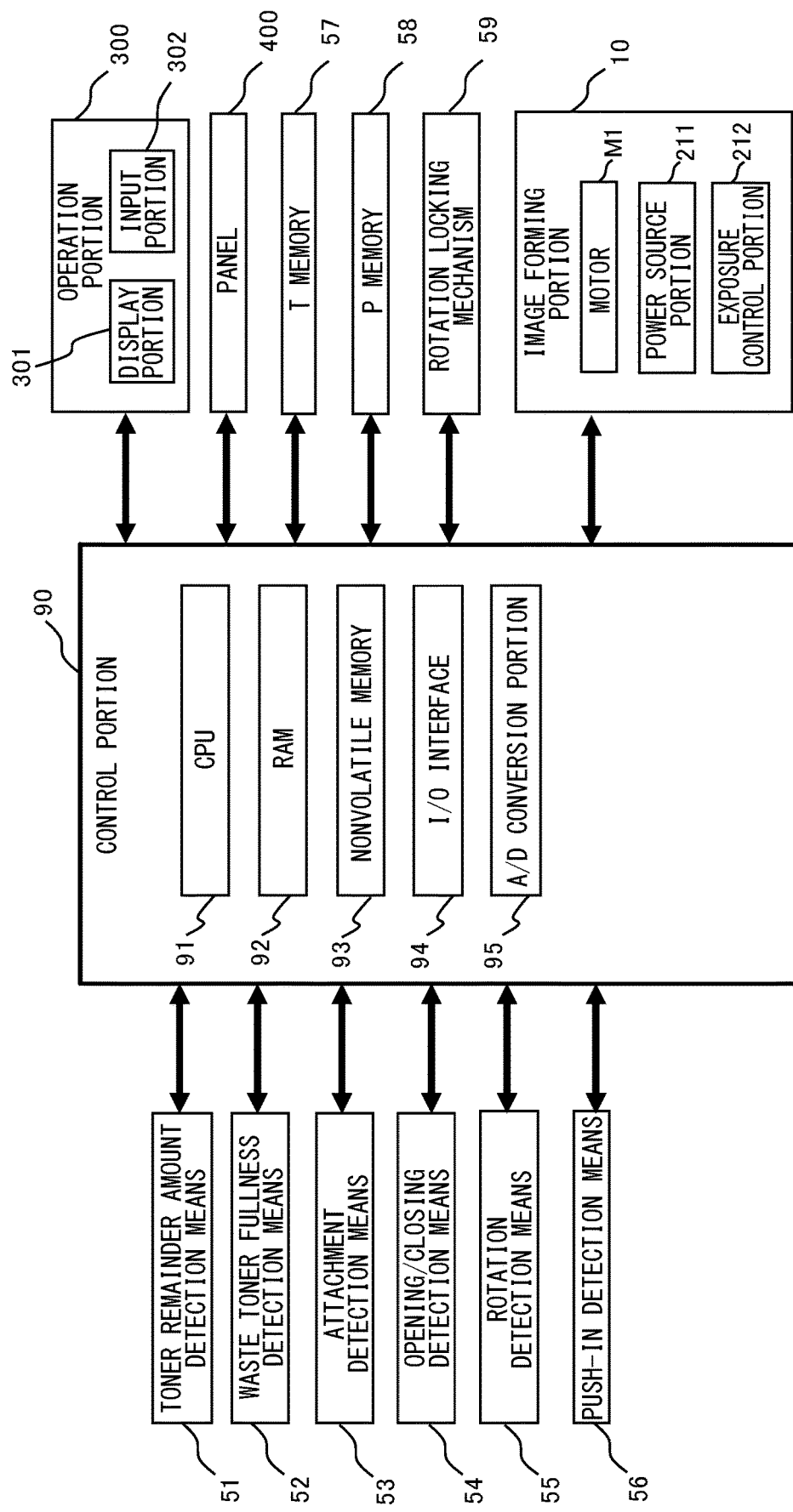
FIG. 19 is a block diagram illustrating a control system of the image forming apparatus according to the first embodiment.

FIG. 19 is a block diagram illustrating a control system of the image forming apparatus 1 according to the first embodiment. The control portion 90 serving as a control means (controller) of the image forming apparatus 1 includes a CPU 91 serving as a processing device, a RAM 92 used as a work area of the CPU 91, and a nonvolatile memory 93 that stores various programs. In addition, the control portion 90 includes an I/O interface 94 serving as an input/output port connected to an external device, and an A/D conversion portion 95 that converts an analog signal into a digital signal. The CPU 91 reads out and executes a control program stored in the nonvolatile memory 93, and thus controls each component of the image forming apparatus 1. Therefore, the nonvolatile memory 93 serves as an example of a non-transitory computer-readable recording medium storing a control program for causing an image forming apparatus to operate by a specific method.

In addition, the control portion 90 is connected to a T memory 57, which is a nonvolatile memory included in a replenishment container such as the toner pack 40 or the toner bottle unit 900, and the P memory 58, which is a nonvolatile memory included in the process cartridge 20. Examples of the T memory 57 serving as a storage means (storage portion) provided in the replenishment container include the memory unit 45 included in the toner pack 40 described above, and the memory unit 911 included in the toner bottle unit 900 described above. In addition, the T memory 57 also stores toner information indicating that the toner stored in the replenishment container such as the toner pack 40 or the toner bottle unit 900 can be supplied to the developer container 32 for replenishment. The toner information is, for example, information describing whether or not the toner pack 40 is unused, and describing the initial amount, expiration date, and the like of the toner. In addition, the P memory 58 stores the remainder amount of toner accommodated in the developer container 32, the total amount of toner that has been supplied from the replenishment container, information of the lifetime of the photosensitive member, information of the replacement timing of the process cartridge 20, and the like.

Further, the control portion 90 is connected to a rotation locking mechanism 59 and the image forming portion 10. Examples of the rotation locking mechanism 59 include the locking member 7014 (FIGS. 9A, 9B, 11A, and 11B) provided in the replenishment container attaching portion 701 and the pressing mechanism 600 (FIG. 13) that moves the locking member 7014. The image forming portion 10 includes a motor M1 as a drive source that drives the photosensitive drum 21, the developing roller 31, the supply roller 33, the agitation member 34, and the like. To be noted, the same drive source does not have to be shared among these rotary members, and for example, the photosensitive drum 21, the developing roller 31, the supply roller 33, and the agitation member 34 may be respectively driven by different motors. In addition, the image forming portion 10 also includes a power source portion 211 for applying a voltage to each member such as the developing roller 31, and an exposure control portion 212 that controls the scanner unit 11.

A toner remainder amount detection means 51 (toner remainder amount detection portion), a waste toner fullness detection means 52 (waste toner fullness detection portion), an attachment detection means 53 (attachment detection portion), an opening/closing detection means 54 (opening/closing detection portion), a rotation detection means 55 (rotation detection portion), and a push-in detection means 56 (push-in detection portion) are connected to the input side of the control portion 90.

The toner remainder amount detection means 51 detects the remainder amount of toner accommodated in the developer container 32. Examples of the toner remainder amount detection means 51 include the optical sensor (51a and 51b) illustrated in FIG. 6A. This optical sensor includes a light emitting portion 51a that emits detection light toward the inside of the developer container 32, and a light receiving portion 51b that detects the detection light. In this case, the ratio (Duty) of time in which the optical path of the detection light is blocked by the toner with respect to the rotation period of the agitation member 34 is correlated with the toner remainder amount in the developer container 32. According to this, the toner remainder amount can be obtained from a current Duty value by preparing a correspondence relationship between the Duty value and the toner remainder amount in advance. To be noted, such an optical sensor is just an example of the toner remainder amount detection means, and alternatively a pressure sensor or an electrostatic capacitance sensor may be used. The waste toner fullness detection means 52 detects that the amount of waste toner accumulated in the waste toner chamber 8033 (FIG. 6A) of the cleaning unit 803 has reached a predetermined upper limit. As the waste toner fullness detection means 52, for example, a pressure sensor disposed in the waste toner chamber 8033 can be used. In addition, the control portion 90 may estimate the amount of waste toner by calculation based on the image information by assuming that a certain ratio of toner corresponding to the image information is collected as waste toner.

The attachment detection means 53 detects that a replenishment container such as the toner pack 40 is attached to the replenishment container attaching portion 701. For example, the attachment detection means 53 is constituted by a pressure switch that is provided in the replenishment container attaching portion 701 and outputs a detection signal when pressed by the bottom surface of the toner pack 40. In addition, the attachment detection means 53 may be a detection circuit that detects that the T memory 57 has been electrically connected to the control portion 90 via the contact portion 70133 (FIG. 9) of the replenishment container attaching portion 701.

The rotation detection means 55 detects the rotation of the replenishment container attached to the replenishment container attaching portion 701. Examples of the rotation detection means 55 include the rotation detection portion 7015 constituted by the flat springs 70151 and 70152 (FIGS. 9A, 9B, 16E, and 16F). The rotation detection portion 7015 is an example of the rotation detection means 55, and alternatively, for example, a photoelectric sensor shielded from light by a projection portion provided on the replenishment port shutter 7013 may be used as a rotation detection sensor. In addition, as another example of the rotation detection sensor, a configuration in which the conduction between the flat springs 70151 and 70152 of the rotation detection portion 7015 is caused by a projection portion provided on the discharge portion 42 of the toner pack 40 may be employed.

The push-in detection means 56 is an element that is additionally provided in the case of using the toner bottle unit 900 of the first modification example, and detects completion of push-in of the piston 902 of the toner bottle unit 900. Examples of the push-in detection means 56 include a detection circuit that is provided in the image forming apparatus 1 and detects the change in the state of the push-in detection mechanism (FIGS. 16A to 16d) constituted by the push-in detection rod 907, the first contact plate 908, and the second contact plate 909 provided in the toner bottle unit 900. This detection circuit monitors the value of current when a voltage is applied between the metal plates 9111 and 9113 respectively connected to the first contact plate 908 and the second contact plate 909, and thus detects whether the piston 902 has been pushed in or has not been pushed in yet.

In addition, the control portion 90 is connected to the operation portion 300 serving as a user interface of the image forming apparatus 1 and serving as a notification means (report means, notification portion) that guides the user in the toner replenishment procedure. Further, the control portion 90 is connected to the panel 400 that notifies the user of information about the toner remainder amount in the developer container 32. Here, the information related to the toner remainder amount is not limited to information indicating the toner remainder amount itself. In addition to this, examples of the information related to the toner remainder amount include information indicating the amount of toner that has been already supplied from the toner pack 40 or the toner bottle unit 900 for replenishment. In addition, examples of the information related to the toner remainder amount include information indicating the remaining capacity of the developer container 32 that indicates the amount of toner that can be accepted by the developer container 32 for replenishment in terms of the number of toner packs 40 or toner bottle units 900.

Figure 20A:
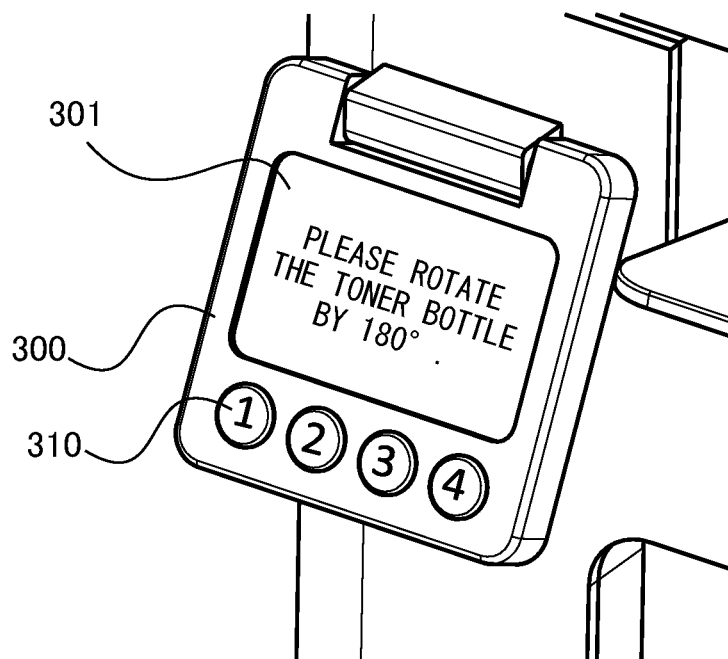
FIG. 20A is a diagram illustrating an operation portion according to the first embodiment.

The operation portion 300 includes a display portion 301 capable of displaying various setting screens as illustrated in FIG. 20A. For example, the display portion 301 is constituted by a liquid crystal panel. In addition, the operation portion 300 includes an input portion that receives an input operation from a user. For example, the input portion is constituted by physical buttons such as buttons 310, or a touch panel function portion of the liquid crystal panel. Further, the operation portion 300 may include a sound emitting portion that notifies information about the toner remainder amount or information about the toner replenishment procedure by a sound.

Figure 20B:
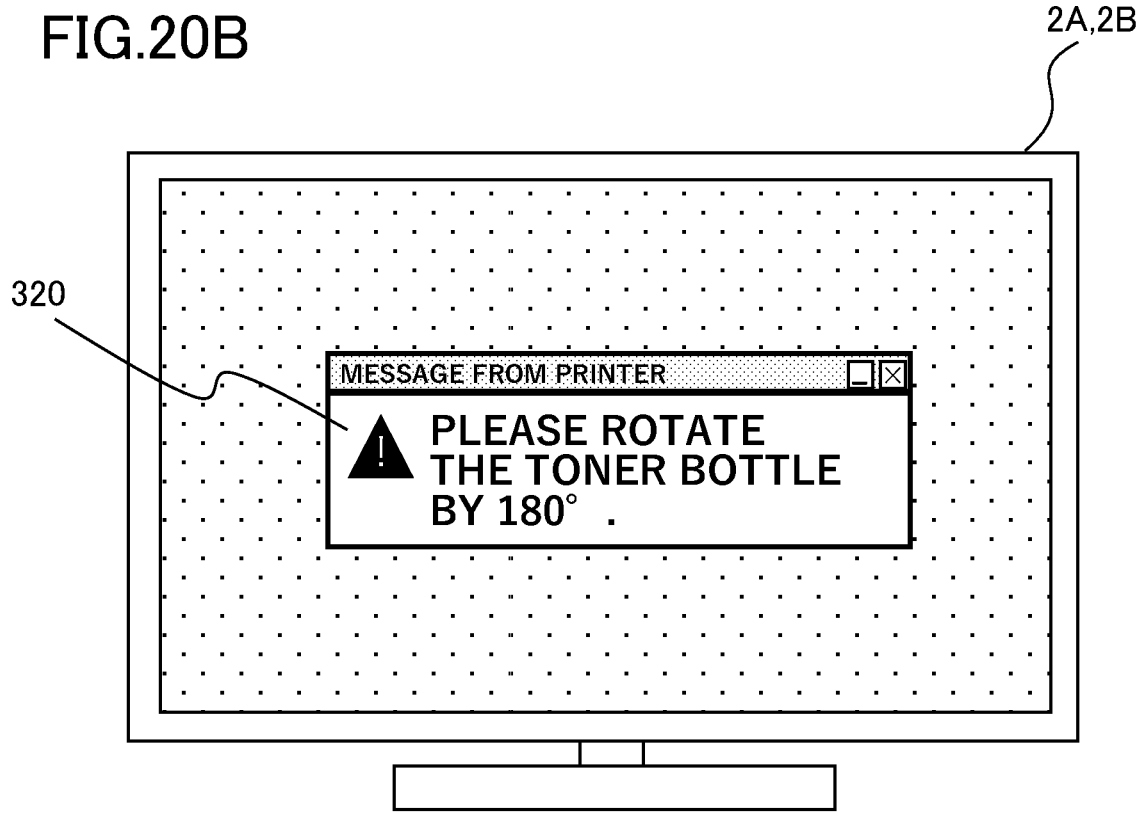
FIG. 20B is a diagram illustrating a display portion according to the first embodiment.
Figure 21:
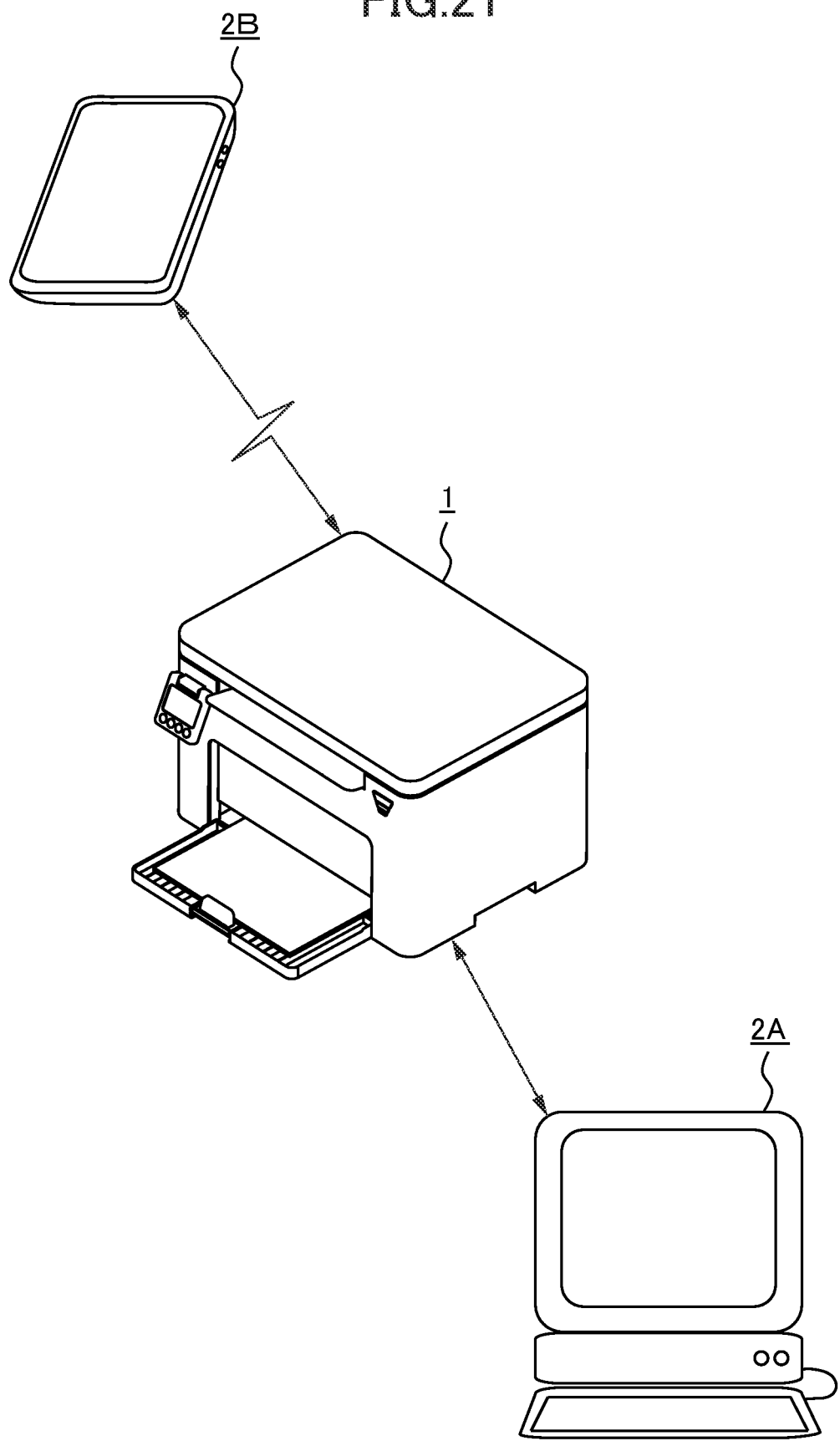
FIG. 21 is a diagram illustrating a system configuration of an image forming system according to the first embodiment.

In addition, the image forming apparatus 1 is communicably connected to an information processing apparatus constituted by hardware such as a CPU, a RAM, and a ROM, such as the PC 2A or a portable information processing terminal 2B like a smartphone (see FIG. 21). The information processing apparatus functions as a notification means (notification portion) that guides the user in the toner replenishment procedure instead of the operation portion 300. Information transmitted from the PC 2A and the portable information processing terminal 2B is input to the control portion 90 via the I/O interface 94. In addition, information transmitted from the image forming apparatus 1 to the PC 2A or the portable information processing terminal 2B is output from the control portion 90 via the I/O interface 94, and is input to the control portion of the PC 2A or the portable information processing terminal 2B. The operation statuses of the PC 2A and the portable information processing terminal 2B are respectively displayed on display portions 320 (FIG. 20B) respectively provided therein. To be noted, the PC 2A and the portable information processing terminal 2B may be provided with a sound emitting portion such as a loudspeaker. The image forming apparatus 1, the PC 2A, and the portable information processing terminal 2B constitute an information processing system.

(6) Guidance of Toner Replenishment Procedure

Example 1

As described above, the process cartridge 20 is a direct replenishment system in which toner can be directly replenished from the outside of the image forming apparatus 1 by using a replenishment container such as the toner pack 40 or the toner bottle unit 900. Therefore, when replenishing toner, the user needs to perform a predetermined operation on the toner pack 40 or the toner bottle unit 900. In the present example, a guidance operation for a replenishment procedure in the case of using the toner pack 40 as the replenishment container for replenishing toner will be described.

(6-1) Guidance of Replenishment Procedure Using Toner Pack

Figure 22:
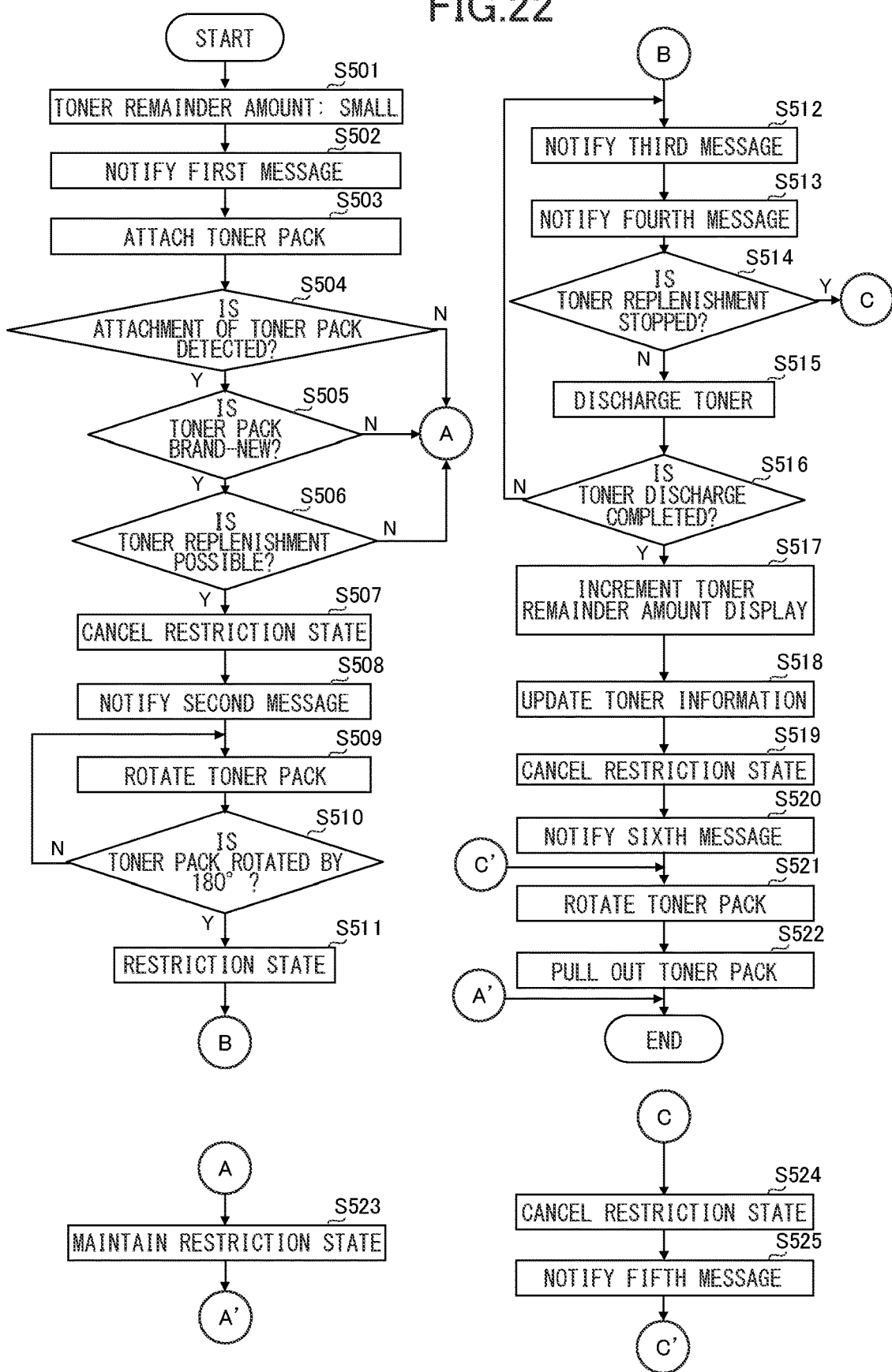
FIG. 22 is a flowchart illustrating a flow of a notification operation for a toner replenishment procedure according to Example 1.

First, a notification operation for the replenishment procedure of the present example will be described with reference to FIG. 22. FIG. 22 is a flowchart illustrating an example of the notification operation for the replenishment procedure in a direct replenishment system. In the present example, the toner remainder amount detection means 51, the attachment detection means 53, the rotation detection means 55, and the push-in detection means 56 each function as an example of a progress detection means (progress detection portion) that detects the progress of the toner replenishment procedure and changes the output value thereof. To be noted, the "output value" of the progress detection means refers to a value of a signal (for example, electric signal such as a voltage value or a current value) for conveying information about the progress of the toner replenishment procedure, and is determined in accordance with the specific configuration of the progress detection means. For example, in the case of the rotation detection means 55 including the rotation detection portion 7015 (FIGS. 9A, 9B, 16E, and 16F) described above, the current flowing in a circuit including the flat springs 70151 and 70152 is used as an output signal of the rotation detection means 55, and can be used as the output value of the rotation detection means of the current value. The flow of the guidance operation in accordance with the progress of the toner replenishment operation will be described below.

Figure 23A:
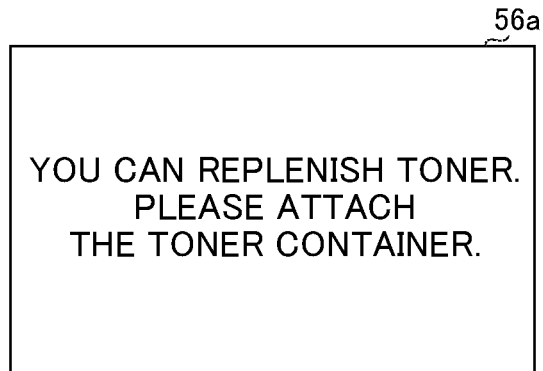
FIG. 23A is a diagram illustrating an example of a message that is notified in the notification operation for the toner replenishment procedure according to Example 1.
Figure 23B:
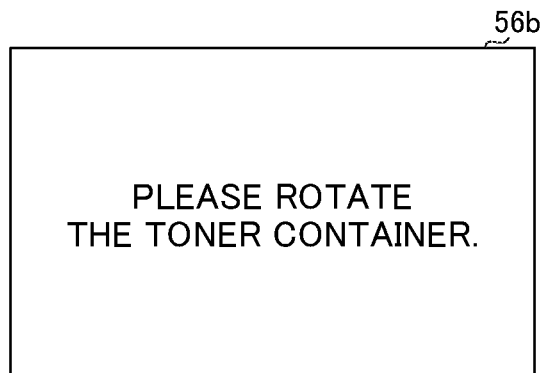
FIG. 23B is a diagram illustrating an example of a message that is notified in the notification operation for the toner replenishment procedure according to Example 1.
Figure 23C:
FIG. 23C is a diagram illustrating an example of a message that is notified in the notification operation for the toner replenishment procedure according to Example 1.
Figure 23D:
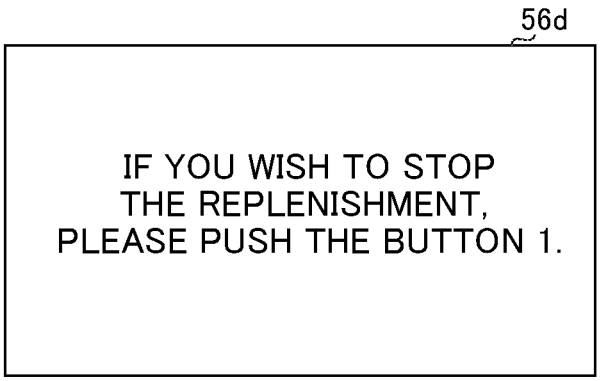
FIG. 23D is a diagram illustrating an example of a message that is notified in the notification operation for the toner replenishment procedure according to Example 1.
Figure 23E:
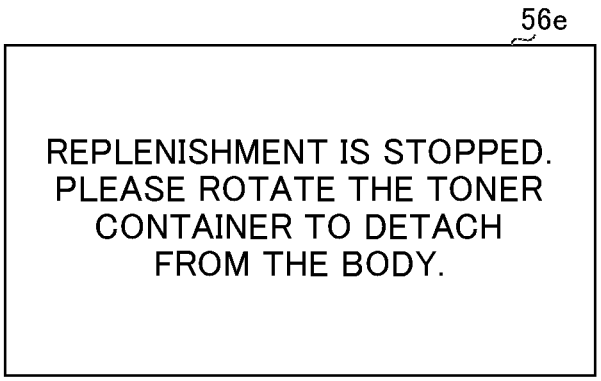
FIG. 23E is a diagram illustrating an example of a message that is notified in the notification operation for the toner replenishment procedure according to Example 1.
Figure 23F:
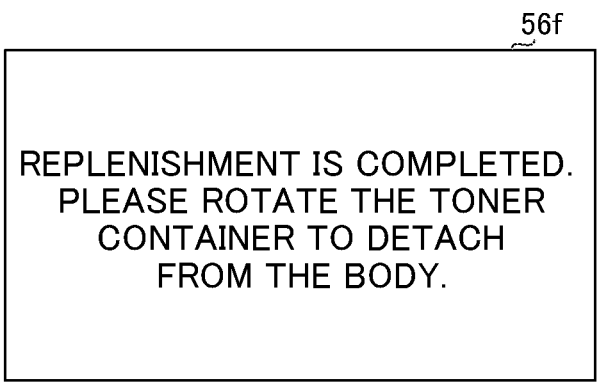
FIG. 23F is a diagram illustrating an example of a message that is notified in the notification operation for the toner replenishment procedure according to Example 1.

The toner remainder amount detection means 51 is a sensor whose output value changes in accordance with the remainder amount of toner accommodated in the developer container 32, and functions as a toner amount detection means (toner amount detection portion) of the present example. The control portion 90 determines the toner remainder amount in the developer container 32 by obtaining the output value of the toner remainder amount detection means 51. In the case where the toner remainder amount in the developer container 32 is such an amount that replenishment of toner equivalent to one or more toner packs 40 can be performed (S501), the control portion 90 causes the operation portion 300 to display a first message 56*a* (FIG. 23A) (S502). The first message 56*a* indicates a first step for attaching the toner pack 40 to the replenishment port 8012. To be noted, the "first" of the "first step" is used for identifying one of a plurality of steps included in the replenishment procedure, and for example, the step for attaching the toner pack 40 to the replenishment port 8012 does not have to be performed first in the series of replenishment procedure. A predetermined amount of the toner remainder amount in the developer container 32 in the present example is such a remainder amount that toner equivalent to one or more toner packs 40 can be added for replenishment, and the notification operation of the replenishment procedure is started with the toner remainder amount in the developer container 32 becoming less than the predetermined amount as a trigger. As illustrated in FIG. 23A, the first message 56*a* is capable of replenishing the process cartridge 20 with toner, and a phrase prompting the user to attach the toner pack 40 to the replenishment container attaching portion 701 as one of the toner replenishment procedure is displayed. The user attaches the toner pack 40 to the replenishment container attaching portion 701 in accordance with the first message 56*a* displayed on the display portion 301 (S503).

To be noted, FIGS. 23A to 23F illustrate character information displayed as messages (56*a* to 56*f*) as an example of a thing displayed on the display portion 301 and indicating the toner replenishment procedure. Other than this, for example, a procedure for replenishing the developer container 32 with toner from the toner pack 40 may be displayed on the display portion 301 as information such as an image or a video. In addition, in the case where the image forming apparatus 1 includes a sound emitting portion such as a loudspeaker, the procedure for replenishing the developer container 32 with toner from the toner pack 40 may be notified to the user as sound information.

As described above, when replenishing toner, the toner pack 40 is attached to the replenishment container attaching portion 701. In addition, the toner receiving unit 801 is provided with a rotation locking mechanism 59 serving as a restriction member that restricts the position of the discharge port 42*a* of the toner pack 40 in the state of being attached to the replenishment container attaching portion 701. As described above, if the position of the locking member 7014 is not the lock releasing position, the replenishment port 8012 and the discharge port 42*a* do not communicate with each other even in a state in which the toner pack 40 is attached to the replenishment container attaching portion 701 (see FIGS. 11A and 11B). In the present embodiment, for example, the attachment detection means 53 detects that the toner pack 40 has been attached to the replenishment container attaching portion 701, as a result of the T memory 57 being electrically connected to the control portion 90 via the contact portion 70133 (FIGS. 9A and 9B) of the replenishment container attaching portion 701. According to such a configuration, the attachment detection means 53 is configured so as to be able to detect whether or not the toner pack 40 is attached to a position suitable for reliably discharging toner. That is, it is configured such that even if the toner pack 40 is attached to the toner receiving unit 801, toner is not discharged from the toner pack 40 unless the position of the discharge port 42*a* with respect to the replenishment port 8012 is a position suitable for reliably discharging toner.

The control portion 90 obtains the output value of the attachment detection means 53 and determines whether or not the toner pack 40 is attached to the replenishment container attaching portion 701 (S504). For example, in the case where communication with the memory unit 45 of the toner pack 40 is successful, the control portion 90 determines that the toner pack 40 is attached to the replenishment container attaching portion 701. In the case where the toner pack 40 is not attached to the replenishment container attaching portion 701 (S504/N), the control portion 90 does not lift the locking member 7014, and keeps the present state. In the case where the toner pack 40 is attached to the replenishment container attaching portion 701 (S504/Y), the control portion 90 obtains toner information from the T memory 57 of the toner pack 40. Then, the control portion 90 determines, on the basis of the toner information obtained from the T memory 57, whether or not the toner accommodated in the toner pack 40 is toner with which the developer container 32 can be replenished (S505). To be noted, the control portion 90 is configured to be capable of determining, on the basis of the toner information, whether or not the toner accommodated in the toner pack 40 is toner with which the developer container 32 can be replenished. For example, the control portion 90 determines that the toner in the toner pack 40 can be used for replenishment in the case where the toner pack 40 is brand-new, the toners in the toner pack 40 and the developer container 32 are of the same color, and the expiration date of the toner pack 40 has not been reached yet (S505/Y).

In the case where it has been determined that the toner in the toner pack 40 can be used for replenishment, the control portion 90 determines, on the basis of information stored in the P memory 58 of the process cartridge 20, whether or not it is possible to perform toner replenishment on the process cartridge 20 (S506). As described above, the P memory 58 stores the remainder amount of toner accommodated in the developer container 32, the total amount of toner that has been supplied from the replenishment container thus far, information of the lifetime of the photosensitive member, information of the replacement timing of the process cartridge 20, and the like. For example, there is a case where the toner remainder amount in the developer container 32 is such an amount that toner replenishment with the toner pack 40 cannot be performed even in a state in which the lights of the indicators 4002 and 4003 of the panel 400 are on. In such a case, the control portion 90 determines that it is not possible to perform toner replenishment on the process cartridge 20 (S506/N). In contrast, in the case where the toner remainder amount in the developer container 32 is such an amount that the toner replenishment using the toner pack 40 is possible, the control portion 90 determines that it is possible to perform toner replenishment on the process cartridge 20 (S506/Y). The case where the toner remainder amount of the developer container 32 is such an amount that the toner replenishment using the toner pack 40 is possible is, for example, a case where at least the light of the indicator 4003 of the panel 400 is off. To be noted, a configuration in which the control portion 90 determines whether or not it is possible to perform toner replenishment on the process cartridge 20 on the basis of only information indicating whether or not the toner remainder amount in the developer container 32 is such an amount that the toner replenishment using the toner pack 40 is possible may be employed.

In this manner, the control portion 90 determines whether or not the developer container 32 can be replenished with the toner accommodated in the toner pack 40 attached to the replenishment container attaching portion 701. To be noted, in the case where any one of S504, S505, and S506 is N, the control portion 90 keeps the restriction state of the toner pack 40 by the rotation locking mechanism 59 (S523), and finishes the series of operations. As a result of this, toner can be prevented from being erroneously discharged into the developer container 32 even in the case where a toner pack with which the developer container 32 cannot be replenished is used by the user or the end of the lifetime of the process cartridge 20 is close.

In the case where the toner accommodated in the toner pack 40 is toner with which the developer container 32 can be replenished and it is possible to perform toner replenishment on the process cartridge 20 (S506/Y), the control portion 90 cancels the restriction state of the toner pack 40 by the locking mechanism. As a result of this, the locking mechanism takes an allowance state in which the rotation of the toner pack 40 with respect to the replenishment port 8012 is allowed (S507). Next, the control portion 90 displays a second message 56*b* prompting an operation to rotate the toner pack 40 (S508). The second message 56*b* indicates a second step for causing the toner pack 40 and the replenishment port 8012 to communicate with each other among the toner replenishment procedure. The user rotates the toner pack 40 in accordance with the displayed second message 56*b* (S509). As a result of the user rotating the toner pack 40, the toner pack 40 attached to the replenishment container attaching portion 701 and the replenishment port 8012 communicate with each other. In the present example, for example, the rotation detection means 55 detects that the rotation angle of the toner pack 40 has reached such an angle as to communicate with the replenishment port 8012, in the case where the flat springs 70151 and 70152 of the rotation detection portion 7015 are connected by the projection portion provided in the discharge portion 42. In addition, the rotation detection means 55 may be configured to detect that the rotation angle of the toner pack 40 has reached such an angle as to communicate with the replenishment port 8012, in the case where light in a photoelectric sensor (not illustrated) is blocked by the projection portion provided in the replenishment port shutter 7013.

The control portion 90 determines the rotation angle of the toner pack 40 on the basis of the output value of the rotation detection means 55, and determines whether or not the toner pack 40 and the replenishment port 8012 communicate with each other (S510). Here, it is assumed that, in the case where the rotation angle of the toner pack 40 has reached 180° (S510/Y), the replenishment port 8012 is exposed to the discharge portion 42, and the toner pack 40 and the replenishment port 8012 communicate with each other (see FIG. 10B). That is, the rotation detection means 55 serves as an example of a communication detection means (communication detection portion) of the present example.

In the case where it has been determined that the toner pack 40 and the replenishment port 8012 communicate with each other (S510/Y), the control portion 90 moves the position of the locking member 7014 of the rotation locking mechanism 59 to the locking position to switch the toner pack 40 again to the restriction state (S511). If the toner pack 40 is detached from the replenishment port 8012 while the toner pack 40 and the replenishment port 8012 still communicate with each other, there is a risk that the toner accommodated in the toner pack 40 scatters. Therefore, in the present example, in the case where the toner pack 40 and the replenishment port 8012 communicate with each other, detachment of the toner pack 40 from the replenishment port 8012 is restricted before discharge of toner so as to prevent scattering of toner.

After switching the toner pack 40 to the restriction state, the control portion 90 causes the operation portion 300 to display a third message 56*c* prompting the user to perform an operation to discharge toner from the toner pack 40 to the replenishment port 8012 (S512). The third message 56*c* indicates a third step for discharging toner from a replenishment container such as the toner pack 40 to the replenishment port 8012 among the toner replenishment procedure. In the case of replenishing the process cartridge 20 with toner by using the toner pack 40, a screen prompting the user to perform an operation such as squeezing the bag member 43 by hand is displayed as the third message 56*c*.

In addition, the control portion 90 alternately displays the third message 56*c* and a fourth message 56*d* (S513). The fourth message 56*d* is a screen indicating a step for stopping the toner replenishment procedure. The fifth step of the present example is a step for stopping the progress of the toner replenishment procedure. Here, as an example of a stopping operation, operating a button 310 capable of executing a stopping operation for stopping the toner replenishment procedure in the operation portion 300 is used as the stopping operation (see FIG. 20A). Since the operation portion 300 changes the output value thereof in accordance with whether or not the button 310 is operated, the button 310 and the operation portion 300 cooperatively function as a stopping operation detection means (stopping operation detection portion) of the present example.

In the case where the stopping operation is performed in a period in which the third message 56*c* or the fourth message 56*d* is displayed (S514/Y), the control portion 90 stops the progress of the toner replenishment procedure and cancels the restriction state of the toner pack 40 by the rotation locking mechanism 59 (S524). When the toner pack 40 is switched to the allowance state, the control portion 90 displays a fifth message 56*e* prompting the user to perform an operation for detaching the toner pack 40 from the replenishment container attaching portion 701 (S525). The user rotates the toner pack 40 in accordance with the displayed fifth message 56*e*, and as a result of this, the toner pack 40 is detached from the replenishment container attaching portion 701.

In the case where the stopping operation has not been performed before the elapse of a predetermined time (for example, 3 minutes) after the start of display of the third message 56*c* (S514/N), it can be considered that an operation for discharging toner is performed on the toner pack 40. At this time, the control portion 90 determines that toner has been discharged from the toner pack 40 to the replenishment port 8012 (S515), and discharge of toner from the toner pack 40 to the replenishment port 8012 has been completed (S516/Y). The control portion 90 measures the elapsed time since the start of display of the third message 56c on the basis of the clock of the CPU or the system clock. That is, the control portion 90 serves as an example of a discharge detection means (discharge detection portion) of the present example. When it is determined that discharge of toner has been completed, the control portion 90 increments the display of the indicators of the panel 400 (S517). The display of the indicators being incremented indicates a state in which the toner remainder amount of the process cartridge 20 has been increased, or indicates that discharge of toner from the toner pack 40 has been completed.

Next, the control portion 90 updates the toner information in the T memory 57 (S518). The toner information of the T memory 57 is updated including description indicating that the toner pack 40 is already used. Further, the control portion 90 moves the position of the locking member 7014 of the rotation locking mechanism 59 to the lock releasing position, and cancels the restriction state of the toner pack 40 (S519). Then, the control portion 90 causes the operation portion 300 to display a sixth message 56f prompting the user to perform an operation for detaching the used toner pack 40 from the replenishment container attaching portion 701 (S520). The fourth step of the present embodiment is the operation for detaching the replenishment container such as the toner pack 40 from the replenishment port 8012. The user rotates the toner pack 40 in accordance with the notified sixth message 56f (S521), and as a result of this, the toner pack 40 becomes detachable from the replenishment container attaching portion 701 (S522).

As described above, the control portion 90 changes the procedure in accordance with detection results of the toner remainder amount detection means 51, the attachment detection means 53, the rotation detection means 55, and the push-in detection means 56 when displaying the toner replenishment procedure on the operation portion 300. In the present example, it becomes possible for the user to recognize the progress status of the replenishment operation by displaying the toner replenishment procedure while the user is performing toner replenishment, and therefore the load of the toner replenishment on the user can be reduced. Further, since a configuration in which the toner does not scatter when the toner pack 40 is detached after attaching the toner pack 40 to the replenishment container attaching portion 701 is employed, the convenience for toner replenishment can be improved.

Example 2

(6-2) Guidance of Replenishment Procedure Using Toner Bottle Unit

Figure 24:
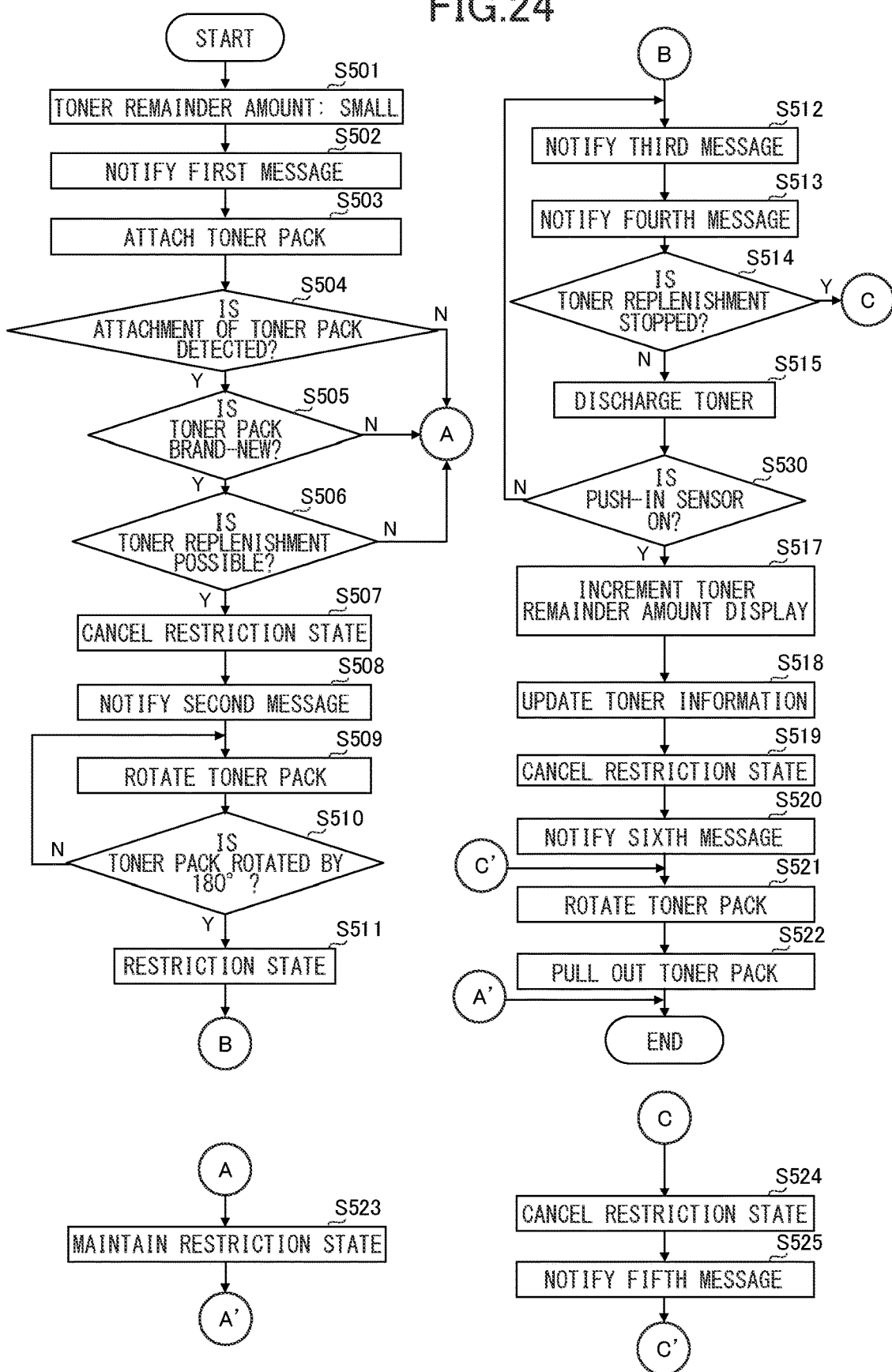
FIG. 24 is a flowchart illustrating a flow of a notification operation for a toner replenishment procedure according to Example 2.

Next, the flow of a guidance operation of the replenishment procedure using the toner bottle unit 900 will be described. FIG. 24 is a flowchart illustrating an example of a guidance operation of the replenishment procedure in a direct replenishment system. As described above, in the toner bottle unit 900, it becomes possible to discharge toner when the piston 902 is pushed in. Here, only the element of determining the completion of toner discharge on the basis of the output value of the push-in detection means 56 is different between the replenishment procedure using the toner bottle unit 900 and the replenishment procedure of Example 1 using the toner pack 40. That is, in the configuration of the present example, the completion of toner discharge is determined on the basis of whether or not the push-in operation of the piston 902 has been performed. In the description of the flowchart of FIG. 24, steps of the same operations as steps of the flowchart of FIG. 22 are denoted by the same reference signs, and redundant descriptions will be omitted.

In the case of replenishing the process cartridge 20 with toner by using the toner bottle unit 900, a screen prompting an operation of pushing in the piston 902 is displayed as the third message 56c. After the start of display of the third message 56c, the control portion 90 determines whether or not the piston 902 has been pushed in, on the basis of the output value of the push-in detection means 56. In the case where a stopping operation is performed without the piston 902 being pushed in (S514/Y), the control portion 90 stops the progress of the guidance of the toner replenishment procedure. Then, the control portion 90 cancels the restriction state of the toner bottle unit 900 by changing the position of the locking member 7014 of the rotation locking mechanism 59 to the lock releasing position (S524). In contrast, when the piston 902 is pushed in, toner is discharged from the toner bottle unit 900 to the replenishment port 8012 (S515). In the present example, for example, the push-in detection means 92 detects the push-in of the piston 902 when the first contact plate 908 and the second contact plate 909 in the connected state with each other are switched to the disconnected state. In the case of detecting that the piston 902 has been pushed in on the basis of the output value of the push-in detection means 56 (S530/Y), the control portion 90 determines that discharge of toner has been performed, and increments the display of the indicators of the panel 400 (S517). That is, the push-in detection means 56 serves as an example of a discharge detection means of the present example. Subsequent steps of the replenishment operation are the same as in the case of using the toner pack 40, and therefore description thereof will be omitted.

Other Examples

In Examples 1 and 2, the first message 56a, the second message 56b, the third message 56c, the fourth message 56d, the fifth message 56e, and the sixth message 56f are displayed in accordance with the progress of the toner replenishment operation. As an embodiment different from this, for example, the first message 56a, the second message 56b, the third message 56c, and the sixth message 56f may be collectively displayed on the display portion 301. In addition, at least one of the first message 56a, the second message 56b, the third message 56c, the fourth message 56d, the fifth message 56e, and the sixth message 56f may be displayed.

In addition, as a configuration for restricting the rotation of the replenishment container such as the toner pack 40 or the toner bottle unit 900, for example, the movement of the replenishment container may be restricted by providing a horizontal pin at the discharge port 42a or 9031. To be noted, the movement mode of the replenishment container such as the toner pack 40 or the toner bottle unit 900 is not limited to rotational movement, and linear movement may be restricted by the horizontal pin or the like.

In addition, the discharge mode of toner from the toner pack 40 is not limited to the operation of squeezing by the hand of the user, and toner may be discharged from the discharge port 42a by pulling down a clip provided in an upper portion of the toner pack 40.

In addition, as the stopping operation other than the operation on the buttons 310, a stopping command may be transmitted to the image forming apparatus 1 from the PC 2A or the portable information processing terminal 2B communicable with the image forming apparatus 1. In addition, the toner replenishment procedure may be displayed on the PC 2A or the portable information processing terminal 2B. In the case of causing the PC 2A or the portable information processing terminal 2B to execute the display of the toner replenishment procedure, the control portion 90 and the I/O interface 94 function as an input/output means (input/output portion) that provides and receives various information for guiding the replenishment procedure for replenishing toner to and from an external information processing apparatus.

(7) Control According to Type of Replenishment Container

The operation at the time of replenishing the image forming apparatus 1 with toner from the replenishment container will be described below. In the present embodiment, replenishment containers of a plurality of types accommodating different amounts of toner can be connected to one image forming apparatus 1. The user selecting the amount of toner that is supplied in one time of toner replenishment has a merit that the image forming apparatus 1 can be used more flexibly. Here, a case (Example 3) where toner bottles of a plurality of types having different capacities (charged amounts) are used as examples of the replenishment containers will be described.

Example 3

(7-1) Types of Toner Bottle Units

Figure 25A:
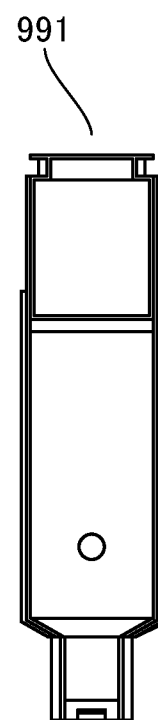
FIG. 25A is a diagram illustrating an example of a replenishment container according to Example 3.
Figure 25B:
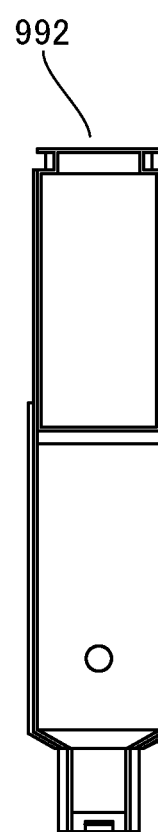
FIG. 25B is a diagram illustrating an example of a replenishment container according to Example 3.
Figure 25C:
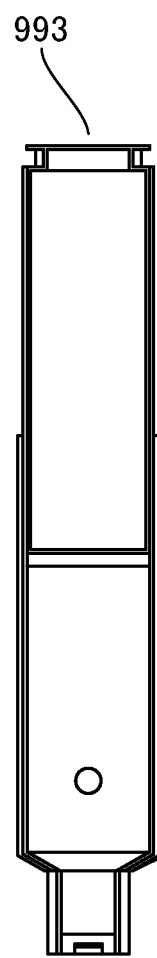
FIG. 25C is a diagram illustrating an example of a replenishment container according to Example 3.

FIGS. 25A to 25C illustrate types of the toner bottle unit 900 described above. FIG. 25A illustrates a toner bottle unit 991 of a small capacity, which accommodates toner for 1000 sheets in terms of the number of sheets to be printed on. FIG. 25B illustrates a toner bottle unit 992 of a medium capacity, which accommodates toner for 2000 sheets in terms of the number of sheets to be printed on. FIG. 25C illustrates a toner bottle unit 993 of a large capacity, which accommodates toner for 4000 sheets in terms of the number of sheets to be printed on. To be noted, "the number of sheets to be printed on" indicates the amount of increase in terms of the number of sheets of the recording material on which the image forming apparatus can form images, which increases by performing toner replenishment by using the toner bottle unit. In addition, "toner amount equivalent to 1000 sheets in terms of the number of sheets to be printed on" indicates the amount of toner consumption in the case of outputting images on 1000 sheets at an average image coverage (area ratio of toner image to the effective image region of the recording material) serving as a standard.

To be noted, the toner bottle units 991 to 993 each have the same configuration as the toner bottle unit 900 described above except that the capacity thereof is different from each other. Therefore, the toner bottle units 991 to 993 each include the T memory 57 such as the memory unit 911 serving as a storage means, and the first contact plate 908, the second contact plate 909, and the push-in detection rod 907 constituting the push-in detection means 56.

(7-2) Circuit Configuration of Toner Bottle Units

Figure 26:
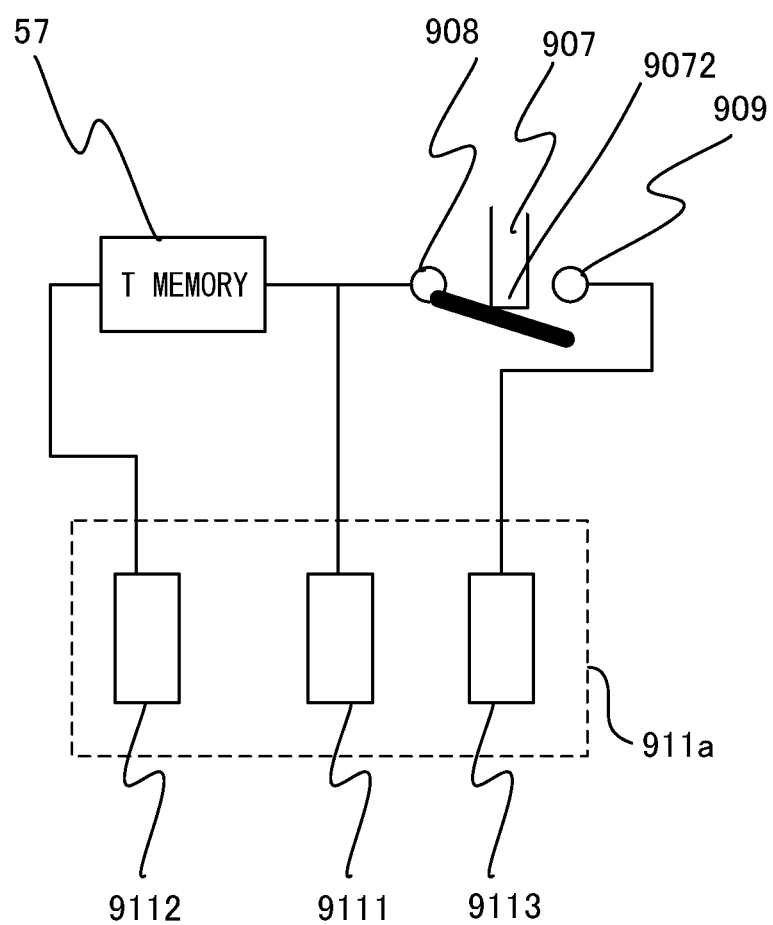
FIG. 26 is a diagram illustrating a configuration example of the replenishment container according to Example 3.

FIG. 26 illustrates the circuit configuration of the toner bottle units 991 to 993 including the T memory 57 and the push-in detection mechanism. The T memory 57 is connected to the metal plates 9111 and 9112, the first contact plate 908 is connected to the metal plate 9111, and the second contact plate 909 is connected to the metal plate 9113. In addition, when the toner bottle units 991 to 993 are attached to the replenishment container attaching portion 701, the metal plates 9111 to 9113 of the contact portion 911a are electrically connected to the control portion of the image forming apparatus via the contact portion 70133 (FIGS. 9A and 9B) of the replenishment container attaching portion 701.

The T memory 57 stores different capacity information (toner amount information) in accordance with the types of the toner bottle units 991 to 993. The T memory 57 is an example of a carrying means (carrying portion) that carries information with which the type of the replenishment container to which the T memory 57 is attached can be identified among replenishment containers of a plurality of types, and in the present example, carries capacity information as electronic information stored in the memory. In the case of the toner bottle unit 991 of a small capacity, capacity information indicating that toner of an amount equivalent to 1000 sheets in terms of the number of sheets to be printed on is stored in the T memory 57. In addition, in the case of the toner bottle units 992 and 993 of a medium capacity and a large capacity, capacity information indicating that toner of amounts respectively equivalent to 2000 sheets and 4000 sheets in terms of the number of sheets to be printed on is accommodated is stored in the T memory 57. Further, the T memory 57 stores a brand-new flag as information indicating whether or not the toner bottle units 991 to 993 are unused (brand-new) or already used for toner replenishment.

The control portion 90 of the image forming apparatus 1 connected to the T memory 57 via the contact portion 70133 obtains the capacity information stored in the T memory 57 via the metal plate 9111 and the metal plate 9112. That is, the contact portion 70133 is an example of an obtaining means (obtaining portion) with which the image forming apparatus obtains information indicating the type of the replenishment container. In the present example, the types of the toner bottle units 991 to 993 are specified as a result of the control portion 90 reading out the capacity information from the T memory 57 via the contact portion 70133. The method for communicating with the T memory 57 is a so-called two-line communication system in which a power supply line and a communication signal line are integrated, and communication is performed via the metal plate 9111 and the metal plate 9112. To be noted, a different method may be used as the communication method.

To be noted, the information that the control portion 90 obtains from the T memory 57 is not limited to information directly indicating the capacity of the toner bottle unit, and may be information that can identify which of the plurality of types having different capacities the toner bottle unit is. In this case, the control portion 90 can determine the capacity of the toner bottle unit by referring to the correspondence relationship between the type of the toner bottle unit stored in advance in a nonvolatile memory and the capacity thereof.

As described with reference to FIGS. 16A to 16D, when the piston 902 of the toner bottle units 991 to 993 is pushed, the contact canceling portion 9072 of the push-in detection rod 907 that is an insulator enters between the first contact plate 908 and the second contact plate 909, and the conduction is canceled. That is, FIG. 26 illustrates the circuit state after the piston 902 is pushed in. To be noted, in FIG. 26, a switch mechanism constituted by the first contact plate 908 and the second contact plate 909 is illustrated as an equivalent circuit symbol that is turned on/off by the push-in detection rod 907.

In the case where no current flows even when a voltage is applied between the metal plates 9111 and 9113, the control portion 90 of the image forming apparatus 1 determines that the piston 902 has been pushed in and discharge of toner accommodated in the toner bottle unit 991 to 993 has been completed. In contrast, in the case where conduction between the first contact plate 908 and the second contact plate 909 is established, the control portion 90 determines, on the basis of flow of current caused by applying a voltage between the metal plates 9111 and 9113, that the piston 902 has not been pushed in (brand-new state).

(7-3) Control in Toner Replenishment

Next, the operation of the image forming apparatus when toner replenishment is performed by using any one of the toner bottle units 991 to 993 having different capacities will be described.

While toner replenishment is not performed, the control portion 90 of the image forming apparatus 1 changes the display level of the panel 400 (FIGS. 14A to 14C) on the basis of the detection result of the toner remainder amount detection means 51 (FIG. 19). In the present example below, it is assumed that the display state of the panel 400 can be changed among 5-step display levels. In the case of the panel configuration illustrated in FIGS. 14A to 14C, for example, as a display level between FIGS. 14A and 14B, a state in which the light of the lower indicator 4003 is on and the light of the middle indicator 4002 flickers can be set. In addition, as a display level between FIGS. 14B and 14C, a state in which the lights of the middle and lower indicators 4002 and 4003 are on and the light of the upper indicator 4001 flickers can be set.

As a result of this, the display level of the panel 400 can be changed among at least six levels in total of the display states illustrated in FIGS. 14A to 14C and the display state of the Low level described above. At this time, one step of the display level corresponds to the toner amount of one toner bottle unit 991 of a small capacity, that is, the toner amount equivalent to 1000 sheets in terms of the number of sheets to be printed on. In other words, in the case where the image forming apparatus 1 repeats the image forming operation without performing toner replenishment, the display level of the panel 400 is lowered by one step each time image formation is performed on approximately 1000 sheets of the recording material.

An operation in the toner replenishment will be described with reference to FIG. 27. In the procedure of this flowchart, S501, S508, S511, S519, and S520 indicate operations performed by the user. The other steps are realized by the CPU 91 (FIG. 19) provided in the control portion 90 of the image forming apparatus 1 executing a program read out from the nonvolatile memory 93.

First, the user opens the opening/closing member 83 (FIG. 4C), and attaches one of the toner bottle units 991, 992, and 993 of a small capacity, a medium capacity, and a large capacity to the replenishment container attaching portion 701 (S501). Since the T memory 57 and the control portion 90 are connected as a result of this, the control portion 90 communicates with the T memory 57 and obtains the brand-new flag and the capacity information stored in the T memory 57 (S502). Further, the control portion 90 communicates with the P memory 58, and obtains remaining capacity information of the developer container 32 (S503). To be noted, the remaining capacity information of the developer container 32 in the P memory 58 is updated by the control portion 90 on the basis of the detection results of the toner remainder amount detection means 51 when needed.

The control portion 90 determines, on the basis of the value of the brand-new flag obtained from the T memory 57, whether or not the toner bottle unit 991 to 993 currently attached to the replenishment container attaching portion 701 is brand-new (S504). In addition, the control portion 90 compares the capacity information of the toner bottle unit 991 to 993 obtained from the T memory 57 with the remaining capacity information of the P memory 58, and determines whether or not the developer container 32 has enough remaining capacity (S505). That is, when the remaining capacity of the developer container 32 is larger than the capacity of the toner bottle unit 991 to 993 currently attached to the replenishment container attaching portion 701, it is determined that the developer container 32 has enough remaining capacity.

In the case where the toner bottle unit 991 to 993 that is currently attached is brand-new and the developer container 32 has enough remaining capacity, the control portion 90 operates the rotation locking mechanism 59 to release the lock of the replenishment port shutter 7013 (see S506 and FIG. 11A).

In contrast, in the case where the toner bottle unit 991 to 993 that is currently attached is not brand-new, the control portion 90 maintains the locked state of the replenishment port shutter 7013 (see S507 and FIG. 11B). Also in the case where the developer container 32 does not have enough remaining capacity, the control portion 90 maintains the locked state of the replenishment port shutter 7013 (see S507 and FIG. 11B). To be noted, in the case where the lock of the replenishment port shutter 7013 is not released, the user cannot rotate the toner bottle unit 991 to 993, and therefore the process does not proceed to subsequent steps S506 to S519. In this case, the procedure is finished by the user pulling out the toner bottle unit 991 to 993 (S520), and the image forming apparatus 1 returns to the state before the operation of toner replenishment is performed. As described above, the rotation locking mechanism 59 functions as a locking means that restricts an operation of causing the discharge port of the replenishment container attached to the replenishment port and the replenishment port to communicate with each other (rotation operation in the present embodiment), and whether or not the restriction is to be canceled is determined in accordance with information of the capacity of the attached replenishment container and so forth.

When the lock of the replenishment port shutter 7013 is released (S506), the user rotates the toner bottle unit 991 to 993 by 180° (S508). Then, the rotation detection means 55 detects that the replenishment port shutter 7013 has been rotated by 180° (S509), and the control portion 90 locks the rotation locking mechanism 59 on the basis of this (S510). As a result of this, the state in which the discharge port of the toner bottle unit 991 to 993 attached to the replenishment container attaching portion 701 communicates with the replenishment port 8012 is maintained without receiving the rotation operation of the toner bottle unit 991 to 993 by the user.

When the user pushes in the piston 902 of the toner bottle unit 991 to 993 to discharge the toner (S511), the push-in detection means 56 detects that the piston 902 has been pushed in (S512). That is, in this configuration example, the push-in detection means 56 is used as a discharge detection means that detects completion of toner discharge from the replenishment container. When completion of toner discharge is detected, the control portion 90 turns on the light of at least one of indicators of the panel 400 that is not on, and thus notifies the user that toner replenishment has been performed.

Here, the control portion 90 changes the amount of increment of the display level of the panel 400 in accordance with from which toner bottle among the toner bottle units 991 to 993 of a plurality of types having different capacities toner has been replenished (S513 to S516).

For example, it is assumed that toner replenishment is performed in a state in which it is indicated that the toner remainder amount in the developer container 32 is at the Low level. In this case, in the case where capacity information indicating the toner bottle unit 991 of a small capacity has been obtained in S502, the control portion 90 increases the display level of the panel 400 by one step (S514). In the case where capacity information indicating the toner bottle unit 992 of a medium capacity has been obtained in S502, the control portion 90 increases the display level of the panel 400 by two steps (S515). In the case where capacity information indicating the toner bottle unit 993 of a large capacity has been obtained in S502, the control portion 90 increases the display level of the panel 400 by four steps (S516).

As described above, the unit of increase and decrease of the indicators in the display means of the present example corresponds to the replenishment container (first replenishment container) of the smallest capacity among the plurality of types of replenishment containers. That is, in the case where toner replenishment has been performed by using the first replenishment container having the smallest capacity (for example, the toner bottle unit 991 of a small capacity) among the replenishment containers of a plurality of types, the indicators of the display means change by one step. In the case where toner replenishment has been performed by using a second replenishment container having a larger capacity than the first replenishment container (for example, the toner bottle unit 992 of a medium capacity) among the replenishment containers of a plurality of types, the indicators of the display means change by a plurality of steps.

After changing the display of the panel 400, the control portion 90 records in the T memory 57 that the toner pack has been used (S517), and releases the rotation locking mechanism 59 (S518). The user rotates the toner bottle unit 991 to 993 by 180° (S519), and pulls out the toner bottle unit 991 to 993 from the replenishment container attaching portion 701 (S520). As a result of this, the toner replenishment procedure for the image forming apparatus 1 is finished.

To be noted, although the procedure of toner replenishment using the toner bottle units 991 to 993 has been described, toner replenishment is also performed in basically the same manner in a case of using a different replenishment container such as the toner pack 40. Therefore, the control portion 90 can determine the type of the toner pack by accessing the T memory 57 (memory unit 45) of the toner pack 40 attached to the replenishment container attaching portion 701.

Figure 27:
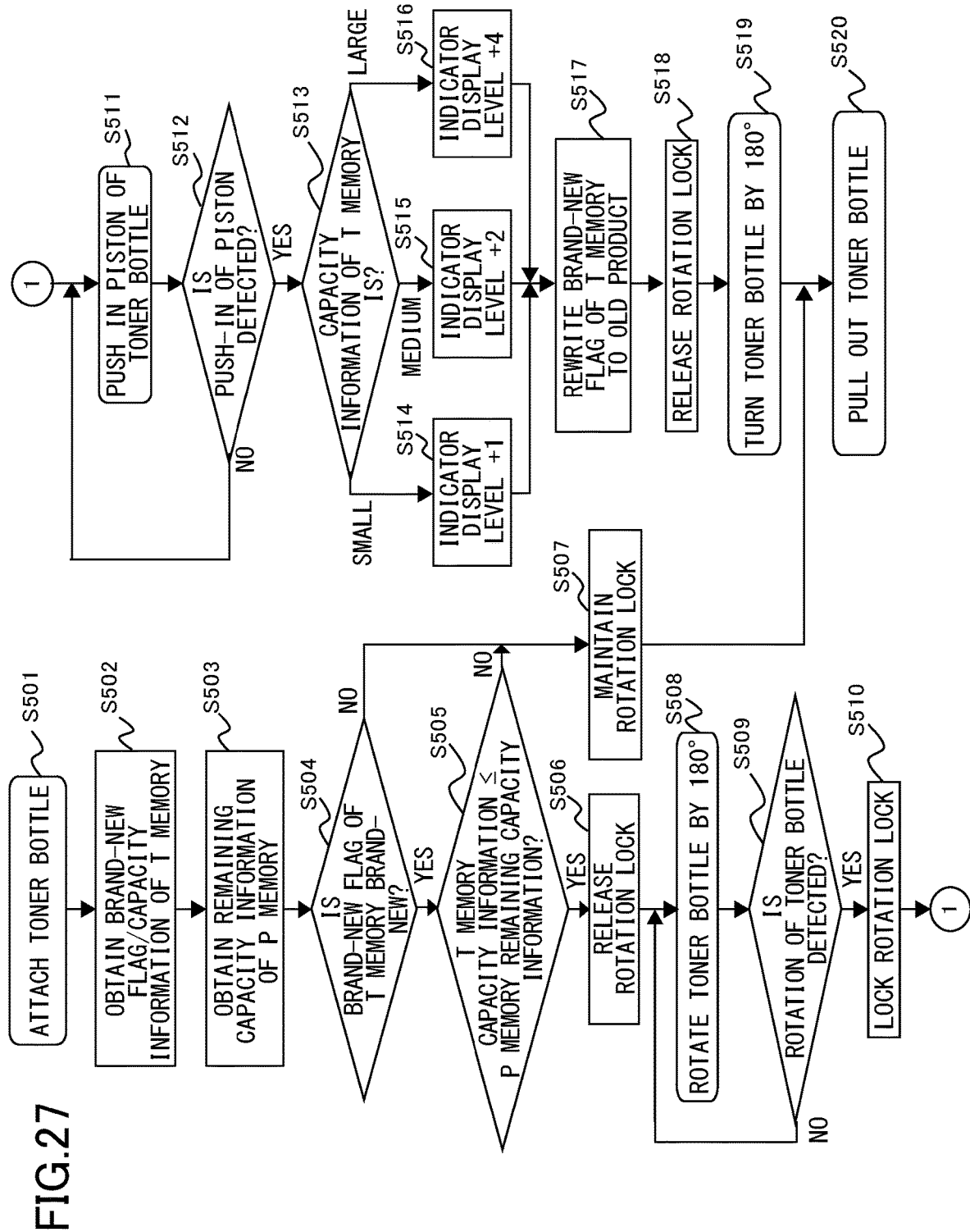
FIG. 27 is a flowchart illustrating a control method for an image forming apparatus according to Example 3.

However, in the case of a toner pack, since the push-in operation of a piston is not performed, the completion of toner discharge is detected by a different discharge detection means instead of steps S511 and S512 of FIG. 27. Specifically, there is a method of determining completion of discharge in response to the elapse of a predetermined time since the time point at which rotation of the toner bottle is detected in S509. In addition, for example, there is a method of, after detecting the rotation of the toner bottle in S509, displaying a button notifying that toner discharge has been completed on the operation portion 300, and determining completion of toner discharge on the basis of the user pushing the button.

As described above, in the present example, in a configuration in which the toner bottle units 991 to 993 of a plurality of types having different capacities can be used, when a toner bottle unit is attached to the image forming apparatus, the control portion 90 reads capacity information from the T memory 57 of the toner bottle unit. In other words, in a configuration in which replenishment containers of a plurality of types accommodating different amounts of toner can be used, the control portion 90 serving as a determination means (determination portion) determines the type of the replenishment container by reading the capacity information stored in the T memory 57 serving as an example of a carrying means (S502 of FIG. 27).

According to this determination result, the control portion 90 can perform an appropriate operation of the image forming apparatus corresponding to the type of the replenishment container used by the user for toner replenishment. For example, in S505 of FIG. 27, overflow of toner from the developer container 32 is prevented by monitoring whether or not the amount of toner accommodated in the replenishment container exceeds the remaining capacity of the developer container 32. In addition, in S513 to S516 of FIG. 27, the display level of the panel 400 is changed in accordance with the type of the replenishment container used in the toner replenishment of this time. As a result of this, the user can quickly recognize change in the amount of toner with which the developer container 32 can be replenished, without waiting for reflection of the detection result of the toner remainder amount detection means after toner replenishment on the display level of the panel 400.

To be noted, the determination on the remaining capacity described above (S505) and the display control of the panel (S513 to S516) are each an example of an operation performed in accordance with the determination result of the type of the replenishment container, and the control portion 90 may use the determination result of the type of the replenishment container for a different operation. For example, a message indicating that the replenishment container has been attached to the replenishment container attaching portion 701 and indicating the type of the replenishment container may be displayed on the display portion 301 (FIG. 20A) of the operation portion 300 or the display 560 (FIG. 20B) of the external device subsequently to S502 of FIG. 27.

Figure 28:
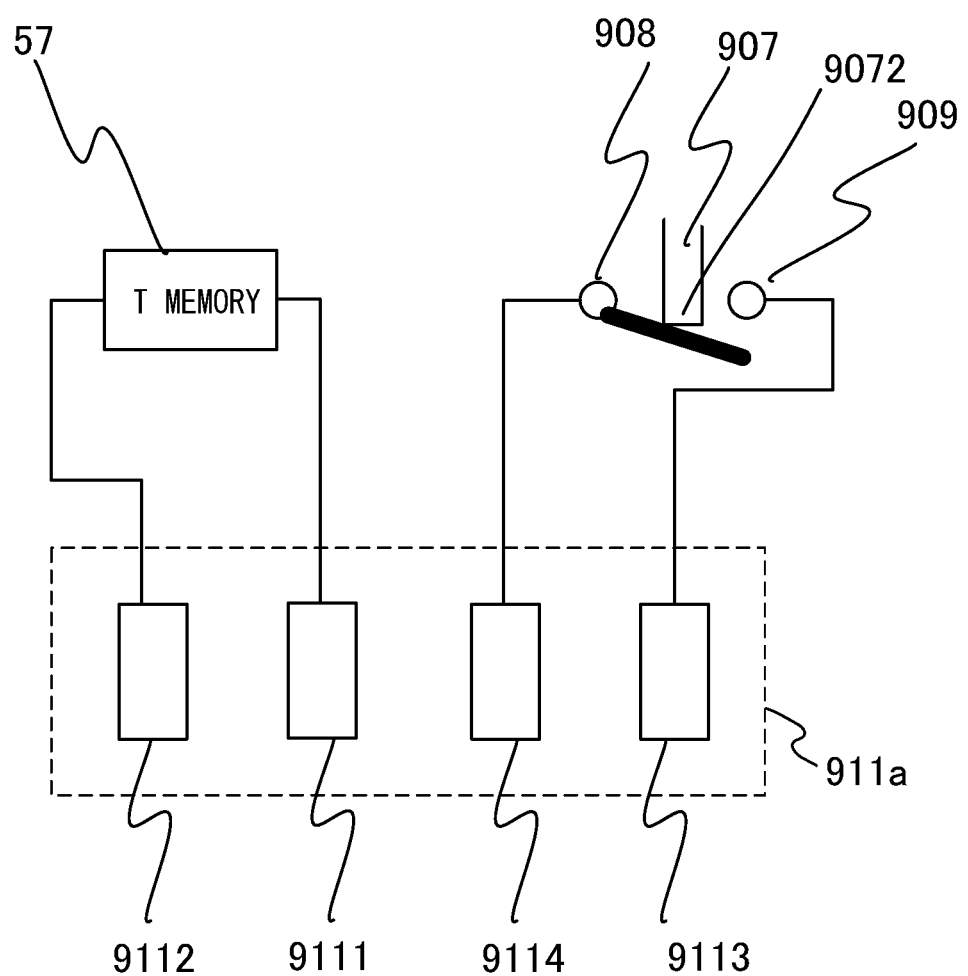
FIG. 28 is a diagram illustrating another configuration example of the replenishment container according to Example 3.

In addition, although an example of a circuit configuration of the push-in detection mechanism of the toner bottle unit is illustrated in FIG. 26, a different circuit configuration may be used. Although the same metal plate 9111 is used as both a contact connected to the memory unit 911 and a contact of the push-in detection mechanism in this circuit configuration, these contacts may be separately provided as illustrated in FIG. 28. In this circuit configuration, the memory unit 911 is connected to the metal plates 9111 and 9112, the first contact plate 908 of the push-in detection mechanism is connected to the metal plate 9114, and the second contact plate 909 is connected to the metal plate 9113. Also in this case, the control portion 90 can read the capacity information by accessing the T memory 57 via the metal plates 9111 and 9112 in a state in which the toner bottle unit is attached to the replenishment container attaching portion 701. To be noted, also in this circuit configuration, the control portion 90 can detect that the piston of the toner bottle unit has been pushed in and discharge of toner has been performed, on the basis of the presence or absence of the conduction between the metal plates 9113 and 9114.

In addition, the T memory 57 used as a carrying means in the present embodiment serves as an example of a storage medium that stores the capacity information, which is information indicating the type of the replenishment container, as electronic information. However, the carrying means (storage means for information indicating the type of the replenishment container) of the present disclosure is not limited to an electronic storage medium as will be described in the embodiments below.

Second Embodiment

A second embodiment will be described. The present embodiment is different from Example 3 of the first embodiment in the configuration and method for determining the types of replenishment containers having different capacities. The other elements having the same configuration and effect as in the first embodiment will be denoted by the same reference signs as in the first embodiment, and description thereof will be omitted.

(Capacity Detection Using Resistor)

Figure 29A:
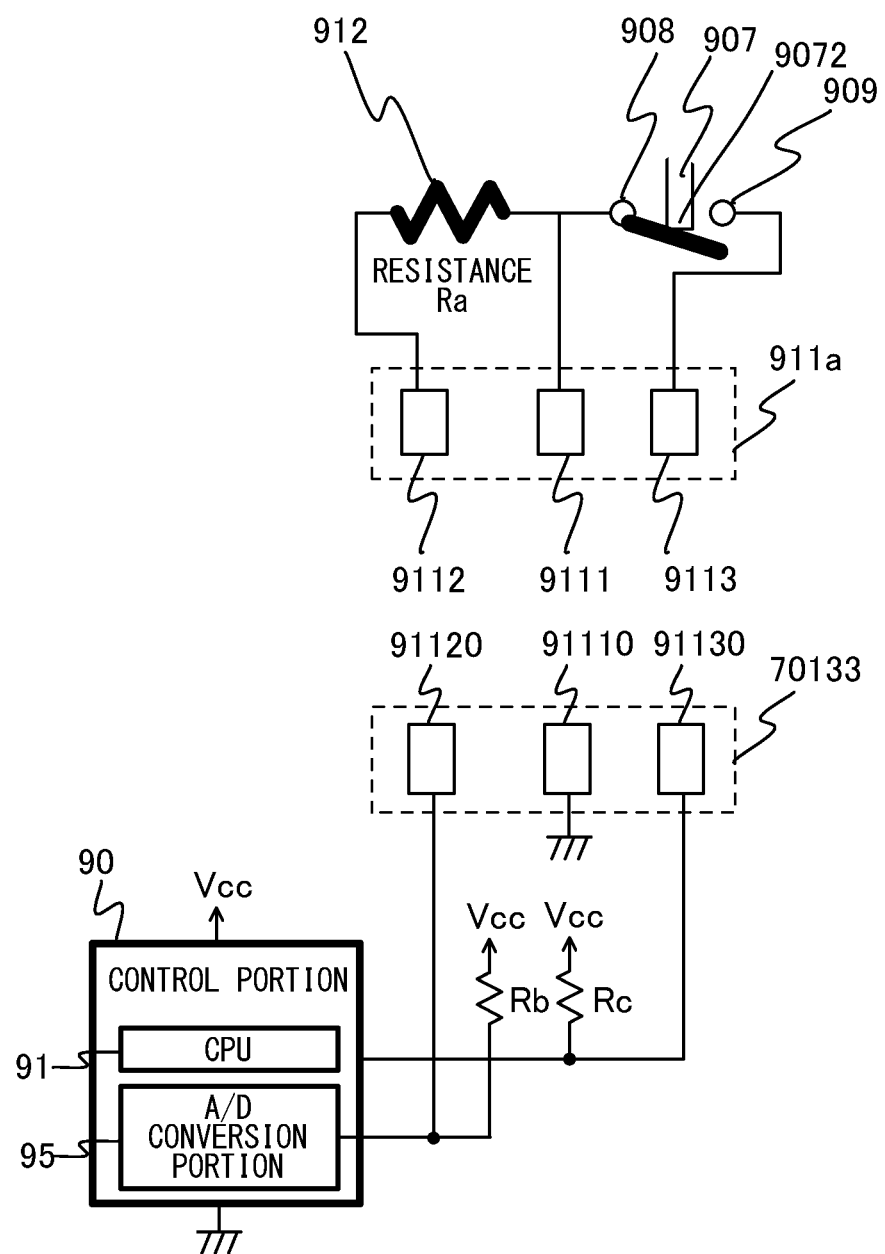
FIG. 29A is a diagram illustrating a circuit configuration of an image forming apparatus and a replenishment container according to a second embodiment.

Also in the present embodiment, as examples of the replenishment containers of a plurality of types having different capacities, the toner bottle units 991, 992, and 993 of a small capacity, a medium capacity, and a large capacity illustrated in FIGS. 25A to 25C will be described. To be noted, in the present embodiment, a resistor 912 is used as a carrying means (storage means) for carrying the information of the replenishment container as illustrated in FIG. 29A instead of the memory unit that is a storage medium for storing electronic information.

A plurality of types of resistors 912 having different resistance values are prepared, and resistors of types corresponding to the types of the toner bottle units 991 to 993 are respectively attached thereto. Specifically, a resistor 912 of a resistance value Ra is attached to the toner bottle unit 991 of a small capacity accommodating toner for 1000 sheets in terms of the number of sheets to be printed on. A resistor 912 of a resistance value 2Ra is attached to the toner bottle unit 992 of a medium capacity accommodating toner for 2000 sheets in terms of the number of sheets to be printed on. A resistor 912 of a resistance value 4Ra is attached to the toner bottle unit 993 of a large capacity accommodating toner for 4000 sheets in terms of the number of sheets to be printed on. In any of these cases, the resistor 912 is connected to the metal plates 9111 and 9112 of the contact portion 911a.

As described above, the resistor 912 serving as a carrying means (storage means) of the present embodiment carries information (capacity information) related to the type of the replenishment container as a value of a resistance value. That is, the resistance value Ra indicates the capacity information corresponding to the toner amount for 1000 sheets, the resistance value 2Ra indicates the capacity information corresponding to the toner amount for 2000 sheets, and the resistance value 4Ra indicates the capacity information corresponding to the toner amount for 4000 sheets.

The control portion 90 of the image forming apparatus can confirm the resistance value of a resistor 912 by applying a voltage to the resistor 912 via the contact portion 70133 provided in the replenishment container attaching portion 701. That is, a voltage is applied to the metal plate 9112 via the contact 91120 of the contact portion 70133. To be noted, it is assumed that the voltage applied to the metal plate 9112 is obtained by dividing the voltage Vcc with the resistance of the resistance value Ra, and the contact 91110 in contact with the other metal plate 9111 is grounded. The control portion 90 confirms the resistance value of the resistor 912 by obtaining the voltage value on the resistor 912 side via the A/D conversion portion 95.

Here, the operation of the push-in detection means 56 (FIG. 19) will be also described with reference to FIG. 29A. The configuration of the push-in detection mechanism in the toner bottle unit is the same as that described with reference to FIGS. 16A to 16D. That is, the first contact plate 908 is connected to the metal plate 9111 of the contact portion 911a, and the second contact plate 909 is connected to the other metal plate 9113 of the contact portion 911a. Further, when the piston 902 is pushed in, the push-in detection rod 907 slides in accordance with the piston 902, and the contact canceling portion 9072 of the push-in detection rod 907 cancels the conduction between the first contact plate 908 and the second contact plate 909 (also see FIGS. 16A to 16D). In addition, the contact 91130 of the contact portion 70133 is connected to the second contact plate 909 via the metal plate 9113, and the contact 91110 is connected to the first contact plate 908 via the metal plate 9111. To be noted, in FIG. 29, a switch mechanism constituted by the first contact plate 908 and the second contact plate 909 is illustrated as an equivalent circuit symbol that is switched on/off by the push-in detection rod 907.

The control portion 90 of the image forming apparatus can detect the push-in of the piston 902 by monitoring the presence or absence of the conduction between the first contact plate 908 and the second contact plate 909 via the contact portion 70133 provided in the replenishment container attaching portion 701. That is, in a state in which the toner bottle unit is attached to the replenishment container attaching portion 701 and the piston 902 is not pushed in, the contact 91130 is grounded via the first contact plate 908 and the second contact plate 909 in the connected state. Therefore, the voltage value detected by the CPU 91 is 0 [V]. In contrast, when the piston 902 is pushed in, the conduction between the first contact plate 908 and the second contact plate 909 is canceled, and therefore the voltage value detected by the CPU 91 changes to Vcc [V]. On the basis of such change in the voltage value, the control portion 90 determines that the piston has been pushed in.

(Control in Toner Replenishment)

Next, the control of the panel 400 when toner replenishment is performed by using the toner bottle units 991 to 993 having different capacities will be described.

An operation performed in toner bottle replenishment will be described with reference to FIG. 30. In this flowchart, steps other than S601, S608, S611, S619, and S620, which are user operations, are realized by the CPU 91 (FIG. 19) provided in the control portion 90 of the image forming apparatus 1 executing a program read out from the nonvolatile memory 93.

First, the user opens the opening/closing member 83 (FIG. 4C), and attaches one of the toner bottle units 991 to 993 of the small capacity, medium capacity, and large capacity to the replenishment container attaching portion 701 (S601). As a result of this, the resistor 912 is connected to the control portion 90, and therefore the control portion 90 obtains the voltage value from the circuit including the resistor 912 via the A/D conversion portion 95, and obtains the capacity information of the toner bottle unit 991 to 993 on the basis of the obtained voltage value (S602). Specifically, in the case where the voltage value obtained by the A/D conversion portion 95 of FIG. 29A is Vcc×Ra/(Ra+Rb), the control portion 90 determines that the capacity information indicates the toner amount for 1000 sheets in terms of the number of sheets to be printed on. In addition, in the case where the voltage value obtained by the A/D conversion portion 95 is Vcc×2Ra/(2Ra+Rb), the control portion 90 determines that the capacity information indicates the toner amount for 2000 sheets in terms of the number of sheets to be printed on. In addition, in the case where the voltage value obtained by the A/D conversion portion 95 is Vcc×4Ra/(4Ra+Rb), the control portion 90 determines that the capacity information indicates the toner amount for 4000 sheets in terms of the number of sheets to be printed on. Further, the control portion 90 communicates with the P memory 58 to obtain the remaining capacity information of the developer container 32 stored in the P memory 58 (S603).

The control portion 90 compares the capacity information of the toner bottle unit 991 to 993 determined on the basis of the resistance value of the resistor 912 with the remaining capacity information of the P memory 58, and determines whether or not the developer container 32 has enough remaining capacity (S605). That is, when the remaining capacity of the developer container 32 is larger than the capacity of the toner bottle units 991 to 993 currently attached to the replenishment container attaching portion 701, it is determined that the developer container 32 has enough remaining capacity.

In the case where the developer container 32 has enough remaining capacity, the control portion 90 operates the rotation locking mechanism 59 and releases the lock of the replenishment port shutter 7013 (see S606 and FIG. 11A). In contrast, in the case where the developer container 32 does not have enough remaining capacity, the control portion 90 maintains the locked state of the replenishment port shutter 7013 (see S607 and FIG. 11B). In the case where the lock of the replenishment port shutter 7013 is not released, since the user cannot rotate the toner bottle units 991 to 993, the process does not proceed to subsequent steps S606 to S619. In this case, the user pulls out the toner bottle units 991 to 993, thus the procedure is finished (S620), and the image forming apparatus 1 returns to the state before the operation of toner replenishment is performed.

To be noted, a step for checking, by the push-in detection means 56, whether or not the piston 902 of the toner bottle unit 991 to 993 is pushed in may be provided between S603 and S605. At this time, in the case where the toner bottle unit is in the state before the piston push-in (in the case where the first contact plate 908 and the second contact plate 909 are in the connected state), it is determined that the toner bottle unit is brand-new, and the process proceeds to S605. In addition, in the case where the toner bottle unit is in the state after the piston push-in (in the case where the conduction between the first contact plate 908 and the second contact plate 909 is disconnected), it is determined that the toner bottle unit has been used, and the process proceeds to S607.

When the lock of the replenishment port shutter 7013 is released (S606), the user rotates the toner bottle units 991 to 993 by 180° (S608). Then, the rotation detection means 55 detects that the replenishment port shutter 7013 has been rotated by 180° (S609), and the control portion 90 locks the rotation locking mechanism 59 on the basis of this (S610). As a result of this, the state in which the discharge port of the toner bottle units 991 to 993 attached to the replenishment container attaching portion 701 communicates with the replenishment port 8012 is maintained without receiving the rotation operation of the toner bottle units 991 to 993 by the user.

The user pushes in the piston 902 of the toner bottle unit 991 to 993 to discharge the toner (S611), the push-in detection means 56 detects that the piston 902 has been pushed in (S612). That is, in this configuration example, completion of toner discharge from the replenishment container is determined on the basis of a detection result of the push-in detection means 56. When completion of toner discharge is detected, the control portion 90 turns on the light of at least one of indicators of the panel 400 that is not on, and thus notifies the user that toner replenishment has been performed.

Here, the control portion 90 changes the amount of increment of the display level of the panel 400 in accordance with from which toner bottle among the toner bottle units 991 to 993 of a plurality of types having different capacities toner has been replenished (S613 to S616).

For example, it is assumed that toner replenishment is performed in a state in which it is indicated that the toner remainder amount in the developer container 32 is at the Low level. In this case, in the case where capacity information indicating the toner bottle unit 991 of a small capacity has been obtained in S602, the control portion 90 increases the display level of the panel 400 by one step (S614). In the case where capacity information indicating the toner bottle unit 992 of a medium capacity has been obtained in S602, the control portion 90 increases the display level of the panel 400 by two steps (S615). In the case where capacity information indicating the toner bottle unit 993 of a large capacity has been obtained in S602, the control portion 90 increases the display level of the panel 400 by four steps (S616).

After changing the display of the panel 400, the control portion 90 releases the rotation locking mechanism 59 (S618). The user rotates the toner bottle units 991 to 993 by 180° (S619), and pulls out the toner bottle units 991 to 993 from the replenishment container attaching portion 701 (S620). As a result of this, the toner replenishment procedure for the image forming apparatus 1 is finished.

As described above, in the present embodiment, when a toner bottle unit is attached to the image forming apparatus, the control portion 90 measures the resistance value of the resistor 912 of the toner bottle unit, and thus obtains the capacity information of the toner bottle unit. In other words, in a configuration in which replenishment containers of a plurality of types accommodating different amounts of toner can be used, the control portion 90 serving as a determination means determines the type of the replenishment container on the basis of the resistance value of the resistor 912 serving as an example of a carrying means (S502 of FIG. 27). By using this determination result, the control portion 90 can appropriately operate the image forming apparatus in accordance with the type of the replenishment container the user attempts to use for toner replenishment.

Figure 29B:
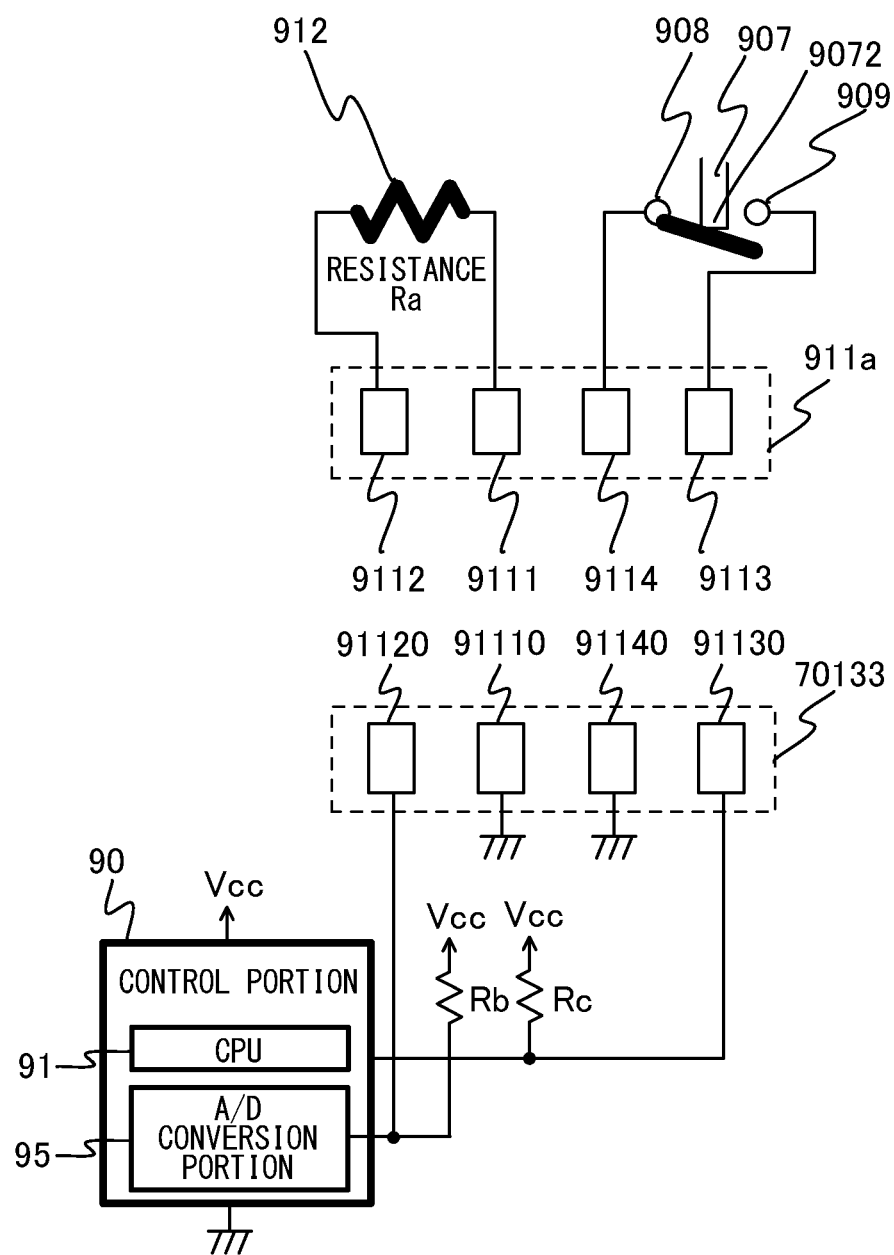
FIG. 29B is a diagram illustrating a circuit configuration of the image forming apparatus and the replenishment container according to the second embodiment.

To be noted, although the same metal plate 9111 is used as both a contact connected to the resistor 912 and a contact of the push-in detection mechanism in this circuit configuration, these contacts may be separately provided as illustrated in FIG. 29B. In this circuit configuration, the resistor 912 is connected to the metal plates 9111 and 9112, the first contact plate 908 of the push-in detection mechanism is connected to the metal plate 9114, and the second contact plate 909 is connected to the metal plate 9113. Also in this case, the control portion 90 can obtain the capacity information of the toner bottle unit on the basis of the resistance value of the resistor 912 via the metal plates 9111 and 9112 in a state in which the toner bottle unit is attached to the replenishment container attaching portion 701. To be noted, also in this circuit configuration, the control portion 90 can detect that the piston of the toner bottle unit has been pushed in and discharge of toner has been performed, on the basis of the presence or absence of the conduction between the metal plates 9113 and 9114.

To be noted, although the procedure of toner replenishment using the toner bottle units 991 to 993 has been described, toner replenishment is also performed in basically the same manner in a case of using a different replenishment container such as the toner pack 40. Therefore, the control portion 90 can determine the type of the toner pack by detecting the resistance value of the resistor provided in the toner pack 40 attached to the replenishment container attaching portion 701.

Third Embodiment

A mode in which the wiring pattern between a plurality of contacts provided in the replenishment container differs depending on the type of the replenishment container will be described as a third embodiment. The present embodiment is different from the first and second embodiments in the configuration and method for determining the types of replenishment containers having different capacities. The other elements having the same configuration and effect as in the first and second embodiments will be denoted by the same reference signs as in the first and second embodiments, and description thereof will be omitted.

Figure 31A:
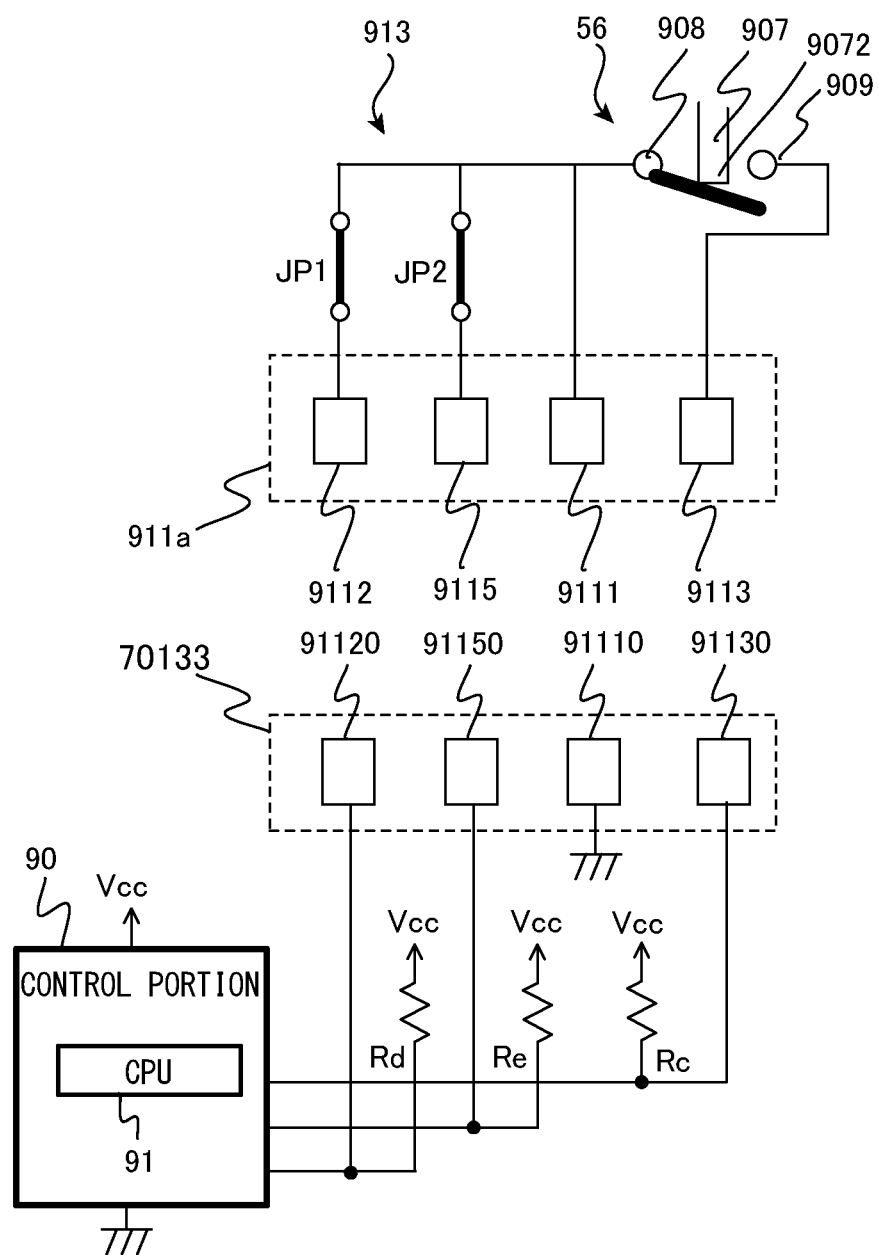
FIG. 31A is a diagram illustrating a circuit configuration of the image forming apparatus and the replenishment container according to the second embodiment.
Figure 31B:
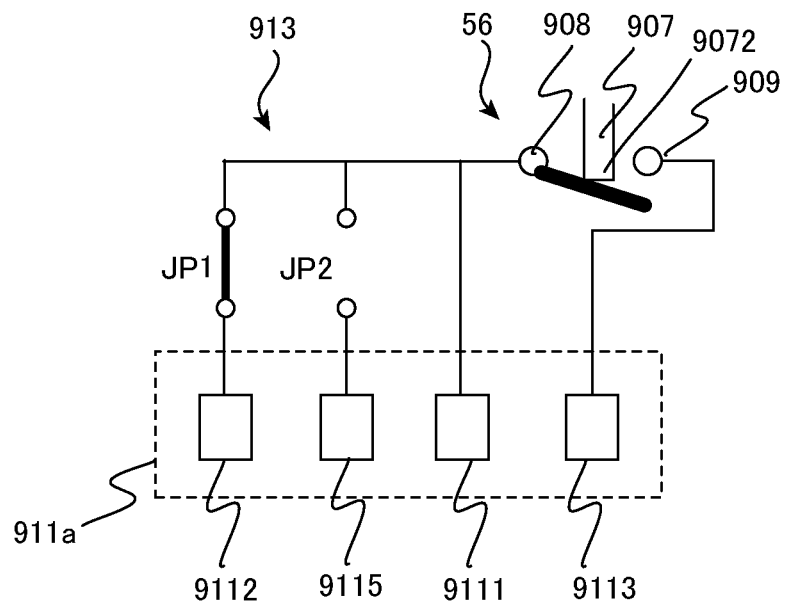
FIG. 31B is a diagram illustrating a circuit configuration of the image forming apparatus and the replenishment container according to the second embodiment.
Figure 31C:
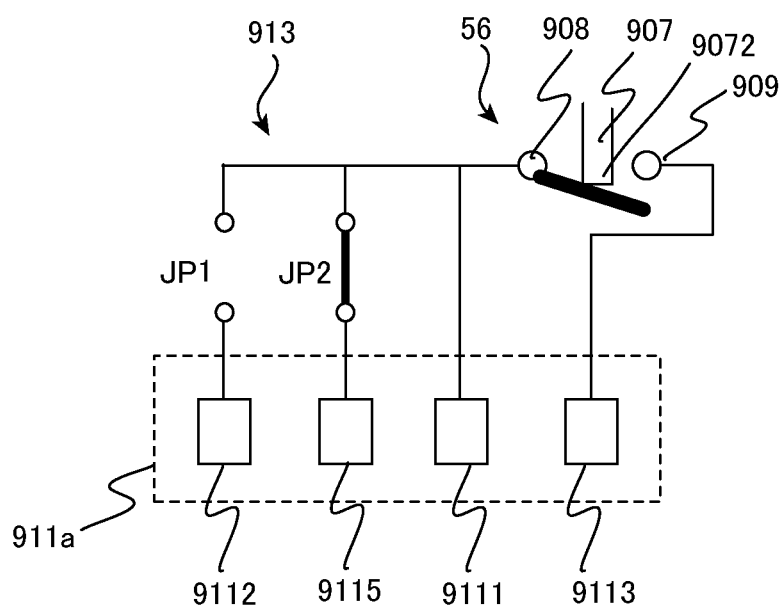
FIG. 31C is a diagram illustrating a circuit configuration of the image forming apparatus and the replenishment container according to the second embodiment.

FIGS. 31A to 31C illustrate configuration examples of wiring patterns 913 of metal plates 9111, 9112, and 9115 exposed to the contact portion 911a in the case of using the toner bottle units 991, 992, and 993 of a small capacity, a medium capacity, and a large capacity as the replenishment container.

To be noted, the contact portion 70133 of the replenishment container attaching portion 701 includes contacts 91110, 91120, 91130, and 91150 respectively connected to the metal plates 9111, 9112, 9113, and 9115 in the case where the toner bottle units 991 to 993 are attached thereto. The contact 91110 is connected to the ground potential. The contacts 91120 and 91150 are respectively connected to the supply voltage (Vcc) respectively via resistors having resistance values Rd and Re.

FIG. 31A illustrates a circuit configuration of the toner bottle unit 991 of a small capacity, and metal plates JP1 and JP2 are disposed therein. In this case, the metal plate 9112 and the metal plate 9115 are in conduction with the metal plate 9111 all the time respectively via the metal plate JP1 and the metal plate JP2.

FIG. 31B illustrates a circuit configuration of the toner bottle unit 992 of a medium capacity, the metal plate JP1 is disposed therein, and the metal plate JP2 is not disposed therein. In this case, whereas the metal plate 9112 is in conduction with the metal plate 9111 all the time via the metal plate JP1, the metal plate 9115 is insulated from the metal plate 9111.

FIG. 31C illustrates a circuit configuration of the toner bottle unit 993 of a large capacity, in which the metal plate JP2 is disposed therein, and the metal plate JP1 is not disposed therein. In this case, whereas the metal plate 9112 is insulated from the metal plate JP1, the metal plate 9115 is in conduction with the metal plate 9111 all the time via the metal plate JP2.

In the case where the toner bottle unit 991 to 993 is attached to the replenishment container attaching portion 701, the control portion 90 can determine the type of the toner bottle units 991 to 993 by electrically detecting the presence or absence of the metal plates JP1 and JP2. That is, a current that flows through the contact 91120 at the time of attaching the toner bottle unit units 991 to 993 is Vcc/Rd in the case where the metal plate JP1 is present (FIGS. 31A and 31B), and is 0 in the case where the metal plate JP1 is not present (FIG. 31C). In addition, a current that flows through the contact 91150 at the time of attaching the toner bottle unit units 991 to 993 is Vcc/Re in the case where the metal plate JP2 is present (FIGS. 31A and 31C), and is 0 in the case where the metal plate JP2 is not present (FIG. 31B)

As described above, in the present embodiment, the wiring pattern 913 of the electric circuit provided in the replenishment container defers depending on the type of the replenishment container. In other words, in the present embodiment, the wiring pattern 913 that differs depending on the presence or absence of the metal plates JP1 and JP2 functions as a carrying means that carries information of the replenishment container.

In the case where the replenishment container is connected to the replenishment container attaching portion 701, the control portion 90 can determine the type of the replenishment container by detecting the difference in the wiring path in the replenishment container on the basis of the presence or absence of the current flowing via each contact of the contact portion 70133 with the replenishment container. The method for controlling the operation of the image forming apparatus when the user performs toner replenishment by using the determination result is the same as in the first and second embodiments, and therefore the description thereof will be omitted.

To be noted, although difference is generated in the wiring pattern 913 by changing the presence or absence of the metal plates JP1 and JP2 in accordance with the type of the replenishment container in the present embodiment, for example, the difference in the wiring pattern 913 may be generated by changing the presence or absence of the metal plates 9112 and 9115. Also in this case, the control portion 90 can determine the type of the replenishment container on the basis of the presence or absence of the current flowing via each contact of the contact portion 70133 in a state in which the replenishment container is attached to the replenishment container attaching portion 701.

Figure 32:
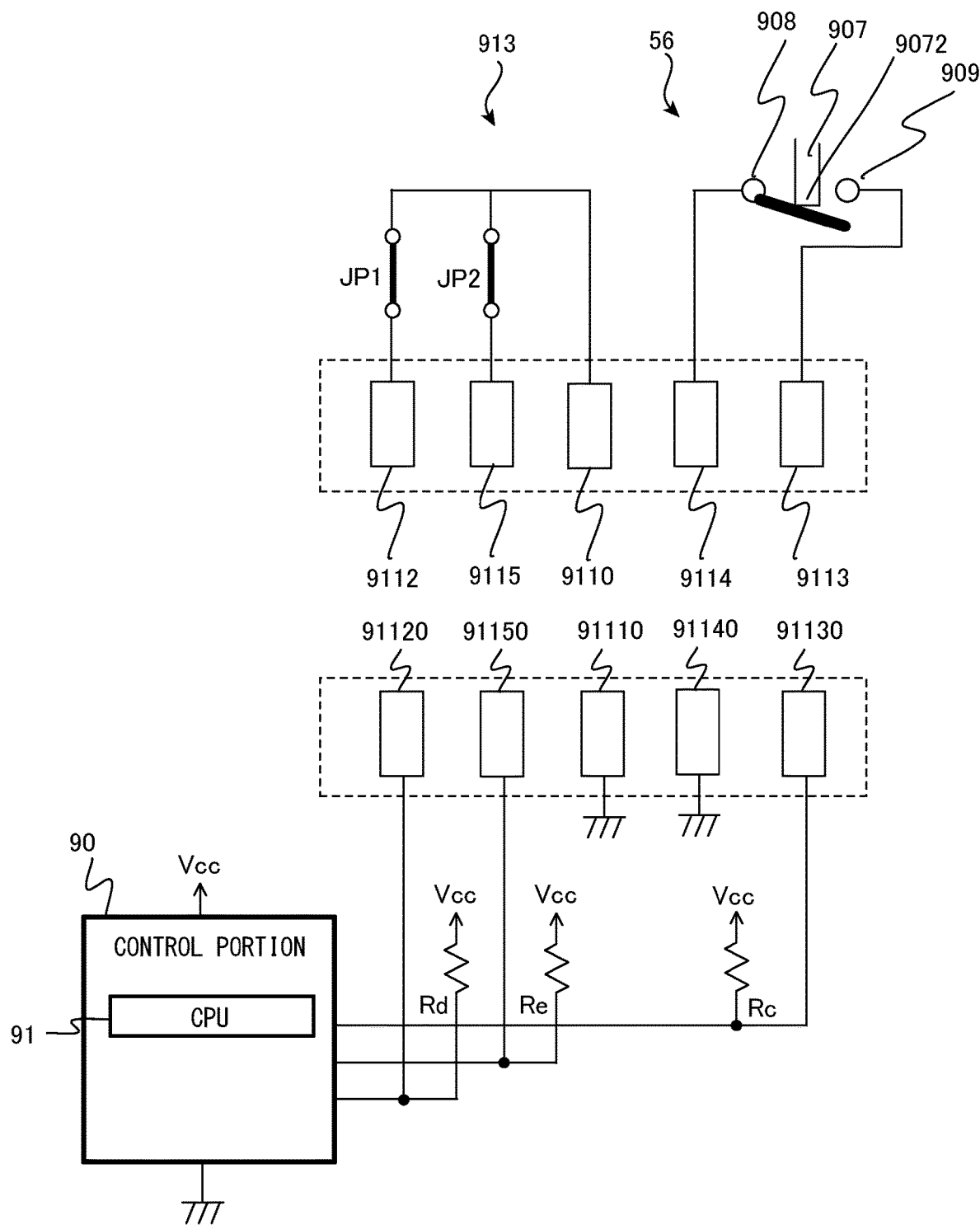
FIG. 32 is a diagram illustrating a modification example of a circuit configuration of an image forming apparatus and a replenishment container according to a third embodiment.

In addition, although the metal plate 9111 is used as both a contact of the wiring pattern 913 indicating the type of the replenishment container and a contact of the push-in detection mechanism in the examples illustrated in FIGS. 31A to 31C, these contacts may be separately provided as illustrated in FIG. 32. In this circuit configuration, the metal plate 9111 is part of the wiring pattern 913, the first contact plate 908 of the push-in detection mechanism is connected to the metal plate 9114, and the second contact plate 909 is connected to the metal plate 9113.

Fourth Embodiment

A mode in which the shape of part of the replenishment container differs depending on the type of the replenishment container will be described as a fourth embodiment. The present embodiment is different from the first to third embodiments in the configuration and method for determining the types of replenishment containers having different capacities. The other elements having the same configuration and effect as in the first to third embodiments will be denoted by the same reference signs as in the first to third embodiments, and description thereof will be omitted.

Figure 33A:
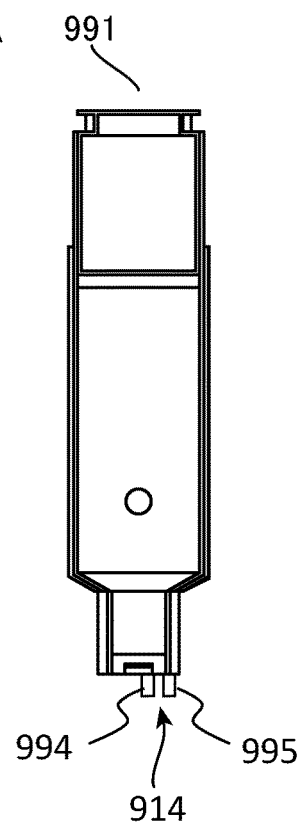
FIG. 33A is a diagram illustrating an example of a replenishment container according to a fourth embodiment.
Figure 33B:
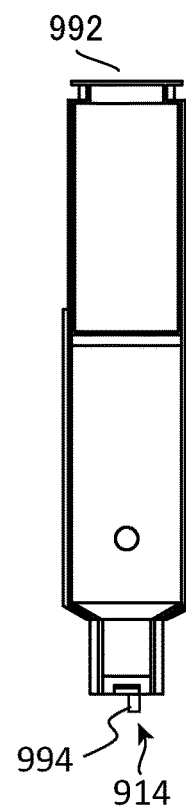
FIG. 33B is a diagram illustrating an example of a replenishment container according to the fourth embodiment.
Figure 33C:
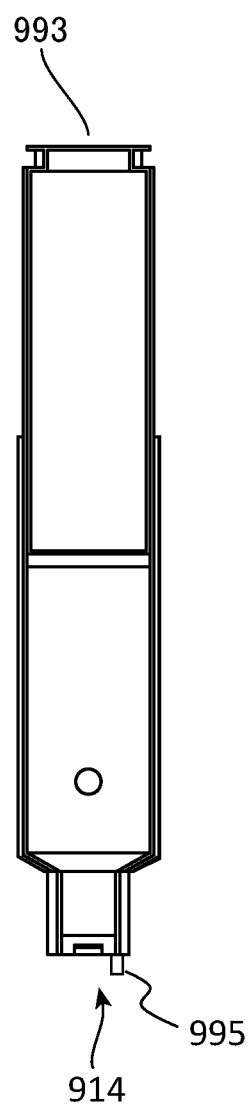
FIG. 33C is a diagram illustrating an example of a replenishment container according to the fourth embodiment.
Figure 34:
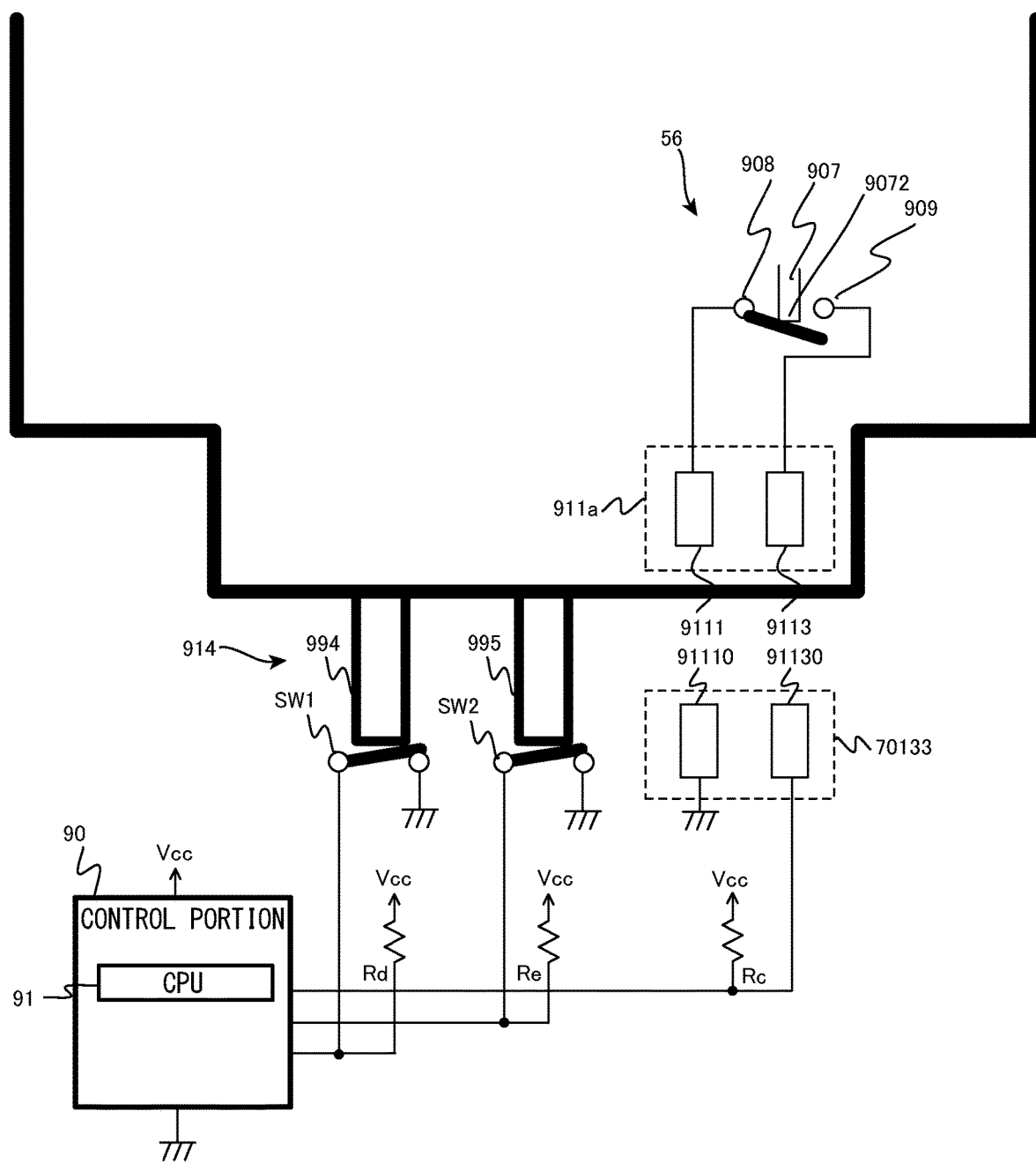
FIG. 34 is a diagram illustrating a configuration of an image forming apparatus and the replenishment container according to the fourth embodiment.

FIGS. 33A to 33C illustrate the toner bottle units 991, 992, and 993 serving as replenishment containers of the present embodiment. FIG. 33A illustrates the toner bottle unit 991 of a small capacity, and two protrusions 994 and 995 are provided at an end portion on the downstream side in the insertion direction to the replenishment container attaching portion 701. FIG. 33B illustrates the toner bottle unit 992 of a medium capacity, and one protrusion 994 is provided at an end portion on the downstream side in the insertion direction to the replenishment container attaching portion 701. FIG. 33C illustrates the toner bottle unit 993 of a large capacity, and the other one protrusion 995 is provided at an end portion on the downstream side in the insertion direction to the replenishment container attaching portion 701.

As described above, the toner bottle units 991 to 993 of a plurality of types having different capacities have shape patterns 914 formed in different shapes for the respective types. The shape patterns 914 serve as examples of a carrying means (storage means) that carries information of the replenishment container as a physical shape.

The control portion 90 of the image forming apparatus determines the types of the toner bottle units 991 to 993 by detecting the shape of the shape pattern 914 when the toner bottle unit 991 to 993 is attached to the replenishment container attaching portion 701. Specifically, the replenishment container attaching portion 701 of the present embodiment is provided with two switches SW1 and SW2 that operate by coming into contact with the protrusions 994 and 995 of the shape pattern 914.

In the case where the toner bottle unit is provided with the protrusion 994, the protrusion 994 switches the switch SW1 to an on state in accordance with the attachment of the toner bottle unit, and if the protrusion 994 is not provided, the switch SW1 remains in an off state. Similarly, in the case where the toner bottle unit is provided with the protrusion 995, the protrusion 995 switches the switch SW2 to the on state in accordance with the attachment of the toner bottle unit, and if the protrusion 995 is not provided, the switch SW2 remains in the off state. The control portion 90 determines, on the basis of the on/off pattern of the switches SW1 and SW2, the type of the toner bottle unit 991 to 993 that is currently attached.

Figure 35:
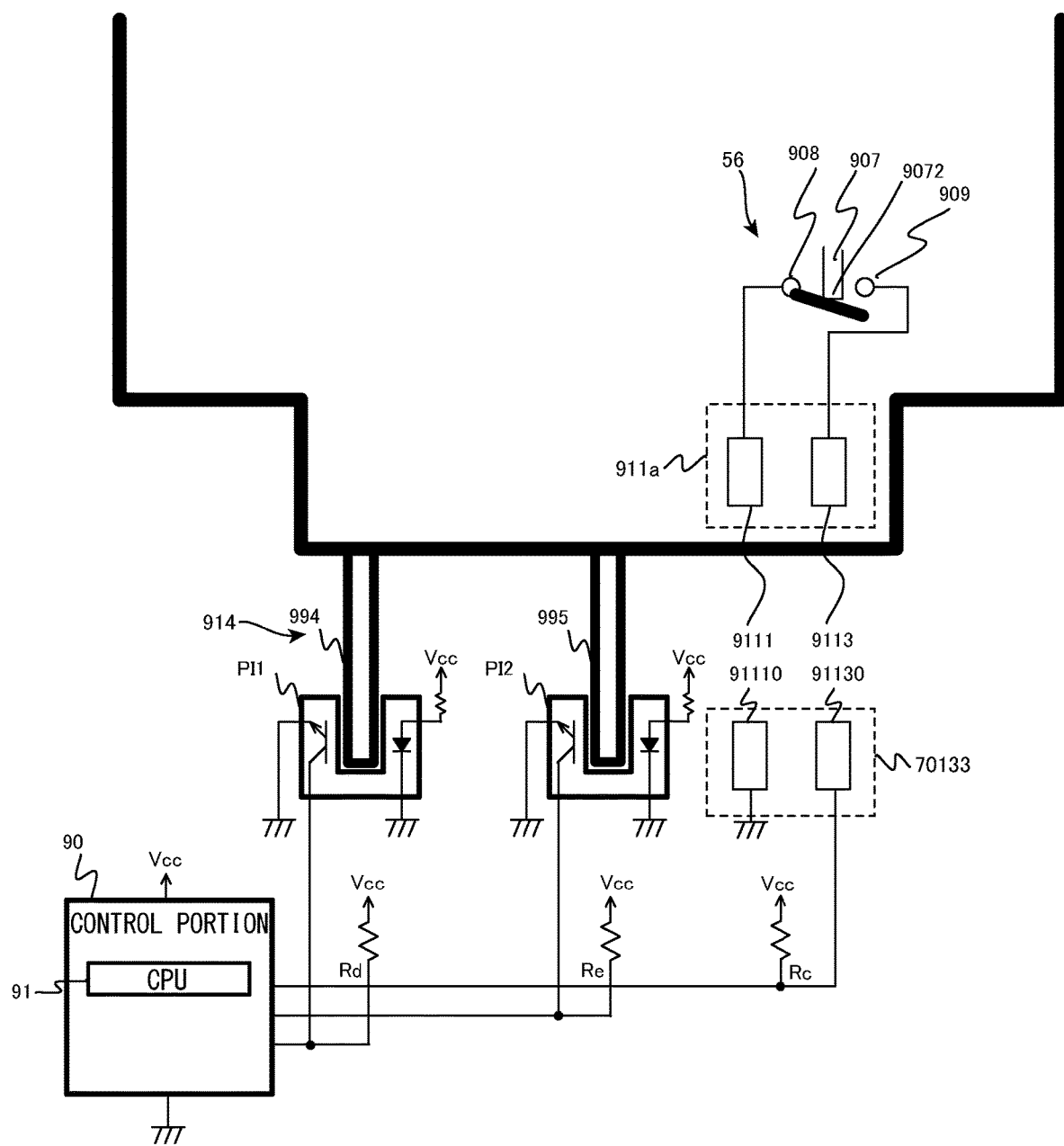
FIG. 35 is a diagram illustrating a modification example of the image forming apparatus and the replenishment container according to the fourth embodiment.

The switches SW1 and SW2 described above are examples of a detection means capable of detecting the difference in the shape pattern 914 of the replenishment container, and a different detection means may be used. For example, disposing optical sensors PI1 and PI2 in which light is respectively shielded by the protrusions 994 and 995 as illustrated in FIG. 35 can be considered. Also in this case, the control portion 90 can determine, on the basis of the pattern of the output signal of the optical sensors PI1 and PI2, the type of the toner bottle units 991 to 993 that is currently attached.

In the first to fourth embodiments described above, configurations in which information of the replenishment container is carried by a carrying means (storage means) provided in the replenishment container and the control portion 90 of the image forming apparatus determines the type of the replenishment container by reading the information from the carrying means have been described as examples. The carrying means is not limited to those described in the embodiments described above, and arbitrary means can be used as long as information that can specify which of the plurality types the replenishment container attached to the replenishment container attaching portion 701 is can be carried. For example, a two-dimensional barcode in which information of the type (capacity) or expiration date of the replenishment container is coded may be added to the surface of the replenishment container, and the type of the replenishment container may be determined by reading the information by an image sensor of the image forming apparatus.

Fifth Embodiment

A mode in which the user is requested for inputting the type of the replenishment container upon toner replenishment and the image forming apparatus determines the type of the replenishment container on the basis of the user input will be described as a fifth embodiment. The present embodiment is different from the first to fourth embodiments in the configuration and method for determining the types of replenishment containers having different capacities. The other elements having the same configuration and effect as in the first to fourth embodiments will be denoted by the same reference signs as in the first to fourth embodiments, and description thereof will be omitted.

Figure 36:
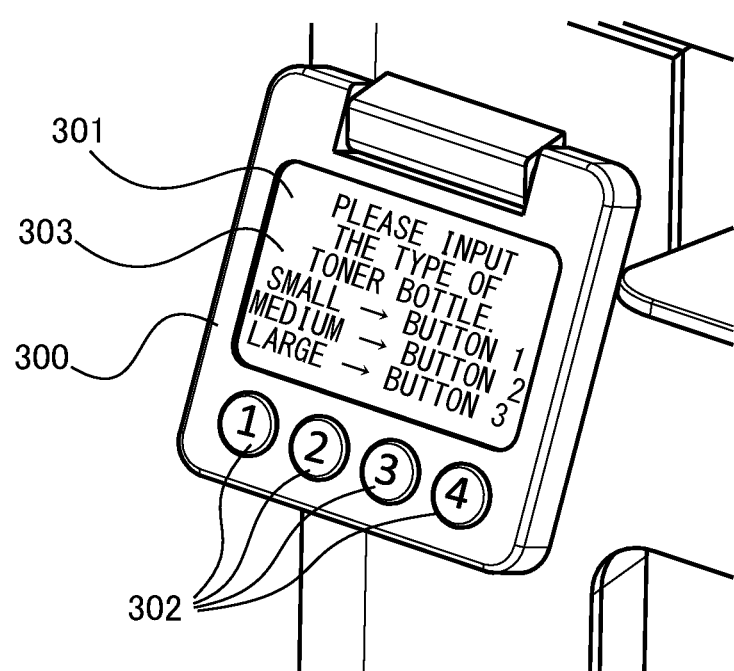
FIG. 36 is a diagram illustrating a selection screen displayed on a display portion of an image forming apparatus in a fifth embodiment.

The display portion 301 of the operation portion 300 of the present embodiment displays a selection screen 562 prompting the user to select the type of the replenishment container used for toner replenishment as illustrated in FIG. 36. Here, selection is made from the toner bottle units 991 to 993 of three types illustrated in FIGS. 25A to 25C. The user inputs the type of the replenishment container used for toner replenishment in the image forming apparatus by operation on one of the buttons of the input portion 302 in accordance with an instruction on the selection screen 562.

In addition, as a modification example, the selection screen 562 prompting the user to select the type of the replenishment container used for toner replenishment may be displayed on a display 560 of a host computer connected to the image forming apparatus. In this case, the host computer executes the display of the selection screen 562 on the basis of the information received from the image forming apparatus, and transmits, to the image forming apparatus, the information of the type of the replenishment container input by the user via the input apparatus.

Figure 38:
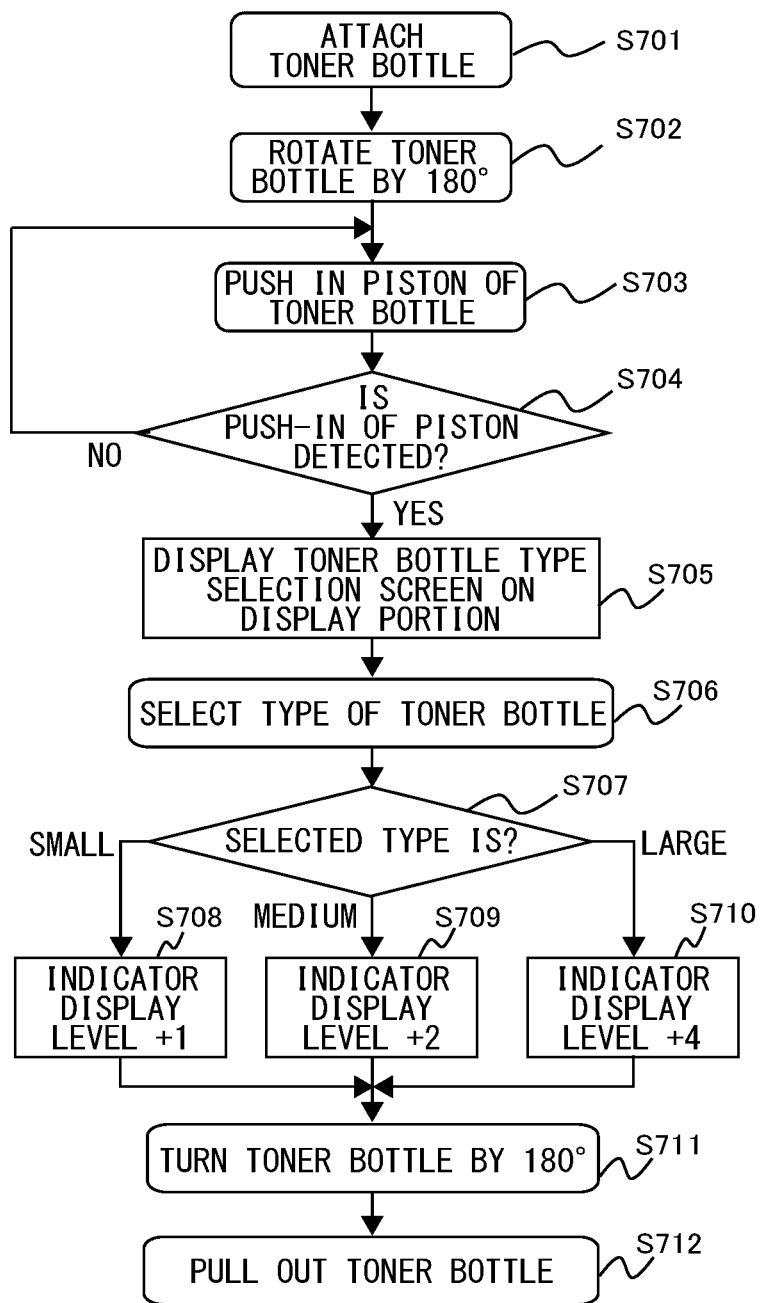
FIG. 38 is a flowchart illustrating a control method for the image forming apparatus according to the fifth embodiment.

Operation performed in toner replenishment in the present embodiment will be described with reference to FIG. 38. In this flowchart, steps other than S701 to S703, S706, S711, and S712, which are user operations, are realized by the CPU 91 (FIG. 19) provided in the control portion 90 of the image forming apparatus 1 executing a program read out from the nonvolatile memory 93.

First, the user opens the opening/closing member 83 (FIG. 4C), and attaches one of the toner bottle units 991 to 993 of the small capacity, medium capacity, and large capacity to the replenishment container attaching portion 701 (S701). Next, the user rotates the toner bottle units 991 to 993 by 180° (S702). As a result of this, the discharge port of the toner bottle units 991 to 993 currently attached to the replenishment container attaching portion 701 communicates with the replenishment port 8012. When the user pushes in the piston 902 of the toner bottle units 991 to 993 to discharge toner (S703), the push-in detection means 56 detects that the piston 902 has been pushed in (S704).

Figure 37:
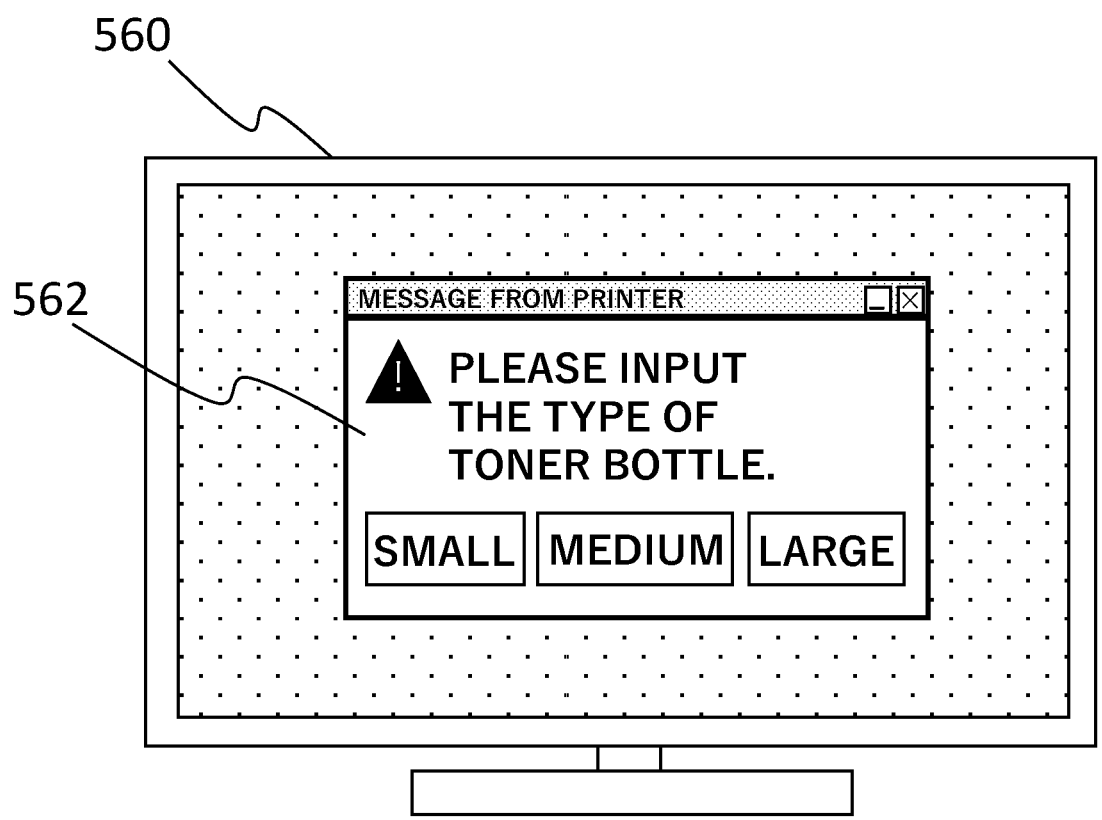
FIG. 37 is a diagram illustrating a selection screen displayed on a display of an external device in the fifth embodiment.

Here, the control portion 90 having detected completion of toner discharge in S704 executes processing (display processing) of displaying a selection screen 303 (FIG. 36) for prompting selection of the type of the toner bottle on the display portion 301 (S705 and S706). To be noted, in the case of the modification example described above, the control portion 90 having detected completion of toner discharge in S704 performs the display processing by transmitting a notification to the host computer via the I/O interface 94 (FIG. 19) to display the selection screen 562 (FIG. 37) on the display 560.

Then, when the user receives the information of the type of the toner bottle unit from the operation portion 300, the control portion 90 changes the display level of the panel 400 on the basis of the input information (S707 to S710). For example, in the case where information indicating the toner bottle unit 991 of a small capacity has been obtained in S706, the control portion 90 increases the display level of the panel 400 by one step (S708). In the case where information indicating the toner bottle unit 992 of a medium capacity has been obtained in S706, the control portion 90 increases the display level of the panel 400 by two steps (S709). In the case where information indicating the toner bottle unit 993 of a large capacity has been obtained in S706, the control portion 90 increases the display level of the panel 400 by four steps (S710).

After inputting the type of the toner bottle units 991 to 993 in S706, the user rotates the toner bottle unit 991 to 993 by 180° (S711), and pulls out the toner bottle units 991 to 993 from the replenishment container attaching portion 701 (S712). As a result of this, the toner replenishment procedure for the image forming apparatus 1 is finished.

As described above, in the present embodiment, in the case where toner replenishment is performed, the selection screen 303 and/or 562 is displayed on at least one of the display portion 301 of the image forming apparatus and the external display 560. The control portion 90 determines the type of the toner bottle unit used for toner replenishment of this time, on the basis of the information input by the user in accordance with the selection screen 303 and/or 562. In other words, the control portion 90 serving as a determination means requests the user to input information of the type of the replenishment container via the image forming apparatus or the external display portion, and determines the type of the replenishment container on the basis of the information input by the user. By using this determination result, the control portion 90 can appropriately operate the image forming apparatus in accordance with the type of the replenishment container that the user has used for toner replenishment.

To be noted, the timing at which the selection screen 303 and/or 562 is displayed in the present embodiment is when the piston push-in of the toner bottle unit is detected. However, for example, the selection screen 303 and/or 562 may be displayed when attachment of the toner bottle unit to the replenishment container attaching portion 701 is detected. In this case, it is preferable that the replenishment port shutter 7013 is locked by the rotation locking mechanism 59 in the initial state and the lock is released in the case where the capacity of the toner bottle unit selected by the user is equal to or smaller than the remaining capacity of the developer container 32 obtained from the P memory 58 (see S505 to S507 of FIG. 27).

In addition, although the procedure of toner replenishment using the toner bottle units 991 to 993 has been described in the present embodiment, toner replenishment is also performed in basically the same manner in a case of using a different replenishment container such as the toner pack 40. Therefore, the control portion 90 can determine the type of the toner pack by detecting the resistance value of the resistor provided in the toner pack 40 attached to the replenishment container attaching portion 701.

Sixth Embodiment

A sixth embodiment will be described. The present embodiment is different from Example 3 of the first embodiment in the configuration of the panel 400. The other elements having the same configuration and effect as in the first embodiment will be denoted by the same reference signs as in the first embodiment, and description thereof will be omitted.

Figure 39:
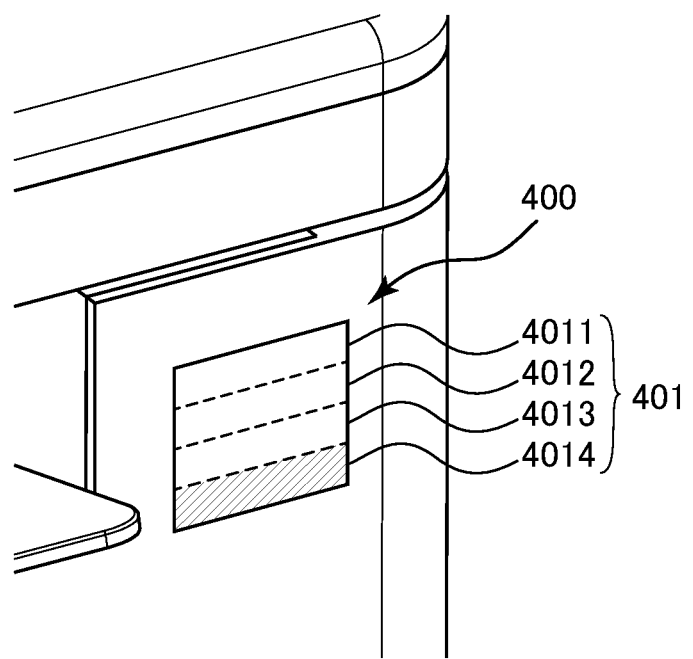
FIG. 39 is a diagram illustrating a panel according to a sixth embodiment.

The panel 400 according to the present embodiment is provided on the front surface of the casing of the printer body 100 as illustrated in FIG. 39. The panel 400 is an example of a display means that displays replenishment amount information indicating the amount of toner with which the developer container 32 has been replenished or can be replenished. The panel 400 is constituted by a liquid crystal panel including a plurality of indicators (indicator) whose light emission state such as on, off, and flickering can be independently controlled. To be noted, instead of "off" in the description below, the light may be on in a state of a lower brightness than a normal on state, or light of a different color from the normal on state may be emitted.

In the present embodiment, a four-step indicator 401 in which four indicators 4011, 4012, 4013, and 4014 from the upper side to the lower side in the vertical direction is used as the panel 400. The panel 400 indicates the amount of toner with which the developer container 32 has been replenished or can be replenished by display of the indicators 4011 to 4014 that changes stepwise. In addition, the lowermost indicator 4014 also indicates whether the toner in the developer container 32 is at the Low level or the Out level.

Figure 40A:
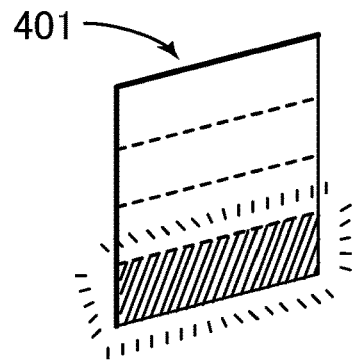
FIG. 40A is a diagram illustrating a display example of the panel according to the sixth embodiment.

In the configuration example of the panel 400 that is illustrated, in the case where the light of all the four indicators 4011 to 4014 are off, it is indicated that the toner in the developer container 32 is at the Out level. In the case where only the light of the lowermost indicator 4014 is flickering as illustrated in FIG. 40A, it is indicated that the toner remainder amount in the developer container 32 is at the Low level.

Figure 40B:
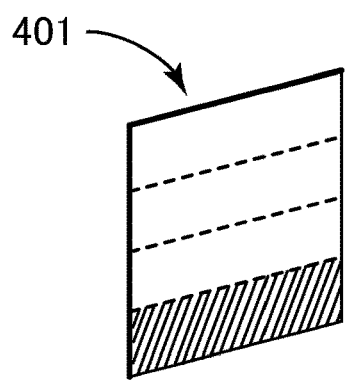
FIG. 40B is a diagram illustrating a display example of the panel according to the sixth embodiment.
Figure 40C:
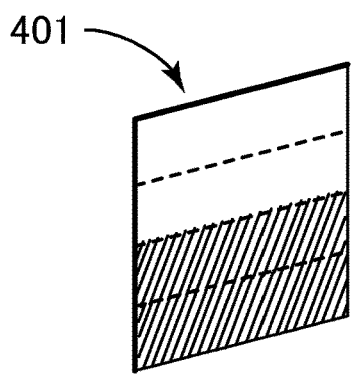
FIG. 40C is a diagram illustrating a display example of the panel according to the sixth embodiment.

In the case where only the light of the lowermost indicator 4014 is on as illustrated in FIG. 40B, it is indicated that the toner remainder amount in the developer container 32 is at a first level higher than the Low level. In the case where the lights of the two lower indicators 4013 and 4014 are on and the lights of the two upper indicators 4011 and 4012 are off as illustrated in FIG. 40C, it is indicated that the toner remainder amount in the developer container 32 is at a second level higher than the first level. In the case where the lights of the three lower indicators 4012 to 4014 are on and only the light of the uppermost indicator 4011 is off, it is indicated that the toner remainder amount in the developer container 32 is at a third level higher than the second level.

Figure 40D:
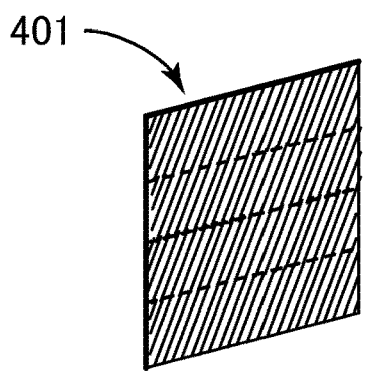
FIG. 40D is a diagram illustrating a display example of the panel according to the sixth embodiment.

In the case where the lights of all the indicators 4011 to 4014 are on as illustrated in FIG. 40D, it is indicated that the toner remainder amount in the developer container 32 is at the Full level higher than the third level. In this state, since there is no indicator whose light is off, for example, it can be seen that toner cannot be added for replenishment from the toner pack 40.

As will be described later, in the present embodiment, in the case where replenishment containers of a plurality of types accommodating different amounts of toner are connectable and the developer container is replenished with toner from a replenishment container outside of the image forming apparatus, the display of the panel 400 is changed. At this time, the amount of increase in the indicators of the panel 400 in the toner replenishment is changed in accordance with the type of the replenishment container.

To be noted, the panel 400 illustrated in FIG. 39 is an example of a display means whose display content is changed in accordance with the level of the toner amount with which the developer container 32 can be replenished, and a different configuration may be used. For example, the panel may be constituted by a combination of a light source such as an LED or incandescent light and a diffusing lens. A configuration in which the indicators are omitted and only number panels are used or a configuration in which the number panels are omitted and only the indicators are used may be employed. In addition, the panel 400 of the present embodiment has a remainder amount display function of, also in a period in which toner replenishment is not performed, displaying the level of the toner remainder amount in the developer container 32 on the basis of the detection result of the toner remainder amount detection means 51 (FIG. 19) that will be described later. However, it suffices as long as the display means at least has a function of displaying the replenishment amount information indicating the amount of toner with which the developer container 32 has been replenished or can be replenished to the user, and the display means does not have to have the remainder amount display function.

(6-3) Display Control of Replenishment Amount Information in Toner Replenishment Next, control of the panel 400 (FIGS. 39 and 40A to 40D) when toner replenishment is performed by using one of the toner bottle units 991 to 993 having different capacities will be described.

While toner replenishment is not performed, the control portion 90 of the image forming apparatus 1 changes the display of the panel 400 on the basis of the detection result of the toner remainder amount detection means 51 (FIG. 19). Each indicator corresponds to the toner amount of one toner bottle unit 991 of a small capacity, that is, toner amount for 1000 sheets in terms of the number of sheets to be printed on. In other words, in the case where the image forming apparatus 1 repeats the image forming operation without toner replenishment, the light of one indicator that has been on in the panel 400 is turned off each time image formation is performed on about 1000 sheets of the recording material.

For example, in the state of FIG. 40B in which the light of one indicator is on, it is indicated that there is a remaining capacity with which toner equivalent to three toner bottle units 991 of a small capacity (3000 sheets in terms of the number of sheets to be printed on) can be added for replenishment. In other words, it is indicated that toner equivalent to one toner bottle unit 991 of a small capacity (1000 sheets in terms of the number of sheets to be printed on) has been already added for replenishment. In the state of FIG. 40C in which the lights of two indicators are on, it is indicated that there is a remaining capacity with which toner equivalent to two toner bottle units 991 of a small capacity (2000 sheets in terms of the number of sheets to be printed on) can be added for replenishment. In other words, it is indicated that toner equivalent to two toner bottle units 991 of a small capacity or one toner bottle unit 992 of a medium capacity (2000 sheets in terms of the number of sheets to be printed on) has been already added for replenishment. In the state of FIG. 40D in which the lights of all the indicators are on, it is indicated that replenishment of toner cannot be performed with any of the toner bottle units (toner remainder amount is at the Full level). In other words, it is indicated that toner equivalent to four, two, or one toner bottle units of a small capacity, medium capacity, or large capacity, respectively (4000 sheets in terms of the number of sheets to be printed on), has been already added for replenishment. In addition, when the toner remainder amount in the developer container 32 is at the Low level, the control portion 90 turns off the lights of three upper indicators and flickers the light of the lowermost indicator as illustrated in FIG. 40A. In the state of FIG. 40A, it is indicated that there is a remaining capacity with which toner equivalent to four toner bottle units 991 of a small capacity (4000 sheets in terms of the number of sheets to be printed on) can be added for replenishment. As described above, in the present embodiment, the number of indicators whose lights are off or) flickering corresponds to the replenishment amount information indicating the amount of toner with which the developer container 32 has been already replenished or can be replenished.

In the present embodiment, the method for controlling the display of the panel 400 in toner replenishment is basically the same as in the case of Example 3 of the first embodiment and the case of the second embodiment described with reference to FIGS. 27 and 30. To be noted, the configuration and determination method for determining the type of the replenishment container having a different capacity is not particularly limited, and those described in the third to fifth embodiments may be used.

That is, the control portion 90 changes the amount of increment of the indicator display of the panel 400 in accordance with from which toner bottle unit among the toner bottle units 991 to 993 of the plurality of types having different capacities toner has been added for replenishment (S513 to S516 of FIG. 27). To be noted, in the panel 400 of the present embodiment, unlike the first and second embodiments, turning on or off the light of one indicator corresponds to changing the display level of the panel 400 by one step. Therefore, in S514, S515, and S516 of FIG. 27, the CPU 91 turns on the lights of the indicators of a required number for the panel 400 on the basis of the capacity information obtained from the T memory 57 of the toner bottle unit 991, 992, or 993.

For example, it is assumed that toner replenishment is performed in the state of FIG. 40A indicating that the toner remainder amount in the developer container 32 is at the Low level. In this case, in the case where the capacity information indicating the toner bottle unit 991 of a small capacity has been obtained in S502, the control portion 90 turns on the light of one indicator of the panel 400 to transition to the state of FIG. 40B (S514). In the case where the capacity information indicating the toner bottle unit 992 of a medium capacity has been obtained in S502, the control portion 90 turns on the lights of two indicators of the panel 400 to transition to the state of FIG. 40C (S515). In the case where the capacity information indicating the toner bottle unit 993 of a large capacity has been obtained in S502, the control portion 90 turns on the lights of four indicators of the panel 400 to transition to the state of FIG. 40D (S516).

In addition, for example, it is assumed that toner replenishment is performed in the state of FIG. 40B indicating that the toner remainder amount in the developer container 32 is at the first level. In this case, in the case where the capacity information indicating the toner bottle unit 991 of a small capacity has been obtained in S502, the control portion 90 turns on the light of one indicator of the panel 400 to transition to the state of FIG. 40C (S514). In the case where the capacity information indicating the toner bottle unit 992 of a medium capacity has been obtained in S502, the control portion 90 turns on the lights of two indicators of the panel 400 to transition to the state in which the lights of three indicators in total are on (S515). To be noted, in the case where the capacity information indicating the toner bottle unit 993 of a large capacity has been obtained in S502, the lock of the rotation locking mechanism 59 is maintained in S505 and the toner replenishment is not performed, and therefore S516 is not executed.

As described above, the unit of increase and decrease of the indicators in the display means of the present embodiment corresponds to the replenishment container (first replenishment container) of the smallest capacity among the plurality of types of replenishment containers. That is, in the case where toner replenishment has been performed by using the first replenishment container having the smallest capacity (for example, the toner bottle unit 991 of a small capacity) among the replenishment containers of a plurality of types, the indicators of the display means change by one step. In the case where toner replenishment has been performed by using a second replenishment container having a larger capacity than the first replenishment container (for example, the toner bottle unit 992 of a medium capacity) among the replenishment containers of a plurality of types, the indicators of the display means change by a plurality of steps.

To be noted, although the procedure of toner replenishment using the toner bottle units 991 to 993 has been described in the present embodiment, toner replenishment is performed and the display of the panel 400 is changed in basically the same manner in a case of using a different replenishment container such as the toner pack 40. For example, in the case of an image forming system in which toner packs of three types of a small capacity, medium capacity, and large capacity, the display control of the panel 400 described above can be applied as it is.

To be noted, in the case of a toner pack, since the push-in operation of a piston is not performed, completion of toner discharge is detected by a different discharge detection means instead of the steps S511 and S512 of FIG. 27. Specifically, there is a method of regarding, as the completion of discharge, the elapse of a predetermined time since a time point when the rotation of the toner pack is detected in S509. In addition, for example, there is a method of displaying a button notifying that discharge of toner has been completed on the operation portion 300 after the rotation of the toner pack is detected in S509, and regarding the button being pushed by the user as the completion of toner discharge.

As described above, in the present embodiment, in a configuration in which replenishment containers of a plurality of types accommodating different amounts of toner can be used, replenishment amount displayed on a display means such as the panel 400 in accordance with the type of the replenishment container used in toner replenishment of this time is determined in toner replenishment. As a result of this, the user can quickly recognize, on the basis of the display content of the panel 400 or the like, the change in the amount of toner with which the developer container 32 has been replenished or can be replenished, which leads to improvement in the convenience.

Particularly, in the configuration example described above, the amount of toner with which the developer container 32 has been replenished or can be replenished is visually displayed by using the panel 400 including indicators that change stepwise in accordance with the toner remainder amount. As a result of this, the user can be notified of the types and number of replenishment containers with which toner replenishment can be performed without exceeding the capacity of the developer container 32, in a manner that is instinctively understandable. In this case, as described in the configuration example described above, it is preferable that the number of indicators whose lights are turned on after toner replenishment is increased as the amount of toner accommodated in the replenishment container is larger.

In addition, in the present embodiment, in the case where the completion of toner discharge from the replenishment container is detected by the discharge detection means, the replenishment amount information displayed on the display means is changed regardless of the detection result of the toner remainder amount detection means disposed in the developer container 32. Therefore, the time after the user performs an operation of discharging toner from the replenishment container until the result is reflected as decrease in the amount of toner that has been added for replenishment or can be added for replenishment indicated by the replenishment amount information on the display means can be made shorter, and the convenience can be further improved. For example, the timing when the indicators of the panel 400 increment in the present embodiment is not dependent on whether or not toner conveyance by conveyance members (8013 to 8015, see FIGS. 6A to 6C) of the toner receiving unit 801 is finished.

To be noted, as a display means that displays the replenishment amount information indicating the amount of toner with which the developer container 32 has been replenished or can be replenished, an element different from the panel 400 may be used. For example, in a configuration in which the types and number of replenishment containers with which toner replenishment can be performed are displayed as images or numerical values on the display portion 301 of the operation portion 300, in the case where toner replenishment is performed, changing the display content in accordance with the type of the replenishment container used for toner replenishment of this time can be considered.

In addition, although an example of the circuit configuration of the push-in detection mechanism of the toner bottle unit is illustrated in FIG. 26, a different circuit configuration may be used as described in Example 3 with reference to FIG. 28.

Seventh Embodiment

Figure 41:
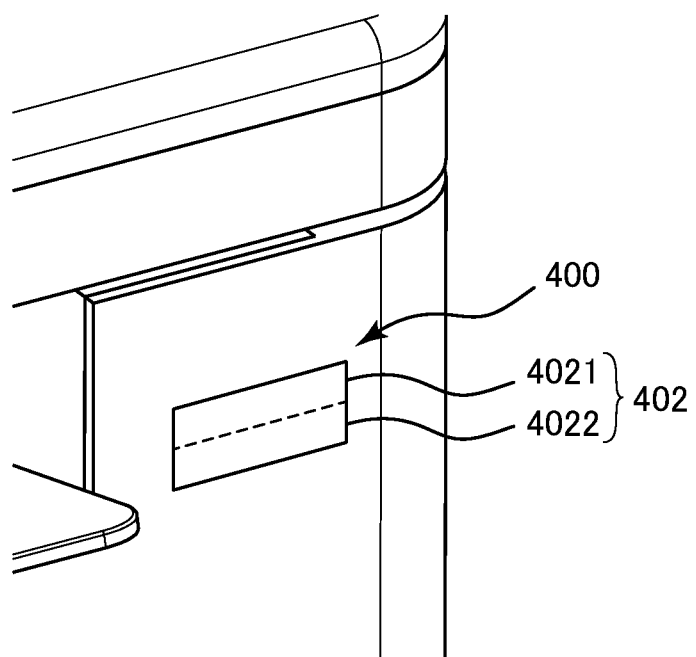
FIG. 41 is a perspective view of a panel according to a seventh embodiment.

In the seventh embodiment, a different configuration example of the panel will be further described. The panel 400 of the present embodiment is provided on the front surface of the casing of the printer body as illustrated in FIG. 41. The panel 400 is another example of a displays means that displays the replenishment information indicating the amount of toner with which the developer container has been replenished or can be replenished. In the present embodiment, an indicator 402 in which two indicators 4021 and 4022 are arranged up and down in the vertical direction is used as the panel 400. The panel 400 indicates the amount of toner with which the developer container 32 has been replenished or can be replenished, by display on the indicators 4021 and 4022 that changes stepwise.

Figure 42A:
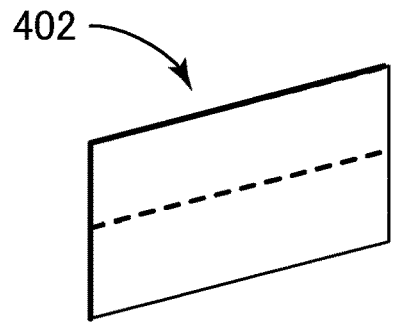
FIG. 42A is a diagram illustrating a display example of the panel according to the seventh embodiment.
Figure 42B:
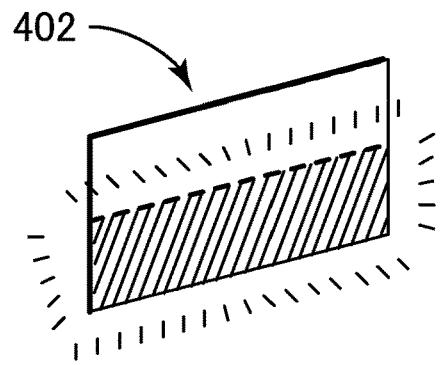
FIG. 42B is a diagram illustrating a display example of the panel according to the seventh embodiment.

In the case where the lights of all the indicators 4021 and 4022 are off as illustrated in FIG. 42A, it is indicated that the toner remainder amount in the developer container 32 is at the Low level. In the case where only the light of the lowermost indicator 4014 is flickering as illustrated in FIG. 42B, it is indicated that the toner remainder amount in the developer container 32 is at a first level higher than the Low level. In other words, it is indicated that toner equivalent to one toner bottle unit 991 of a small capacity (1000 sheets in terms of the number of sheets to be printed on) has been already added for replenishment.

Figure 42C:
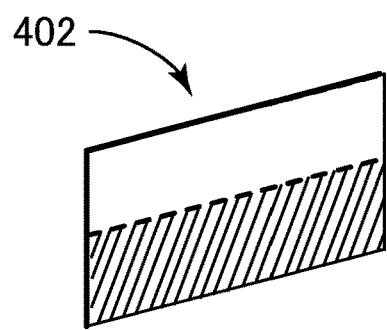
FIG. 42C is a diagram illustrating a display example of the panel according to the seventh embodiment.
Figure 42D:
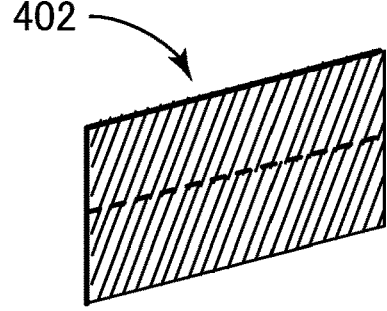
FIG. 42D is a diagram illustrating a display example of the panel according to the seventh embodiment.

In the case where only the light of the lowermost indicator 4022 is on as illustrated in FIG. 42C, it is indicated that the toner remainder amount in the developer container 32 is at a second level higher than the first level. In other words, it is indicated that toner equivalent to two toner bottle units 991 of a small capacity or one toner bottle unit 992 of a medium capacity (2000 sheets in terms of the number of sheets to be printed on) has been already added for replenishment. In the case where the lights of all the indicators 4021 and 4022 are on as illustrated in FIG. 42D, it is indicated that the toner remainder amount in the developer container 32 is at the Full level higher than the second level. In this state, for example, it can be seen that since the light of no indicator is off, replenishment of toner cannot be performed from the toner pack 40. In other words, it is indicated that toner equivalent to four, two, or one toner bottle unit of a small capacity, medium capacity, or large capacity (4000 sheets in terms of the number of sheets to be printed on), respectively, has been already added for replenishment. As described above, in the present embodiment, the number of indicators whose lights are off and the number of indicators whose lights are flickering correspond to the replenishment amount information indicating the amount of toner with which the developer container 32 has been replenished or can be replenished.

(Display Control of Replenishment Amount Information in Toner Replenishment)

In the present embodiment, the method for controlling the display of the panel 400 in toner replenishment is basically the same as in the case of Example 3 of the first embodiment and the case of the second embodiment described with reference to FIGS. 27 and 30. To be noted, the configuration and determination method for determining the type of the replenishment container having a different capacity is not particularly limited, and those described in the third to fifth embodiments may be used.

Figure 30:
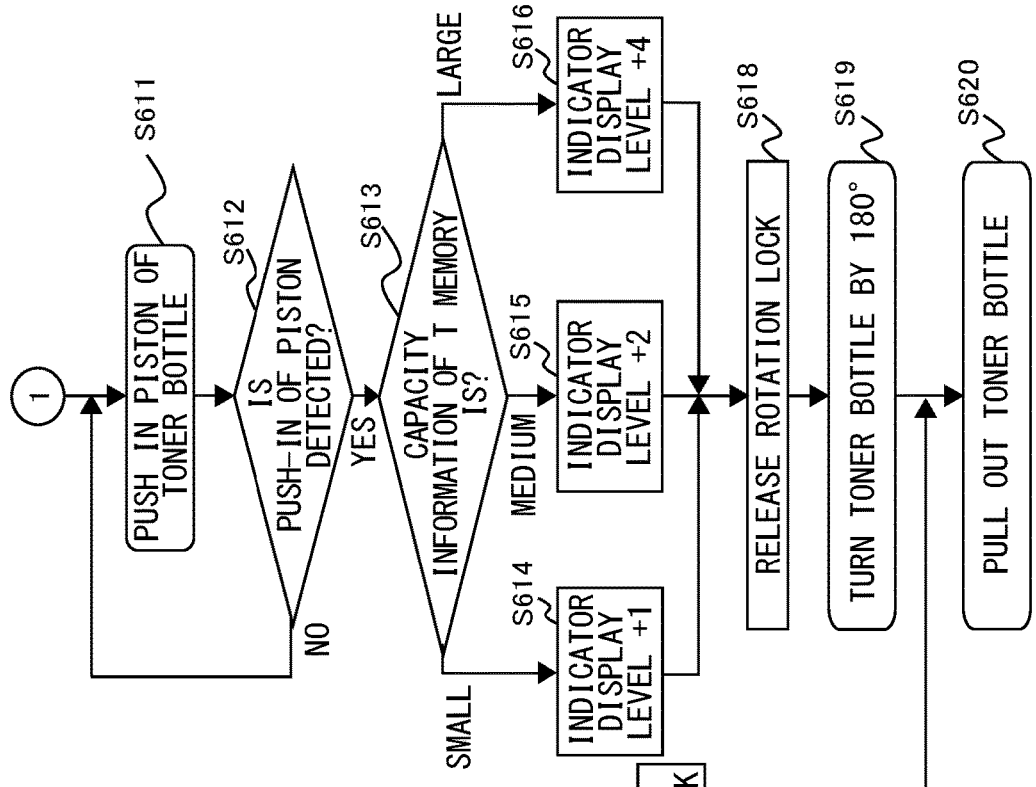
FIG. 30 is a flowchart illustrating a control method for the image forming apparatus according to the second embodiment.
Figure 30:
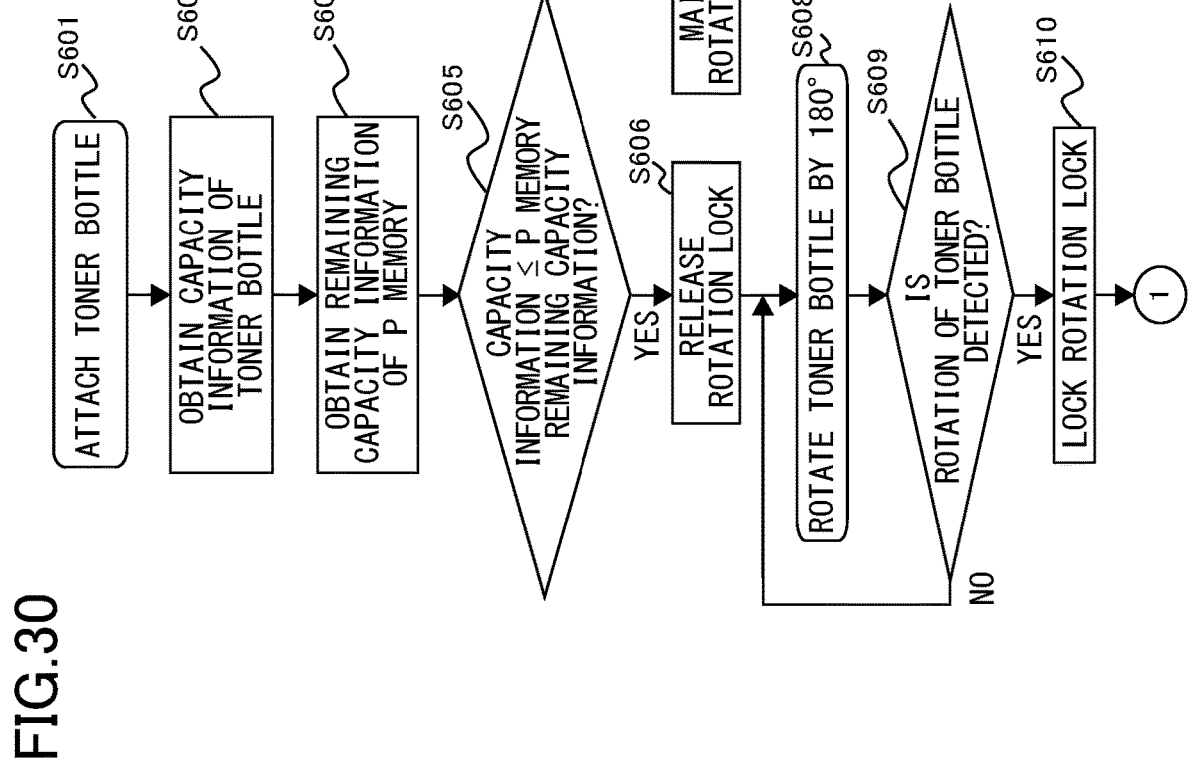

That is, the control portion 90 changes the indicator display of the panel 400 in accordance with from which toner bottle unit among the toner bottle units 991 to 993 of a plurality of types having different capacities toner has been added for replenishment (S613 to S616 of FIG. 30). To be noted, in S614 to S616, increasing the toner remainder amount expressed by the indicator display of the panel 400 is described as the amount of increment of the display level (such as "+1" and "+2").

For example, it is assumed that toner replenishment is performed in the state of FIG. 42A in which it is indicated that the toner remainder amount in the developer container 32 is at the Low level. In this case, in the case where capacity information indicating the toner bottle unit 991 of a small capacity has been obtained in S602, the control portion 90 flickers one indicator of the panel 400 to switch to the state of FIG. 42B (S614). In the case where capacity information indicating the toner bottle unit 992 of a medium capacity has been obtained in S602, it turns on the light of one indicator of the panel 400 to switch to the state of FIG. 42C (S615). In the case where capacity information indicating the toner bottle unit 993 of a large capacity has been obtained in S602, it turns on the lights of the two indicators of the panel 400 to switch to the state of FIG. 42D (S616).

In addition, for example, it is assumed that toner replenishment is performed in the state of FIG. 42B in which it is indicated that the toner remainder amount in the developer container 32 is at the first level. In this case, in the case where capacity information indicating the toner bottle unit 991 of a small capacity has been obtained in S602, the control portion 90 switches the lower indicator of the panel 400 from the flickering state to the on state to switch to the state of FIG. 42C (S614). In the case where capacity information indicating the toner bottle unit 992 of a medium capacity has been obtained in S602, it turns on the light of the lower indicator and flickers the light of the upper indicator of the panel 400 (S615). To be noted, in the case where capacity information indicating the toner bottle unit 993 of a large capacity has been obtained in S602, the lock of the rotation locking mechanism 59 is maintained in S605 and the toner replenishment is not performed, and therefore S616 is not executed.

As described above, also in the present embodiment, in a configuration in which replenishment containers of a plurality of types accommodating different amounts of toner can be used, display on a display means such as the panel 400 is, in toner replenishment, changed in accordance with the type of the replenishment container used in toner replenishment of this time. At this time, the display on the display means is changed on the basis of the capacity information obtained by an obtaining means regardless of the detection result of the toner remainder amount detection means disposed in the developer container 32. As a result of this, the user can quickly recognize, on the basis of the display content of the panel 400 or the like, the change in the amount of toner with which the developer container 32 has been replenished or can be replenished, which leads to improvement in the convenience.

In addition, the panel 400 of the present embodiment is constituted by two indicators, which is less than the types of the replenishment container, and serves as a specific example in which display corresponding to the type of the replenishment container can be changed even in such a case.

Summary of Present Disclosure (A-1)

As described in the above embodiments with reference to specific examples (for example, see Examples 1 and 2 of the first embodiment), an aspect of the image forming apparatus according to the present disclosure is an image forming apparatus to and from which a replenishment container accommodating toner is attachable and detachable and which is configured to form a toner image on a recording material, the image forming apparatus including:
an image bearing member;
a developer container configured to accommodate toner;
a developer bearing member configured to develop an electrostatic latent image formed on the image bearing member into a toner image by using toner accommodated in the developer container;
a replenishment port through which the developer container can be replenished with toner from the replenishment container provided outside the image forming apparatus by attaching the replenishment container thereto;
a restriction member capable of transitioning to an allowance state in which a rotation of the replenishment container attached to the replenishment port with respect to the replenishment port and to a restriction state in which the rotation of the replenishment container attached to the replenishment port with respect to the replenishment port is restricted;

a notification portion configured to notify a replenishment procedure for replenishing the developer container with toner from the replenishment container; and a controller configured to cause the notification portion to notify at least one step of the replenishment procedure.

(A-2)

In the image forming apparatus described above in (A-1), it is preferable that a progress detection portion configured to detect a progress of the replenishment container is provided, and the controller changes the step to be notified by the notification portion among the replenishment procedure in accordance with a detection result of the progress detection portion.

(A-3)

In the image forming apparatus described above in (A-2), it is preferable that the progress detection portion includes a toner amount detection portion whose output value changes in accordance with an amount of toner accommodated in the developer container, and on a basis of the output value of the toner amount detection portion, in a case where the amount of toner accommodated in the developer container is smaller than a predetermined amount, the controller causes the notification portion to notify a first step for attaching the replenishment container to the replenishment port.

(A-4)

In the image forming apparatus described above in (A-2) or (A-3), it is preferable that the progress detection portion includes an attachment detection portion whose output value changes in accordance with whether or not the replenishment container is attached to the replenishment port, and on a basis of the output value of the attachment detection portion, in a case where the replenishment container is attached to the replenishment port, the controller causes the notification portion to notify a second step for causing the replenishment container to communicate with the replenishment port.

(A-5)

In the image forming apparatus described above in (A-4), it is preferable that the second step is an operation of causing the replenishment port and the replenishment container to communicate with each other by rotating the replenishment container attached to the replenishment port.

(A-6)

In the image forming apparatus described above in any one of (A-2) to (A-5), it is preferable that the progress detection portion includes a communication detection portion whose output value changes in accordance with the replenishment container communicating with the replenishment port, and on a basis of the output value of the communication detection portion, in a case where the replenishment container communicates with the replenishment port, the controller causes the notification portion to notify a third step for discharging toner accommodated in the replenishment container to the developer container through the replenishment port.

(A-7)

In the image forming apparatus described above in (A-6), it is preferable that the third step is an operation of discharging toner accommodated in the replenishment container by pushing in a pressing member provided in the replenishment container.

(A-8)

In the image forming apparatus described above in any one of (A-2) to (A-7), it is preferable that the progress detection portion includes a discharge detection portion whose output value changes in accordance with discharge of toner accommodated in the replenishment container to the developer container, and on a basis of the output value of the discharge detection portion, in a case where toner accommodated in the replenishment container has been discharged, the controller causes the notification portion to notify a fourth step for detaching the replenishment container from the replenishment port.

(A-9)

In the image forming apparatus described above in any one of (A-2) to (A-8), it is preferable that the progress detection portion includes a stopping operation detection portion whose output value changes in accordance with whether or not a stopping operation for stopping a progress of the replenishment procedure has been performed, and on a basis of the output value of the stopping operation detection portion, in a case where the stopping operation has been performed, the controller causes the notification portion to notify a fourth step for detaching the replenishment container from the replenishment port.

(A-10)

In the image forming apparatus described above in (A-5), it is preferable that the progress detection portion includes a rotation detection portion whose output value changes in accordance with a rotation angle of the replenishment container with respect to the replenishment port, and on a basis of the output value of the rotation detection portion, in a case where the rotation angle has reached such an angle that the replenishment container communicates with the replenishment port, the controller causes the restriction member to transition to the restriction state, and then causes the notification portion to notify a third step for discharging toner accommodated in the replenishment container to the developer container through the replenishment port.

(A-11)

In the image forming apparatus described above in (A-10), it is preferable that in a case where the replenishment container communicates with the replenishment port, the controller causes the notification portion to alternately notify the third step and a fifth step for stopping a progress of the replenishment procedure.

(A-12)

In the image forming apparatus described above in (A-11), it is preferable that the fifth step is execution of a stopping operation in an operation portion with which the stopping operation of stopping the progress of the replenishment procedure can be executed, and in a case where a predetermined time has elapsed without the stopping operation being executed after the third step has been notified by the notification portion, the controller causes the restriction member to transition to the allowance state, and then causes the notification portion to notify a fourth step for detaching the replenishment container from the replenishment port.

(A-13)

In the image forming apparatus described above in (A-11), it is preferable that
the fifth step is execution of a stopping operation in an operation portion with which the stopping operation of stopping the progress of the replenishment procedure can be executed, and
in a case where the stopping operation is executed in a period in which the third step or the fifth step is notified by the notification portion, the controller causes the restriction member to transition to the allowance state, and then causes the notification portion to notify a fourth step for detaching the replenishment container from the replenishment port.

(A-14)

In the image forming apparatus described above in (A-1), it is preferable that
the replenishment procedure includes a first step for attaching the replenishment container to the replenishment port, a second step for causing the replenishment container to communicate with the replenishment port, a third step for discharging toner accommodated in the replenishment container to the developer container through the replenishment port, and a fourth step for detaching the replenishment container from the replenishment port.

(A-15)

In the image forming apparatus described above in (A-14), it is preferable that
the controller causes the notification portion to collectively notify the first step, the second step, the third step, and the fourth step.

(A-16)

An aspect of the image forming apparatus according to the present disclosure is
an image forming apparatus to and from which a replenishment container accommodating toner is attachable and detachable and which is capable of communicating with an information processing apparatus including a notification portion, is configured to form a toner image on a recording material, the image forming apparatus including:
an image bearing member;
a developer container configured to accommodate toner;
a developer bearing member configured to develop an electrostatic latent image formed on the image bearing member into a toner image by using toner accommodated in the developer container;
a replenishment port through which the developer container can be replenished with toner from the replenishment container provided outside the image forming apparatus by attaching the replenishment container thereto;
a restriction member capable of transitioning to an allowance state in which a rotation of the replenishment container attached to the replenishment port with respect to the replenishment port is allowed and to a restriction state in which the rotation of the replenishment container attached to the replenishment port with respect to the replenishment port is restricted; and
a controller configured to output, to the information processing apparatus, information for causing the notification portion to notify at least one step of a replenishment procedure for replenishing the developer container with toner from the replenishment container.

(A-17)

In the image forming apparatus described above in any one of (A-1) to (A-16), it is preferable that
the notification portion includes a display portion for displaying the replenishment procedure.

(A-18)

In the image forming apparatus described above in any one of (A-1) to (A-17), it is preferable that
the notification portion includes a sound emitting portion for expressing the replenishment procedure by a sound.

(B-1)

As described in the above embodiments with reference to specific examples (for example, see Example 3 of the first embodiment and the second to sixth embodiments), an aspect of the image forming apparatus according to the present disclosure is
an image forming apparatus to and from which a replenishment container accommodating toner is attachable and detachable and which is configured to form a toner image on a recording material,
the image forming apparatus including:
an image bearing member;
a developer container configured to accommodate toner;
a developer bearing member configured to develop an electrostatic latent image formed on the image bearing member into a toner image by using toner accommodated in the developer container;
a replenishment port through which the developer container is replenished with toner from the replenishment container provided outside the image forming apparatus by attaching the replenishment container thereto and to which the replenishment container of a plurality of types accommodating different amounts of toner is connectable; and
a determination portion configured to, in a case where the developer container is replenished with toner from the replenishment container, determine a type of the replenishment container used for toner replenishment on a basis of information carried by a carrying portion provided in the replenishment container.

(B-2)

In the image forming apparatus described above in (B-1), it is preferable that
the carrying portion is a storage medium storing information that differs depending on the type of the replenishment container, and
the determination portion determines the type of the replenishment container used for toner replenishment, by reading the information from the storage medium in a state in which the replenishment container is attached to the replenishment port.

(B-3)

In the image forming apparatus described above in (B-1), it is preferable that
the carrying portion is a resistor whose resistance value differs depending on the type of the replenishment container, and
the determination portion determines the type of the replenishment container used for toner replenishment, by detecting the resistance value of the resistor in the state in which the replenishment container is attached to the replenishment port.

(B-4)

In the image forming apparatus described above in (B-1), it is preferable that the carrying portion is a wiring pattern formed in the replenishment container, the wiring pattern being formed such that a path in which a current flows in a case where a voltage is applied from a plurality of contacts provided in the image forming apparatus differs depending on the type of the replenishment container, and the determination portion determines the type of the replenishment container used for toner replenishment, on a basis of presence or absence of a current flowing through each of the plurality of contact when a voltage is applied to the wiring pattern through the plurality of contacts in the state in which the replenishment container is attached to the replenishment port.

(B-5)

In the image forming apparatus described above in (B-1), it is preferable that the carrying portion is a shape pattern whose physical shape differs depending on the type of the replenishment container, and the determination portion determines the type of the replenishment container used for toner replenishment, by detecting the shape pattern in the state in which the replenishment container is attached to the replenishment port.

(B-6)

In the image forming apparatus described above in (B-5), it is preferable that the determination portion includes a switch that operates by contacting the shape pattern.

(B-7)

In the image forming apparatus described above in (B-5) or (B-6), it is preferable that the determination portion includes an optical sensor that detects the shape pattern by using light.

(B-8)

In addition, another aspect of the image forming apparatus according to the present disclosure is an image forming apparatus to and from which a replenishment container accommodating toner is attachable and detachable and which is configured to form a toner image on a recording material, the image forming apparatus including:

an image bearing member;

a developer container configured to accommodate toner;

a developer bearing member configured to develop an electrostatic latent image formed on the image bearing member into a toner image by using toner accommodated in the developer container;

a replenishment port through which the developer container is replenished with toner from the replenishment container provided outside the image forming apparatus by attaching the replenishment container thereto and to which the replenishment container of a plurality of types accommodating different amounts of toner is connectable; and a determination portion configured to, in a case where the developer container is replenished with toner from the replenishment container, perform display processing that prompts input of information about the type of the replenishment container used for toner replenishment, and determine, on a basis of the input information, the type of the replenishment container used for toner replenishment.

(B-9)

In the image forming apparatus described above in (B-8), it is preferable that a display portion configured to display an image is provided, and in the display processing, the determination portion causes the display portion to display a selection screen for selecting the type of the replenishment container used for toner replenishment.

(B-10)

In the image forming apparatus described above in (B-8), it is preferable that an interface connectable to an external device is provided, and in the display processing, the determination portion transmits, to the external device via the interface, a notification for displaying a selection screen for selecting the type of the replenishment container used for toner replenishment on a display device of the external device.

(B-11)

In the image forming apparatus described above in any one of (B-1) to (B-10), it is preferable that a toner remainder amount detection portion configured to detect a toner remainder amount in the developer container, and a locking portion configured to restrict an operation of causing a discharge port of the replenishment container attached to the replenishment port and the replenishment port to communicate with each other are provided, and in a case where the replenishment container is attached to the replenishment port, whether or not to release a lock by the locking portion is determined on a basis of a detection result of the toner remainder amount detection portion and a determination result of the determination portion.

(B-12)

In the image forming apparatus described above in any one of (B-1) to (B-11), it is preferable that a display device configured to display information indicating an amount of toner with which the developer container can be replenished, and a discharge detection portion configured to detect completion of toner discharge from the replenishment container are provided, and in a case where completion of toner discharge has been detected by the discharge detection portion, the information displayed on the display device is changed on a basis of a determination result of the determination portion.

(C-1)

As described in the above embodiments with reference to specific examples (for example, see the sixth and seventh embodiments), an aspect of the image forming apparatus according to the present disclosure is an image forming apparatus to and from which a replenishment container accommodating toner is attachable and detachable and which is configured to form a toner image on a recording material, the image forming apparatus including:

an image bearing member;

a developer container configured to accommodate toner;

a developer bearing member configured to develop an electrostatic latent image formed on the image bearing member into a toner image by using toner accommodated in the developer container;

a replenishment port through which the developer container can be replenished with toner from the replenishment container provided outside the image forming apparatus by attaching the replenishment container thereto and to which the replenishment container of a plurality of types accommodating different amounts of toner is connectable;

a display device configured to display replenishment amount information indicating an amount of toner with which the developer container has been replenished or can be replenished;

an obtaining portion configured to obtain information of the replenishment container connected to the replenishment port; and a controller configured to, in a case where the developer container has been replenished with toner, determine the replenishment information to be displayed on the display device, on a basis of the information obtained by the obtaining portion and such that a toner amount indicated by the replenishment amount information in a state after the toner replenishment changes in accordance with the type of the replenishment container used for the toner replenishment.

(C-2)

In the image forming apparatus described above in (C-1), it is preferable that the display device is configured to display the replenishment amount information by indicators that change stepwise, and the controller determines, on a basis of the information obtained by the obtaining portion, the number of indicators to be changed in a case where the developer container is replenished with toner.

(C-3)

In the image forming apparatus described above in (C-2), it is preferable that the display device is capable of controlling a light emission state of each indicator, and is configured such that the number of indicators whose lights are off is larger when the amount of toner with which the developer container has been replenished or can be replenished is larger.

(C-4)

In the image forming apparatus described above in (C-2) or (C-3), it is preferable that the controller changes the indicators of the display device by one step in a case where toner replenishment has been performed by using a first replenishment container having the smallest capacity among the replenishment containers of the plurality of types, and changes the indicators of the display device by a plurality of steps in a case where toner replenishment has been performed by using a second replenishment container having a larger capacity than the first replenishment container among the replenishment containers of the plurality of types.

(C-5)

In the image forming apparatus described above in any one of (C-1) to (C-4), it is preferable that a discharge detection portion configured to detect completion of toner discharge from the replenishment container attached to the replenishment port, and a toner remainder amount detection portion configured to detect a toner remainder amount in the developer container are further provided, and in a case where completion of toner discharge from the replenishment container has been detected by the discharge detection portion, the controller determines the replenishment amount information to be displayed on the display device on a basis of the information obtained by the obtaining portion regardless of a detection result of the toner remainder amount detection portion.

(C-6)

In the image forming apparatus described above in (C-5), it is preferable that the replenishment container is configured to discharge toner by pushing in a piston, and the discharge detection portion detects a push-in operation of the piston.

(C-7)

In the image forming apparatus described above in (C-5), it is preferable that the replenishment container includes a discharge port for discharging toner, and a shutter member for sealing the discharge port, and is configured such that the discharge port and the replenishment port communicate with each other by rotation in a state of being attached to the replenishment port, and the discharge detection portion detects completion of toner discharge from the replenishment container on a basis of an elapsed time since a time point when an operation of rotating the replenishment container is performed.

(C-8)

In the image forming apparatus described above in any one of (C-5) to (C-7), it is preferable that an agitation member configured to agitate toner in the developer container to supply toner in the developer container to the developer bearing member, and a conveyance member configured to, in a case where toner replenishment has been performed from the replenishment container, convey toner received from the replenishment container through the replenishment port toward a space in the developer container in which the developer bearing member and the agitation member are disposed are further provided, and in a case where completion of toner discharge has been detected by the discharge detection portion, the replenishment amount information to be displayed on the display device is determined on a basis of the information obtained by the obtaining portion regardless of whether or not the conveyance of toner by the conveyance member has been finished.

(C-9)

In the image forming apparatus described above in any one of (C-1) to (C-8), it is preferable that the obtaining portion includes a contact portion configured to, in a case where the replenishment container is connected to the replenishment port, be electrically connected to a storage medium attached to the replenishment container, and the controller determines a capacity of the replenishment container on a basis of information read out from the storage medium via the contact portion.

(C-10)

In the image forming apparatus described above in any one of (C-1) to (C-8), it is preferable that the obtaining portion includes a contact portion configured to, in a case where the replenishment container is connected to the replenishment port, be electrically connected to a resistor attached to the replenishment container, and the controller determines a capacity of the replenishment container on a basis of a resistance value of the resistor obtained via the contact portion.

The present invention can also be realized by providing a program that realizes one or more functions of the embodiments described above to a system or an apparatus via a network or a storage medium and processing to read out and execute the program by one or more processors in a computer of the system or the apparatus. In addition, it can be also realized by a circuit (for example, ASIC) that realizes one or more functions.

According to the present disclosure, an embodiment of an image forming apparatus can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

For example, the present invention is applicable to an image forming apparatus such as a printer, a copier, a facsimile machine, or a multifunctional apparatus having functions of these. Particularly, it is applicable to an image forming apparatus including a developer container to and from which a replenishment container accommodating developer for replenishment is attachable and detachable.

The present embodiment is not limited to the embodiments described above, and can be modified and deformed in various ways without departing from the spirit and scope of the present invention. Therefore, the following claims are attached to make public the scope of the present invention.

What is claimed is:

1. An image forming apparatus to and from which a replenishment container accommodating toner is attachable and detachable and which is configured to form a toner image on a recording material, the image forming apparatus comprising:
    an image bearing member;
    a developer container configured to accommodate toner;
    a developing bearing member configured to develop an electrostatic latent image formed on the image bearing member into a toner image by using toner accommodated in the developer container;
    a replenishment port through which the developer container can be replenished with toner from the replenishment container provided outside the image forming apparatus by attaching the replenishment container thereto;
    a restriction member capable of transitioning to an allowance state in which a rotation of the replenishment container attached to the replenishment port with respect to the replenishment port from a non-communicating position to a communicating position is allowed and to a restriction state in which the rotation of the replenishment container is restricted, with the non-communicating position being a position in which the replenishment container and the replenishment port are not made to communicate with one another, and the communicating position being a position in which the replenishment container and the replenishment port are made to communicate with one another;
    a display configured to display a replenishment procedure for replenishing the developer container with toner from the replenishment container; and
    a controller configured to cause the display to display at least one step of the replenishment procedure.

2. The image forming apparatus according to claim 1, further comprising
    a sensor configured to detect a progress of the replenishment container,
    wherein the controller changes the step to be displayed by the display among the replenishment procedure in accordance with a detection result of the sensor.

3. The image forming apparatus according to claim 2,
    wherein the sensor includes a toner amount detection portion whose output value changes in accordance with an amount of toner accommodated in the developer container, and
    wherein, on a basis of the output value of the toner amount detection portion, in a case where the amount of toner accommodated in the developer container is smaller than a predetermined amount, the controller causes the display to display an attaching step for attaching the replenishment container to the replenishment port.

4. The image forming apparatus according to claim 2,
    wherein the sensor includes an attachment detection portion whose output value changes in accordance with whether or not the replenishment container is attached to the replenishment port, and
    wherein, on a basis of the output value of the attachment detection portion, in a case where the replenishment container is attached to the replenishment port, the controller causes the display to display a communicating step for causing the replenishment container to communicate with the replenishment port.

5. The image forming apparatus according to claim 4,
    wherein the communicating step is an operation of causing the replenishment port and the replenishment container to communicate with each other by rotating the replenishment container attached to the replenishment port.

6. The image forming apparatus according to claim 2, wherein the sensor includes a communication detection portion whose output value changes in accordance with the replenishment container communicating with the replenishment port, and wherein, on a basis of the output value of the communication detection portion, in a case where the replenishment container communicates with the replenishment port, the controller causes the display to display a discharging step for discharging toner accommodated in the replenishment container to the developer container through the replenishment port.

7. The image forming apparatus according to claim 6, wherein the discharging step is an operation of discharging toner accommodated in the replenishment container by pushing in a pressing member provided in the replenishment container.

8. The image forming apparatus according to claim 2, wherein the sensor includes a discharge detection portion whose output value changes in accordance with discharge of toner accommodated in the replenishment container to the developer container, and wherein, on a basis of the output value of the discharge detection portion, in a case where toner accommodated in the replenishment container has been discharged, the controller causes the display to display a detaching step for detaching the replenishment container from the replenishment port.

9. The image forming apparatus according to claim 2, wherein the sensor includes a stopping operation detection portion whose output value changes in accordance with whether or not a stopping operation for stopping a progress of the replenishment procedure has been performed, and wherein, on a basis of the output value of the stopping operation detection portion, in a case where the stopping operation has been performed, the controller causes the display to display a detaching step for detaching the replenishment container from the replenishment port.

10. The image forming apparatus according to claim 5, wherein the sensor includes a rotation detection portion whose output value changes in accordance with a rotation angle of the replenishment container with respect to the replenishment port, and wherein, on a basis of the output value of the rotation detection portion, in a case where the rotation angle has reached such an angle that the replenishment container communicates with the replenishment port, the controller causes the restriction member to transition to the restriction state, and then causes the display to display a discharging step for discharging toner accommodated in the replenishment container to the developer container through the replenishment port.

11. The image forming apparatus according to claim 10, wherein, in a case where the replenishment container communicates with the replenishment port, the controller causes the display to alternately display the discharging step and a stopping step for stopping a progress of the replenishment procedure.

12. The image forming apparatus according to claim 11, wherein the stopping step is execution of a stopping operation in an operation portion with which the stopping operation of stopping the progress of the replenishment procedure can be executed, and wherein, in a case where a predetermined time has elapsed without the stopping operation being executed after the discharging step has been displayed by the display, the controller causes the restriction member to transition to the allowance state, and then causes the display to display a detaching step for detaching the replenishment container from the replenishment port.

13. The image forming apparatus according to claim 11, wherein the stopping step is execution of a stopping operation in an operation portion with which the stopping operation of stopping the progress of the replenishment procedure can be executed, and wherein, in a case where the stopping operation is executed in a period in which the discharging step or the stopping step is displayed by the display, the controller causes the restriction member to transition to the allowance state, and then causes the display to display a detaching step for detaching the replenishment container from the replenishment port.

14. The image forming apparatus according to claim 1, wherein the replenishment procedure includes a first step for attaching the replenishment container to the replenishment port, a second step for causing the replenishment container to communicate with the replenishment port, a third step for discharging toner accommodated in the replenishment container to the developer container through the replenishment port, and a fourth step for detaching the replenishment container from the replenishment port.

15. The image forming apparatus according to claim 14, wherein the controller causes the display to collectively display the first step, the second step, the third step, and the fourth step.

16. An image forming apparatus to and from which a replenishment container accommodating toner is attachable and detachable and which is capable of communicating with an information processing apparatus having a display and is configured to form a toner image on a recording material, the image forming apparatus comprising:

an image bearing member;
a developer container configured to accommodate toner;
a developing bearing member configured to develop an electrostatic latent image formed on the image bearing member into a toner image by using toner accommodated in the developer container;
a replenishment port through which the developer container can be replenished with toner from the replenishment container provided outside the image forming apparatus by attaching the replenishment container thereto;
a restriction member capable of transitioning to an allowance state in which a rotation of the replenishment container attached to the replenishment port with respect to the replenishment port from a non-communicating position to a communicating position is allowed and to a restriction state in which the rotation of the replenishment container is restricted, with the non-communicating position being a position in which the replenishment container and the replenishment port are not made to communicate with one another, and the communicating position being a position in which the replenishment container and the replenishment port are made to communicate with one another; and
a controller configured to output, to the information processing apparatus, information for causing the display to display at least one step of a replenishment procedure for replenishing the developer container with toner from the replenishment container.

17. The image forming apparatus according to claim 1, wherein the display includes a display portion for displaying the replenishment procedure.

18. The image forming apparatus according to claim 1, wherein the display includes a sound emitting portion for expressing the replenishment procedure by a sound.

19. The image forming apparatus according to claim 1, further comprising a shutter configured to move between an open position in which the shutter opens the replenishment port and a close position in which the shutter closes the replenishment port, wherein the rotation of the replenishment container from the non-communicating position to the communicating position causes the shutter to be moved from the close position to the open position.

20. The image forming apparatus according to claim 16, further comprising: a shutter configured to move between an open position in which the shutter opens the replenishment port and a close position in which the shutter closes the replenishment port, wherein the rotation of the replenishment container from the non-communicating position to the communicating position causes the shutter to be moved from the close position to the open position.

* * * * *